(12) United States Patent
Miura et al.

(10) Patent No.: US 9,736,417 B2
(45) Date of Patent: Aug. 15, 2017

(54) CONTROL SYSTEM

(71) Applicant: Sharp Kabushiki Kaisha, Sakai, Osaka (JP)

(72) Inventors: Soichiro Miura, Sakai (JP); Makoto Shiomi, Sakai (JP); Masayuki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/317,436

(22) PCT Filed: Jun. 8, 2015

(86) PCT No.: PCT/JP2015/066502
§ 371 (c)(1),
(2) Date: Dec. 9, 2016

(87) PCT Pub. No.: WO2015/190442
PCT Pub. Date: Dec. 17, 2015

(65) Prior Publication Data
US 2017/0127010 A1    May 4, 2017

(30) Foreign Application Priority Data

Jun. 13, 2014 (JP) .................................. 2014-122155
Oct. 15, 2014 (JP) .................................. 2014-210889

(51) Int. Cl.
*H04N 5/44* (2011.01)
*H04N 5/445* (2011.01)

(52) U.S. Cl.
CPC ....... *H04N 5/44543* (2013.01); *H04N 5/4403* (2013.01); *H04N 2005/443* (2013.01); *H04N 2005/4408* (2013.01)

(58) Field of Classification Search
CPC ............ H04N 5/44543; H04N 5/4403; H04N 2005/4408; H04N 2005/443
(Continued)

(56) References Cited

U.S. PATENT DOCUMENTS 6,407,779 B1 *  6/2002 Herz ................... H04N 5/44513
                                                      340/12.3
6,567,984 B1 *  5/2003 Allport ............ H04N 21/43632
                                                      348/552
(Continued)

FOREIGN PATENT DOCUMENTS

JP    2001-157284 A    6/2001
JP       3422383 B2    6/2003
(Continued)

*Primary Examiner* — Michael Lee
(74) *Attorney, Agent, or Firm* — Keating & Bennett, LLP

(57) ABSTRACT

An object is to realize a control system capable of displaying a display screen of a television receiver (control target device) including a high-resolution display device and quickly performing processes such as a movement of the display, a change in a display magnification, a change in a display angle, and the like through intuitive operations. In the control system (1000), by specifying one point of a display screen on a second display unit (23) of a remote control device (2), that is, acquiring one-point specifying information, it is possible to perform a display position changing process (movement process) using absolute position coordinates. Accordingly, for example, when a control target device (1) serves as a television receiver (control target device) including the high-resolution display device, the second display unit (23) of the remote control device is able to display a display screen of the control target device and quickly perform movement of the display through an intuitive operation.

15 Claims, 22 Drawing Sheets

(58) Field of Classification Search
USPC .................................................. 348/561, 734
See application file for complete search history.

(56) References Cited

U.S. PATENT DOCUMENTS

| | | | |
|---|---|---|---|
| 6,784,872 B1* | 8/2004 | Matsui | G06F 9/4445 345/158 |
| 9,167,209 B2* | 10/2015 | Cook | G06F 3/0346 |
| 2007/0075971 A1* | 4/2007 | Chun | G06F 3/038 345/158 |
| 2012/0033140 A1* | 2/2012 | Xu | H04N 21/42224 348/734 |
| 2012/0119992 A1 | 5/2012 | Nishida et al. | |

FOREIGN PATENT DOCUMENTS

| | | |
|---|---|---|
| JP | 2011-244940 A | 12/2011 |
| JP | 2012-108722 A | 6/2012 |

* cited by examiner

CONTROL SYSTEM

TECHNICAL FIELD

The present invention relates to a control system including a device including a display device such as a high-resolution display device and a remote control device (for example, a display device with a touch panel) controlling the device.

BACKGROUND ART

In recent years, television receivers including high-resolution display devices have been considerably used as television receivers receiving high-vision broadcast, data broadcast, or the like. Such television receivers are configured to display content such as data broadcast, data of program tables transmitted simultaneously with high-vision broadcast, or the like and execute interactive operations based on the display in order to realize various functions. Technologies capable of realizing such interactive operations using remote control devices included in display devices have been developed. For example, Patent Literature 1 (Japanese Unexamined Patent Application Publication No. 2001-157284) discloses a technology capable of displaying a screen of a television receiver on a remote control device so that an interactive operation can be performed while the screen is viewed.

SUMMARY OF INVENTION

Technical Problem

However, in the technology disclosed in Patent Literature 1, a case in which the resolution of a video displayed on a control target device is not very high is assumed. For example, when an entire display screen of a television receiver (control target device) including a high-resolution display device is displayed on a display screen of a remote control device using the technology of Patent Literature 1, detailed portions may be collapsed.

In order to address such a problem, it is necessary to realize a technology for displaying a display screen of a television receiver (control target device) including a high-resolution display device on a remote control device and quickly performing processes such as a movement of the display, a change in a display magnification, a change in a display angle, and the like through intuitive operations.

Accordingly, an object of the present invention is to realize a control system capable of displaying a display screen of a television receiver (control target device) including a high-resolution display device and quickly performing processes such as a movement of the display, a change in a display magnification, a change in a display angle, and the like through intuitive operations.

Solution to Problem

In order to resolve the foregoing problem, a first constitution is a control system that includes a control target device and a remote control device.

The control target device includes a first display unit that displays a video, a first display control unit, an adjustment unit, a main device control unit, and a main device-side interface unit.

The remote control device includes a second display unit that displays a video, a second display control unit, an input control unit, a mode switch unit, and a controller-side interface unit.

The first display control unit performs driving control on the first display unit to cause to the first display unit to display the video.

The adjustment unit acquires an adjusted video signal by extracting a part or all of the video from the video displayed on the first display unit.

The main device control unit controls the first display control unit and the adjustment unit.

The main device-side interface unit is an interface that transmits the adjusted video signal acquired by the adjustment unit to the remote control device.

The second display control unit performs driving control on the second display unit to cause the second display unit to display the video.

The input control unit inputs information for controlling display of the video displayed on the second display unit.

The mode switch unit switches between a display operation mode for changing display of the video displayed on the second display unit and a device operation mode for performing a device operation of the control target device.

The controller-side interface unit is an interface that communicates with the main device-side interface unit of the control target device.

In a case in which the display operation mode is configured and one-point specifying information which is information for specifying one point on a display screen of the second display unit is input to the input control unit, the input control unit outputs the one-point specifying information to the main device control unit via the controller-side interface unit and the main device-side interface unit, the main device control unit configures absolute position coordinates by causing a coordinate plane configured on an entire display screen of the first display unit to correspond to a coordinate plane configured on the entire display screen of the second display unit, the adjustment unit acquires the adjusted video signal forming an image region AR1 which includes a point P1 corresponding to a point P2 indicated by the one-point specifying information on the absolute position coordinates of the display screen of the first display unit and is displayed on the first display unit, and the second display control unit causes the second display unit to display the image region AR1 based on the adjusted video signal.

Advantageous Effects of Invention

According to the present invention, it is possible to realize a control system capable of displaying a display screen of a television receiver (control target device) including a high-resolution display device and quickly performing processes such as a movement of the display, a change in a display magnification, a change in a display angle, and the like through intuitive operations.

DESCRIPTION OF EMBODIMENTS

First Embodiment

A first embodiment will be described with reference to the drawings.

<1.1: Constitution of Control System>

Figure 1:
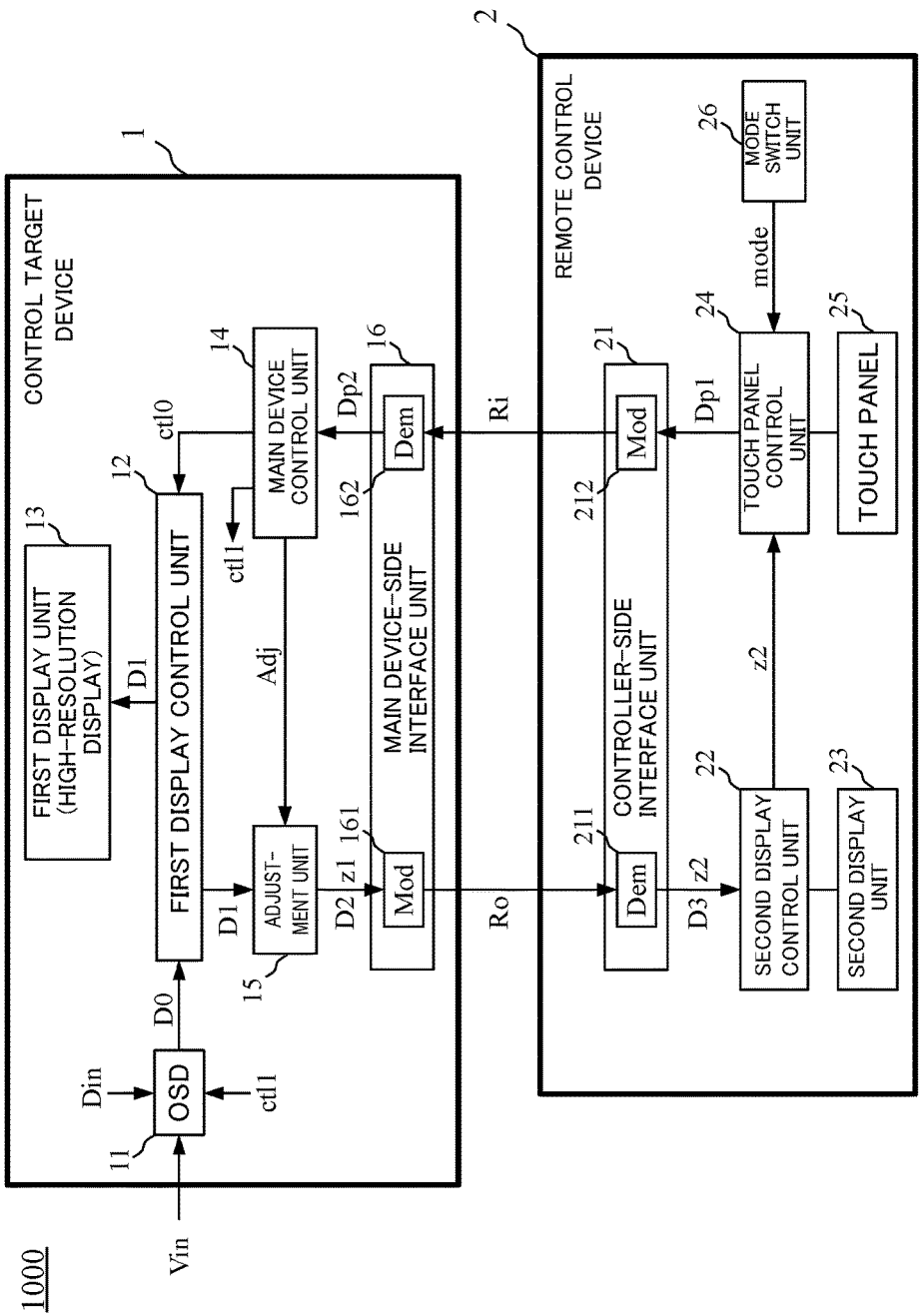
FIG. 1 is a diagram illustrating a schematic constitution of a control system 1000 according to a first embodiment.

FIG. 1 is a diagram illustrating a schematic constitution of a control system 1000 according to a first embodiment.

As illustrated in FIG. 1, the control system 1000 includes a control target device 1 and a remote control device 2 that controls the control target device 1.

As illustrated in FIG. 1, the control target device 1 includes a video combination unit 11, a first display control unit 12, a first display unit 13, a main device control unit 14, an adjustment unit 15, and a main device-side interface unit 16. The control target device 1 is, for example, a television receiver that can receive a high-vision method, data broadcast, or the like. In FIG. 1, functional units (an antenna reception unit, an RF demodulation unit, a digital demodulation unit, a decoding unit, and the like) necessary in a case in which the control target device 1 is the television receiver receiving the high-vision method, data broadcast, or the like are not illustrated.

The video combination unit 11 inputs a video signal Vin and a data signal Din. The video combination unit 11 inputs a control signal ct11 output from the main device control unit 14. Based on the control signal ct11, the video combination unit 11 outputs (1) the video signal Vin as a video signal D0 without change to the first display control unit 12, outputs (2) a video signal generated by superimposing the video signal Vin and a video signal (for example, an on-screen display (OSD) signal) generated based on the data signal Din as the video signal D0 to the first display control unit 12, or outputs (3) a video signal (for example, an on-screen display (OSD) signal) generated based on the data signal Din as the video signal D0 to the first display control unit 12.

The first display control unit 12 inputs the video signal D0 output from the video combination unit 11 and a control signal ct10 output from the main device control unit 14. The first display control unit 12 writes the video signal D0 based on the control signal ct10 on a memory (not illustrated) such as a video RAM (VRAM), reads the video signal D0 from the memory as a video signal D1 based on the control signal ct10, and outputs the video signal D1 to the first display unit 13 to display the video signal D1 on the first display unit 13. In order for the first display unit 13 to display the video signal D1, the first display control unit 12 outputs, for example, the video signal D1 and driving signals (for example, a source driving signal and a gate driving signal) driving the first display unit 13 (for example, a high-resolution liquid crystal panel) to the first display unit 13.

The first display control unit 12 also outputs the video signal D1 to the adjustment unit 15.

The first display unit 13 inputs the video signal D1 and the driving signals output from the first display control unit 12. Then, the first display unit 13 displays the video signal D1 based on the driving signals from the first display control unit 12. The first display unit 13 is, for example, a high-resolution display panel (for example, a high-resolution liquid crystal panel).

The main device control unit 14 is a control unit that controls each functional unit of the control target device 1. The main device control unit 14 generates the control signal ct10 for controlling the first display control unit 12 and outputs the generated control signal ct10 to the first display control unit 12. The main device control unit 14 generates the control signal ct11 for controlling the video combination unit 11 and outputs the generated control signal ct11 to the video combination unit 11.

The main device control unit 14 can input a signal Dp2 output from the main device-side interface unit 16. The signal Dp2 includes (1) information regarding a display operation of the remote control device 2, (2) device information regarding the control target device 1, and (3) mode information mode. The main device control unit 14 generates an adjustment signal Adj for generating a video to be displayed by the remote control device 2 based on the input signal Dp2. Then, the main device control unit 14 outputs the generated adjustment signal Adj to the adjustment unit 15.

The adjustment unit 15 inputs the video signal D1 output from the first display control unit 12 and the adjustment signal Adj output from the main device control unit 14. The adjustment unit 15 acquires the adjusted video signal D2 for forming a video region (image region) to be displayed by the remote control device 2 from the video signal D1 based on the adjustment signal Adj. Then, the adjustment unit 15 outputs the acquired adjusted video signal D2 and coordinate information z1 for specifying the image region formed by the adjusted video signal D2 to the main device-side interface unit 16.

As illustrated in FIG. 1, the main device-side interface unit 16 includes a main device-side modulation unit 161 and a main device-side demodulation unit 162. The main device-side interface unit 16 is an interface that transmits and receives data to and from the remote control device 2.

The adjusted video signal D2 and the coordinate information z1 output from the adjustment unit 15 are input to the main device-side modulation unit 161. In order to transmit the input adjusted video signal D2 and coordinate information z1 to the remote control device 2, the main device-side modulation unit 161 performs modulation to a signal appropriate to transmit the video signal D2 and the coordinate information z1 to the remote control device 2. For example, in a case in which data transmission is wirelessly performed from the control target device 1 to the remote control device 2, the main device-side modulation unit 161 generates a wireless signal Ro by performing an RF modulation process on the adjusted video signal D2 and the coordinate information z1 and outputs the generated wireless signal Ro to a controller-side interface unit 21 of the remote control device 2.

A wireless signal Ri from the remote control device 2 is input to the main device-side demodulation unit 162. The main device-side demodulation unit 162 acquires the signal Dp2 by performing an RF demodulation process on the received wireless signal Ri. Then, the main device-side demodulation unit 162 outputs the acquire signal Dp2 to the main device control unit 14.

As illustrated in FIG. 1, the remote control device 2 includes the controller-side interface unit 21, a second display control unit 22, a second display unit 23, a touch panel control unit 24, a touch panel 25, and a mode switch unit 26.

As illustrated in FIG. 1, the controller-side interface unit 21 includes a controller-side demodulation unit 211 and a controller-side modulation unit 212. The controller-side interface unit 21 is an interface that transmits and receives data to and from the control target device 1.

The wireless signal Ro received from the control target device 1 is input to the controller-side demodulation unit 211. The controller-side demodulation unit 211 acquires a video signal D3 (a signal corresponding to the video signal D2) and coordinate information z2 (a signal corresponding to the coordinate information z1) by performing the RF demodulation process on the received radio signal Ro. Then, the controller-side demodulation unit 211 outputs the acquired video signal D3 and coordinate information z2 to the second display control unit 22.

A signal Dp1 output from the touch panel control unit 24 is input to the controller-side modulation unit 212. In order to transmit the input signal Dp1 to the control target device 1, the controller-side modulation unit 212 performs modulation to a signal appropriate to transmit the signal Dp1 to the control target device 1. For example, in a case in which data transmission is wirelessly performed from the remote control device 2 to the control target device 1, the controller-side modulation unit 212 generates a wireless signal Ri by performing the RF modulation process on the signal Dp1 and outputs the generated wireless signal Ri to the main device-side interface unit 16 of the control target device 1.

The video signal D3 and the coordinate information z2 output from the controller-side demodulation unit 211 of the controller-side interface unit 21 are input to the second display control unit 22. The second display control unit 22 causes the second display unit 23 to display the input video signal D2.

The second display control unit 22 outputs, for example, the video signal D3 and driving signals (for example, a source driving signal and a gate driving signal) for driving the second display unit 23 (for example, a liquid crystal panel) to the second display unit 23.

The second display control unit 22 outputs the coordinate information z2 to the touch panel control unit 24.

The second display unit 23 inputs the video signal D3 and the driving signals output from the second display control unit 22. Then, the second display unit 23 displays the video signal D3 based on the driving signals from the second display control unit 22. The second display unit 23 is, for example, a display panel (for example, a liquid crystal panel).

The touch panel control unit 24 inputs a signal indicating a change in an electric field on the touch panel 25. The touch panel control unit 24 inputs the coordinate information z2 output from the second display control unit 22 and the mode information mode output from the mode switch unit 26.

The touch panel control unit 24 detects the number of touches, touch positions, or the like from the signal indicating the change in the electric field on the touch panel 25, generates the signal Dp1 including information indicating a detection result, and outputs the signal Dp1 to the controller-side interface unit 21. In a case in which a mode indicated by the mode information mode is a "display operation mode" the touch panel control unit 24 outputs the generated signal Dp1 to the controller-side interface unit 21. As operation modes indicated by the mode information mode, there are (1) a device operation mode and (2) a display operation mode (of which the details will be described below).

The touch panel 25 is, for example, an electrostatic capacitance type touch panel and is driven by the touch panel control unit 24. Then, a signal corresponding to a change in the electric field in a case in which a touch is performed with a finger or the like on the touch panel 25 is output to the touch panel control unit 24.

The mode switch unit 26 is a functional unit that switches between (1) the device operation mode and (2) the display operation mode. The mode switch unit 26 outputs information (mode information) mode indicating a switched (configured) mode to the touch panel control unit 24.

<1.2: Operations of Control System>

Operations of the control system 1000 having the foregoing constitution will be described below.

Hereinafter, the operations are divided into an operation of the control system 1000 in the "display operation mode" and an operation of the control system 1000 in the "device operation mode" in the description.

(1.2.1: Display Operation Mode)

First, the operation of the control system 1000 in the "display operation mode" will be described.

In the "display operation mode", (A1) a display position changing process using absolute position coordinates, (A2) a display position changing process using relative position coordinates, (B) a display enlargement ratio changing process, and (C) a display angle changing process can be performed. Hereinafter, these processes will be described.

<<A1: Display Position Changing Process Using Absolute Position Coordinates>>

First, a display position changing process using absolute position coordinates will be described.

Figure 2:
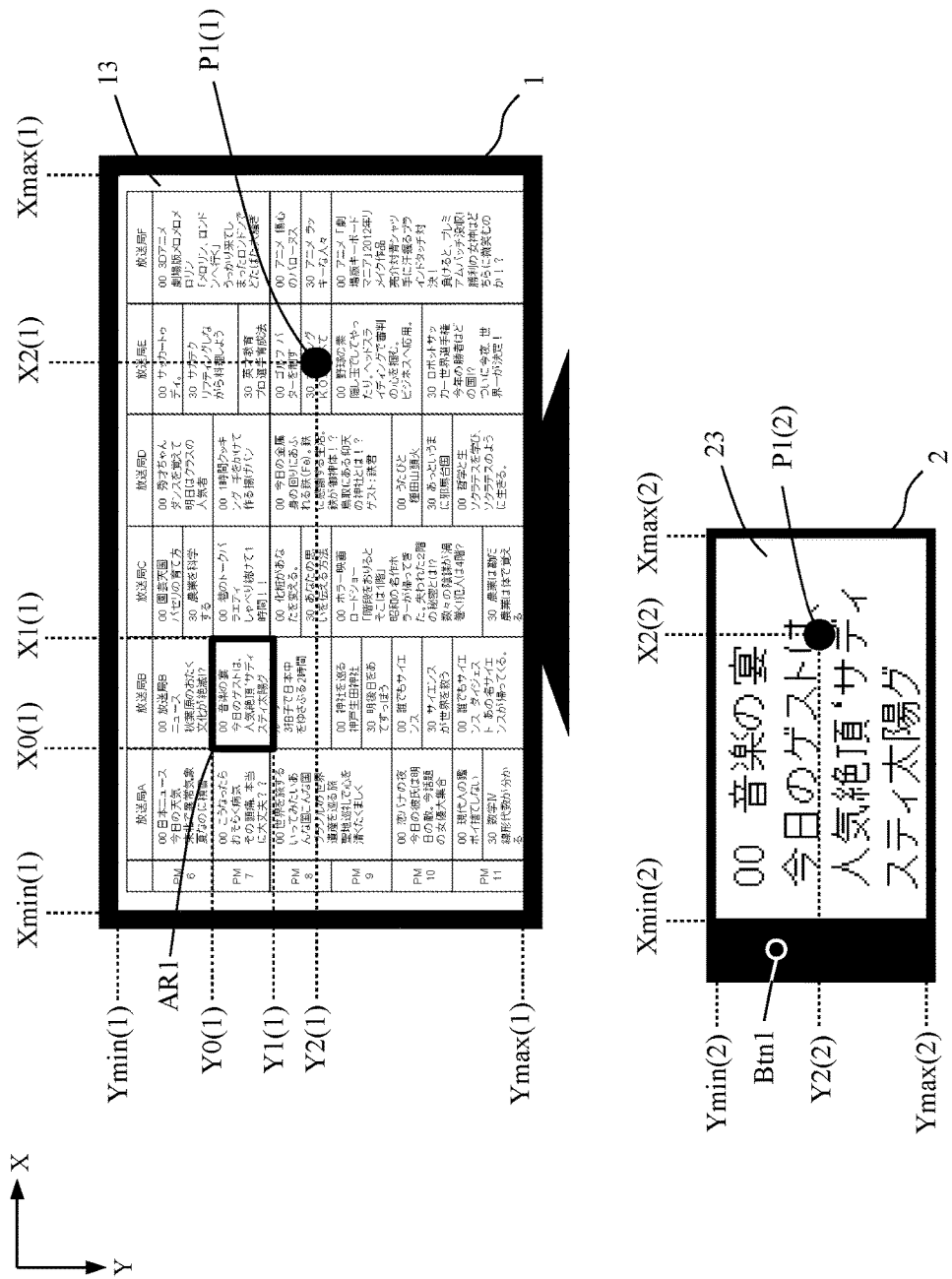
FIG. 2 is an explanatory diagram illustrating a display position changing process using absolute position coordinates.

FIG. 2 is an explanatory diagram illustrating a display position changing process using absolute position coordinates. Specifically, FIG. 2 is a diagram schematically illustrating the control target device 1 and the remote control device 2 and illustrating a state in which a program table is displayed on the first display unit 13 of the control target device 1. FIG. 2 illustrates a state in which a region AR1 of the first display unit 13 is enlarged and displayed on the second display unit 23 of the remote control device 2.

As illustrated in FIG. 2, X and Y axes are configured. As illustrated in FIG. 2, in a region of a display screen of the first display unit 13 of the control target device 1, it is assumed that a minimum value is Xmin(1) and a maximum value is Xmax(1) on the X coordinate and a minimum value is Ymin(1) and a maximum value is Ymax(1) on the Y coordinate.

As illustrated in FIG. 2, in a region of a display screen of the second display unit 23 of the remote control device 2, it is assumed that a minimum value is Xmin(2) and a maximum value is Xmax(2) on the X coordinate and a minimum value is Ymin(2) and a maximum value is Ymax(2) on the Y coordinate.

In the state of FIG. 2, a user configures the "display operation mode" by pressing a button Btn1 of the remote control device 2. For example, the "display operation mode" and the "device operation mode" are switched by pressing the button Btn1. The configured mode may be displayed on the second display unit 23 and/or the first display unit 13 through a toggle operation.

When the user touches one point on the display screen of the second display unit 23 of the remote control device 2 in the state configured in the display operation mode, an image centering on a position corresponding to the touch position on the display screen of the first display unit 13 of the control target device 1 can be displayed on the second display unit 23 of the remote control device 2.

For example, in FIG. 2, when the user touches one point, display in which a point P1(2) of the second display unit 23 of the remote control device 2 is displayed on the second display unit 23 of the remote control device 2 can be updated to display of a region centering on the point P1(1) of the first display unit 13 from a region AR1 of the first display unit 13.

That is, in a case in which a coordinate plane configured on the entire display screen of the second display unit 23 of the remote control device 2 corresponds to a coordinate plane configured on the entire display screen of the first display unit 13 of the control target device 1, the display can be updated to the display of the region centering on the point P1(1) on the display screen (coordinate plane) of the first display unit 13 and corresponding to the point P1(2) on the display screen (coordinate plane) of the second display unit 23. When the coordinates of the point P1(1) on the coordinate plane configured on the entire display screen of the first display unit 13 are assumed to be (X2(1), Y2(1)) and the coordinates of the point P1(2) on the coordinate plane configured on the entire display screen of the second display unit 23 are assumed to be (X2(2), Y2(2)), the following relations are satisfied:

$$(X2(1) - X\min(1))/(X\max(1) - X\min(1)) =$$

$$(X2(2) - X\min(2))/(X\max(2) - X\min(2)); \text{ and}$$

$$(Y2(1) - Y\min(1))/(Y\max(1) - Y\min(1)) =$$

$$(Y2(2) - Y\min(2))/(Y\max(2) - Y\min(2)).$$

Figure 3:
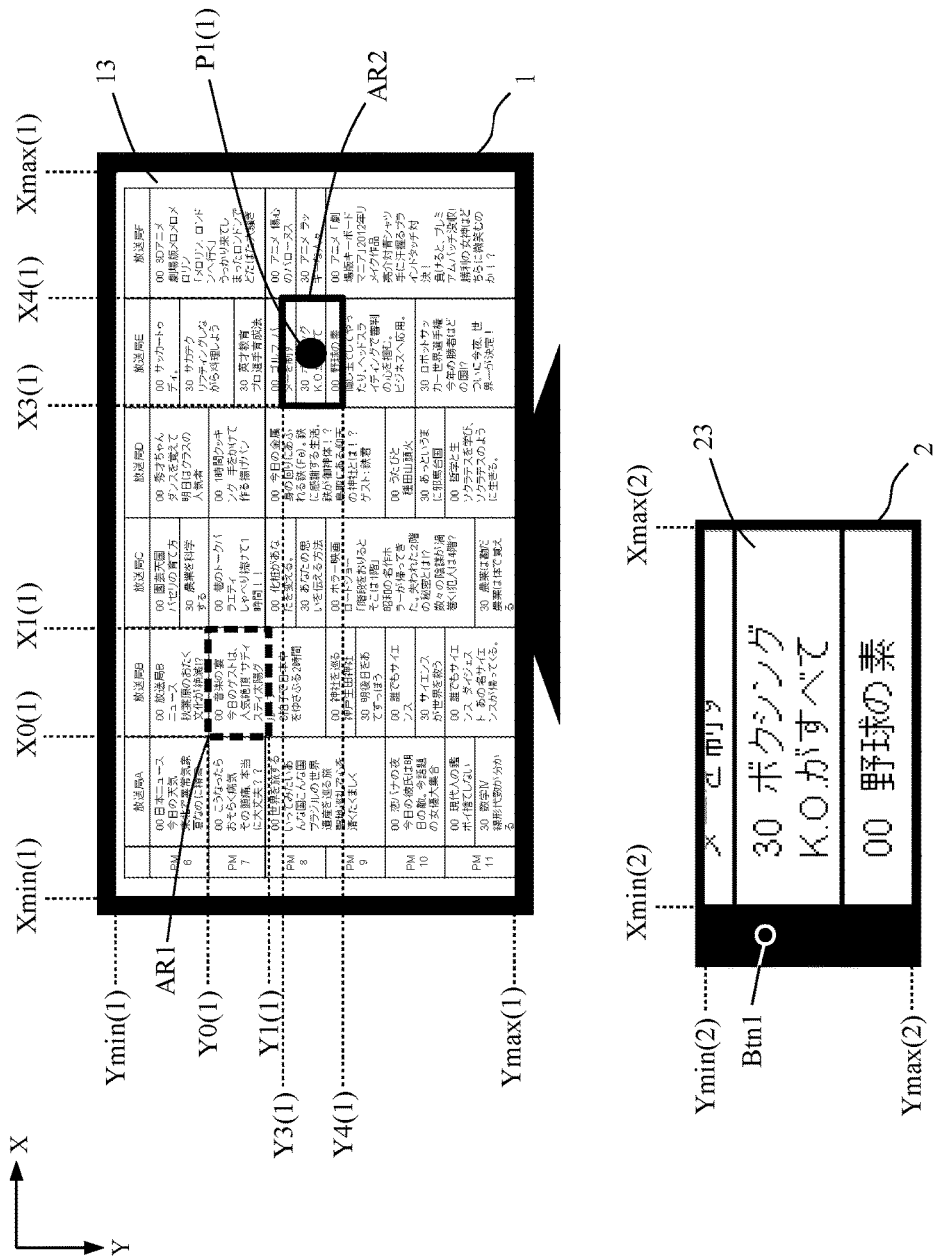
FIG. 3 is a diagram illustrating states of a control target device 1 and a remote control device 2 after the display position changing process using absolute position coordinates is performed.

FIG. 3 is a diagram illustrating states of the control target device 1 and the remote control device 2 after the foregoing operation is performed.

As illustrated in FIG. 3, a region AR2 of the first display unit 13 of the control target device 1 is displayed on the second display unit 23 of the remote control device 2.

An operation of the control system 1000 in a case in which the foregoing operation is performed will be described with reference to FIG. 1.

When data Din regarding a program table is input, the video combination unit 11 generates the video signal D0 displaying the program table based on the data Din regarding the program table by the control signal ct11 from the main device control unit 14. Then, the generated video signal D0 is output to the first display control unit 12.

The first display control unit 12 performs driving control on the first display unit 13 such that the video signal D0 is displayed on the first display unit 13.

The adjustment unit 15 generates the video signal D2 forming the region AR1 in FIG. 2 based on the adjustment signal Adj output from the main device control unit 14.

The adjustment unit 15 acquires coordinate information on the configured XY coordinate plane, as illustrated in FIG. 2 as the coordinate information z1 regarding the region AR1. The adjustment unit 15 acquires, for example, coordinate information (X0(1), Y0(1)) of the top left end point of the region AR1 and coordinate information (X1(1), Y1(1)) of the bottom right end point of the region AR1 as the coordinate information z1 of the region AR1 displayed on the second display unit 23 regarding the remote control device 2.

The adjustment unit 15 outputs the acquired video signal D2 forming the region AR1 in FIG. 2 and the acquired coordinate information z1 regarding the region AR1 to the main device-side modulation unit 161 of the main device-side interface unit 16.

The main device-side modulation unit 161 generates the wireless signal Ro by performing the RF modulation process on the input video signal D2 and the coordinate information z1. The generated wireless signal Ro is output from the main device-side modulation unit 161 to the controller-side interface unit 21.

The controller-side demodulation unit 211 of the controller-side interface unit 21 receives the wireless signal Ro and acquires the video signal D3 (the signal corresponding to the video signal D2 forming the region AR1) and a coordinate information z2 (a signal corresponding to the coordinate information z1 regarding the region AR1) by performing the RF demodulation process. Then, the controller-side demodulation unit 211 outputs the acquired video signal D3 and the coordinate information z2 to the second display control unit 22.

The second display control unit 22 performs driving control on the second display unit 23 such that the video signal D2 forming the region AR1 is displayed on the second display unit 23. Thus, as illustrated in FIG. 2, the same image (video) as the region AR1 is displayed on the second display unit 23.

The second display control unit 22 outputs the coordinate information z2 regarding the region AR1 to the touch panel control unit 24.

When the user presses the button Btn1 illustrated in FIG. 2 to configure the "display operation mode", the mode switch unit 26 generates the mode information mode indicating that the "display operation mode" is configured and outputs the generated mode information mode to the touch panel control unit 24.

In a case in which the user touches the position of the point P1(2) illustrated in FIG. 2 as one point on the touch panel 25, the touch panel control unit 24 recognizes a touched point as one point based on a signal (a signal indicating a change in the electric field on the touch panel 25) output from the touch panel 25 and detects a coordinate position of the touched point. In the case of FIG. 2, the coordinate position (X2(2), Y2(2)) of the touched point is acquired as coordinate information regarding the touched point.

The touch panel control unit 24 generates the signal Dp1 including detection results, that is, (1) information regarding one touched point and (2) the coordinate position (X2(2), Y2(2)) of the touched point. Then, the touch panel control unit 24 outputs the generated signal Dp1 to the controller-side modulation unit 212.

The controller-side modulation unit 212 generates the wireless signal Ri by performing the RF modulation process on the signal Dp1. Then, the generated wireless signal Ri is transmitted from the controller-side modulation unit 212 to the main device-side demodulation unit 162.

The main device-side demodulation unit 162 acquires the signal Dp2 corresponding to the signal Dp1 by performing the RF demodulation on the received wireless signal Ri. Then, the acquired signal Dp2 is output to the main device control unit 14.

The main device control unit 14 recognizes (1) the one touched point and (2) the coordinate position (X2(2), Y2(2)) of the touched point on the touch panel 25 of the remote control device 2 from the signal Dp2.

Then, the main device control unit 14 performs the display position changing process (a movement process) using absolute position coordinates in a case in which the touched point is one point. This will be described with reference to FIG. 4.

Figure 4:
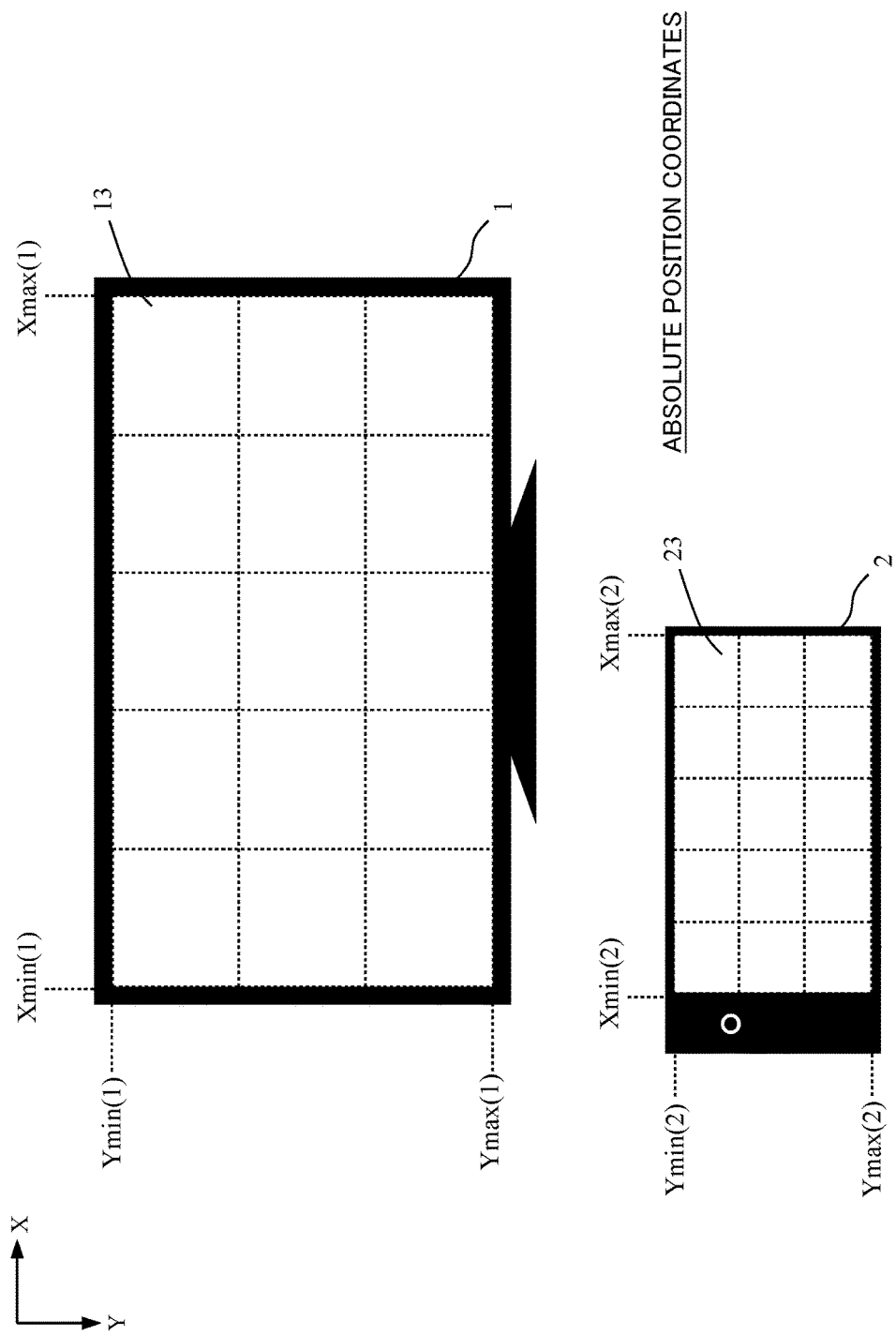
FIG. 4 is an explanatory diagram illustrating the absolute position coordinates.

FIG. 4 is an explanatory diagram illustrating the absolute position coordinates.

As illustrated in FIG. 4, in a case in which the display position changing process (movement process) using the absolute position coordinates is performed, all the coordinates configured on the entire display screen of the first display unit 13 of the control target device 1 correspond to all the coordinates configured on the entire display screen of the second display unit 23 of the remote control device 2.

That is, as illustrated in FIG. 4, the coordinates (Xmin(1), Ymin(1)) of the top left end point on the display screen of the first display unit 13 of the control target device 1 correspond to the coordinates (Xmin(2), Ymin(2)) of the top left end point on the display screen of the second display unit 23 of the remote control device 2. The coordinates (Xmax(1), Ymax(1)) of the bottom right end point on the display screen of the first display unit 13 of the control target device 1 correspond to the coordinates (Xmax(2), Ymax(2)) of the bottom right end point on the display screen of the second display unit 23 of the remote control device 2. In this way, the coordinates defined by allowing the coordinate plane configured on the entire display screen of the first display unit 13 of the control target device 1 to correspond to the entire display screen of the second display unit 23 of the remote control device 2 in a one-to-one manner are referred to as "absolute position coordinates". That is, the coordinate plane configured on the entire display screen of the first display unit 13 of the control target device 1 and defined by the absolute position coordinates is a plane with a rectangular region of (Xmin(1), Ymin(1))–(Xmax(1), Ymax(1)). Further, the coordinate plane configured on the entire display screen of the second display unit 23 of the remote control device 2 and defined by the absolute position coordinates is a plane with a rectangular region of (Xmin(2), Ymin(2))–(Xmax(2), Ymax(2)).

A notation "a rectangular region of (x1, y1)–(x2, y2)" indicates a rectangular region in which the top left end point is (x1, y1) and the bottom right end point is (x2, y2) (hereinafter the same applies).

The main device control unit 14 performs the display position changing process (movement process) using the absolute position coordinates in a case in which it is determined that one point is touched on the touch panel 25 of the remote control device 2 based on the signal Dp2. That is, in the case of FIG. 2, at the absolute position coordinates configured in the foregoing manner, the coordinates (X2(2), Y2(2)) of the point P1(2) of the second display unit 23 correspond to the coordinates (X2(1), Y2(1)) of the point P1(1) of the first display unit 13.

Accordingly, in the case of FIG. 2, the main device control unit 14 generates the adjustment signal Adj so that the region AR2 (the region AR2 illustrated in FIG. 3) centering on the point P1(1) of the first display unit 13 is displayed on the second display unit 23 of the remote control device 2. Then, the main device control unit 14 outputs the generated adjustment signal Adj to the adjustment unit 15.

The adjustment unit 15 generates the video signal D2 forming the region AR2 from the video signal D1 based on the adjustment signal Adj from the main device control unit 14 and outputs the generated video signal D2 to the main device-side interface unit 16. The adjustment unit 15 generates the coordinate information z1 regarding the region AR2 based on the adjustment signal Adj from the main device control unit 14 and outputs the generated coordinate information z1 to the main device-side interface unit 16.

The subsequent processes are the same as the processes in a case in which the region AR1 is displayed.

Through the foregoing processes, as illustrated in FIG. 3, the image of the region AR2 is displayed on the second display unit 23 of the remote control device 2.

In this way, the control system 1000 can perform the display position changing process (movement process) using the absolute position coordinates when one point is touched on the second display screen of the remote control device 2.

<<A2: Display Position Changing Process Using Relative Position Coordinates>>

Next, the display position changing process using relative position coordinates will be described.

Figure 5:
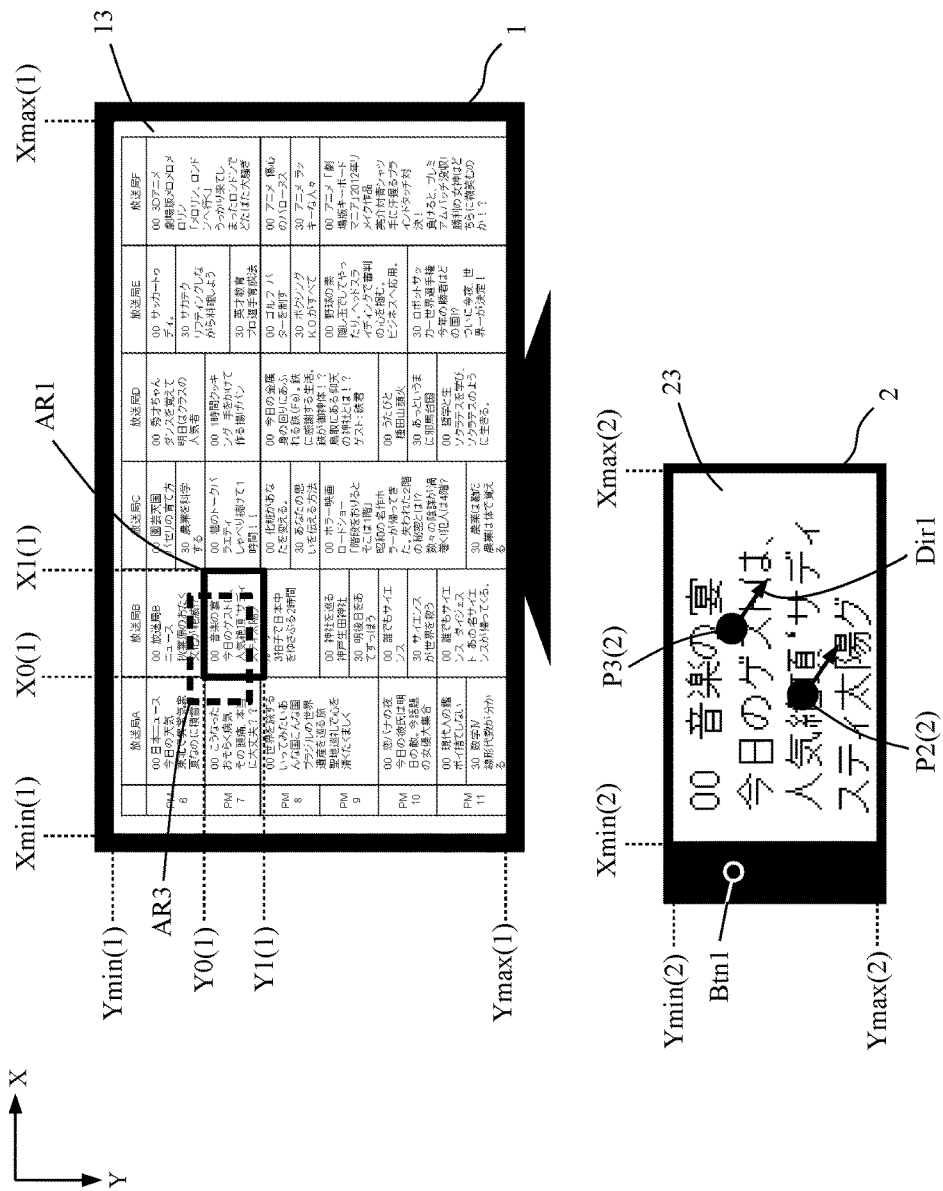
FIG. 5 is an explanatory diagram illustrating a display position changing process using relative position coordinates.

FIG. 5 is an explanatory diagram illustrating the display position changing process using relative position coordinates. Specifically, FIG. 5 is a diagram schematically illustrating the control target device 1 and the remote control device 2 and illustrating a state in which a program table is displayed on the first display unit 13 of the control target device 1. FIG. 5 illustrates a state in which a region AR1 of the first display unit 13 is enlarged and displayed on the second display unit 23 of the remote control device 2.

As illustrated in FIG. 5, X and Y axes are configured. As illustrated in FIG. 5, in a region of a display screen of the first display unit 13 of the control target device 1, it is assumed that a minimum value is Xmin(1) and a maximum value is Xmax(1) on the X coordinate and a minimum value is Ymin(1) and a maximum value is Ymax(1) on the Y coordinate.

As illustrated in FIG. 5, in a region of a display screen of the second display unit 23 of the remote control device 2, it is assumed that a minimum value is Xmin(2) and a maximum value is Xmax(2) on the X coordinate and a minimum value is Ymin(2) and a maximum value is Ymax(2) on the Y coordinate.

In the state of FIG. 5, the user configures the "display operation mode" by pressing the button Btn1 of the remote control device 2.

When the user displaces two points in any direction Din on the display screen of the second display unit 23 of the remote control device 2 while touching the two points in the state configured in the display operation mode, an image present in the opposite direction to the displacement direction Dir1 can be displayed on the display screen of the first display unit 13 of the control target device 1 can be displayed on the second display unit 23 of the remote control device 2.

For example, in FIG. 5, when the user displaces two points, the P2(2) and P3(2), in a direction indicated by an arrow Dirt on the second display unit 23 of the remote control device 2 while touching the two points, display displayed on the second display unit 23 of the remote control device 2 can be updated to display of a region AR3 of the first display unit 13 from the region AR1 of the first display unit 13.

Figure 6:
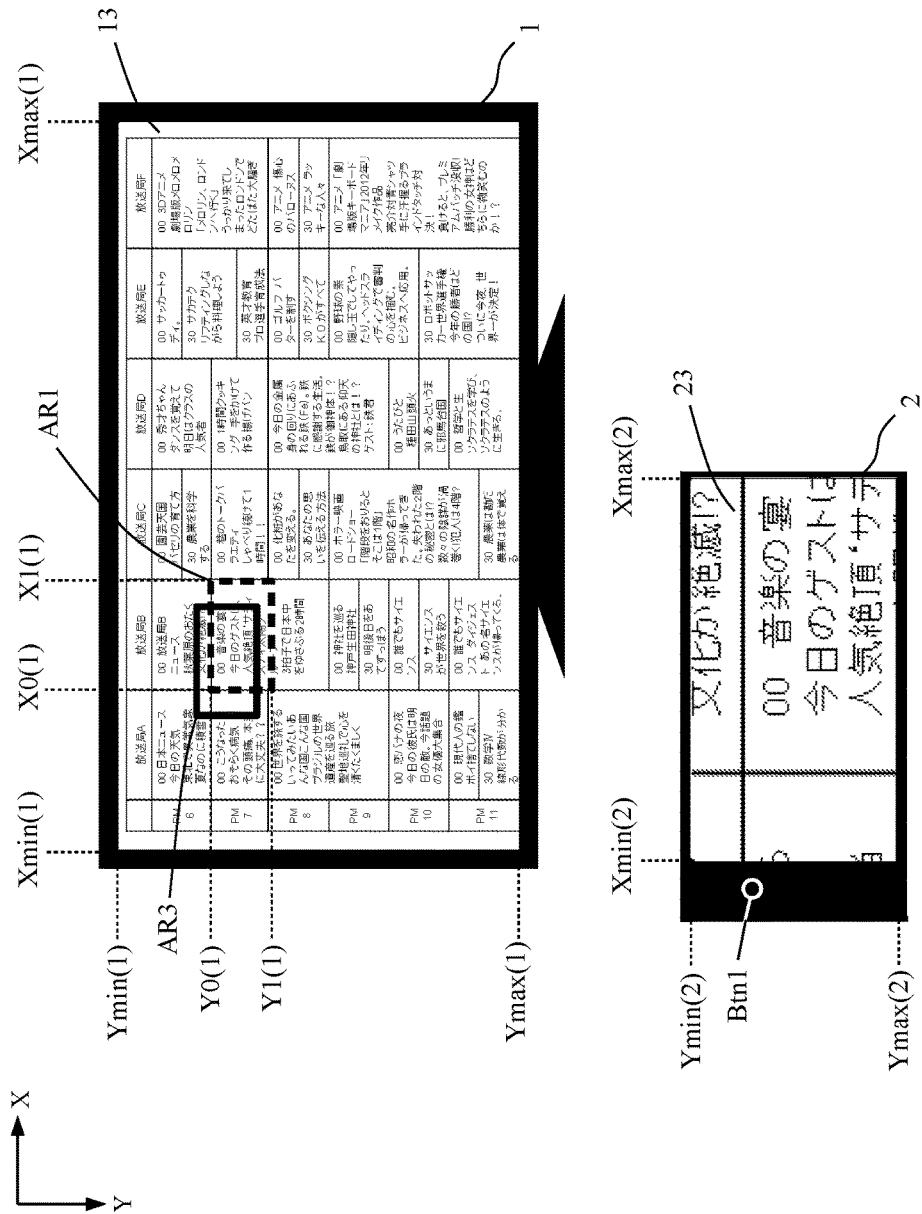
FIG. 6 is a diagram illustrating states of the control target device 1 and the remote control device 2 after the display position changing process using the relative position coordinates is performed.

FIG. 6 is a diagram illustrating states of the control target device 1 and the remote control device 2 after the foregoing operation is performed.

As illustrated in FIG. 6, the region AR3 of the first display unit 13 of the control target device 1 is displayed on the second display unit 23 of the remote control device 2.

An operation of the control system 1000 in a case in which the foregoing operation is performed will be described with reference to FIG. 1.

The description of the same process as the foregoing "A1: Display Position Changing Process Using Absolute Position Coordinates" will be omitted.

In a case in which the user touches two points, points P2(2) and P3(2) illustrated in FIG. 5, on the touch panel 25, the touch panel control unit 24 recognizes that two points are touched based on a signal (a signal indicating a change in the electric field on the touch panel 25) output from the touch panel 25 and detects the coordinate positions of the two touched points. In the case of FIG. 5, the coordinate position of the touched point P2(2) and the coordinate position of the touched point P3(2) are acquired as coordinate information.

The touch panel control unit 24 generates the signal Dp1 including detection results, that is, information regarding (1) two touched points and (2) the coordinate positions of the two touched points. Then, the touch panel control unit 24 outputs the generated signal Dp1 to the controller-side modulation unit 212.

The controller-side modulation unit 212 generates the wireless signal Ri by performing the RF modulation process on the signal Dp1. Then, the generated wireless signal Ri is transmitted from the controller-side modulation unit 212 to the main device-side demodulation unit 162.

The main device-side demodulation unit 162 acquires the signal Dp2 corresponding to the signal Dp1 by performing the RF demodulation on the received wireless signal Ri. Then, the acquired signal Dp2 is output to the main device control unit 14.

The main device control unit 14 recognizes (1) the two touched points and (2) the coordinate positions of the two touched points on the touch panel 25 of the remote control device 2 from the signal Dp2.

Further, the main device control unit 14 recognizes that the two touched points, the points P2(2) and P3(2), are displaced in the direction Dir1 in the touched state on the touch panel 25 from the signal Dp2 continuously acquired within a predetermined time through the foregoing processes. Further, a movement speed of the touch points is calculated from a movement distance of the touched points within the predetermined time.

The main device control unit 14 repeats the foregoing processes to calculate the movement distance of the two touched points until it is confirmed that the two touched points are released from the touch panel 25. Then, a region to be newly displayed on the second display unit 23 is decided based on the calculated movement distance of the two touched points. In the case of FIG. 5, the region to be newly displayed is assumed to be the region AR3.

In this way, the main device control unit 14 performs the display position changing process (a movement process) using relative position coordinates in a case in which the touched points are two points. This will be described with reference to FIG. 7.

Figure 7:
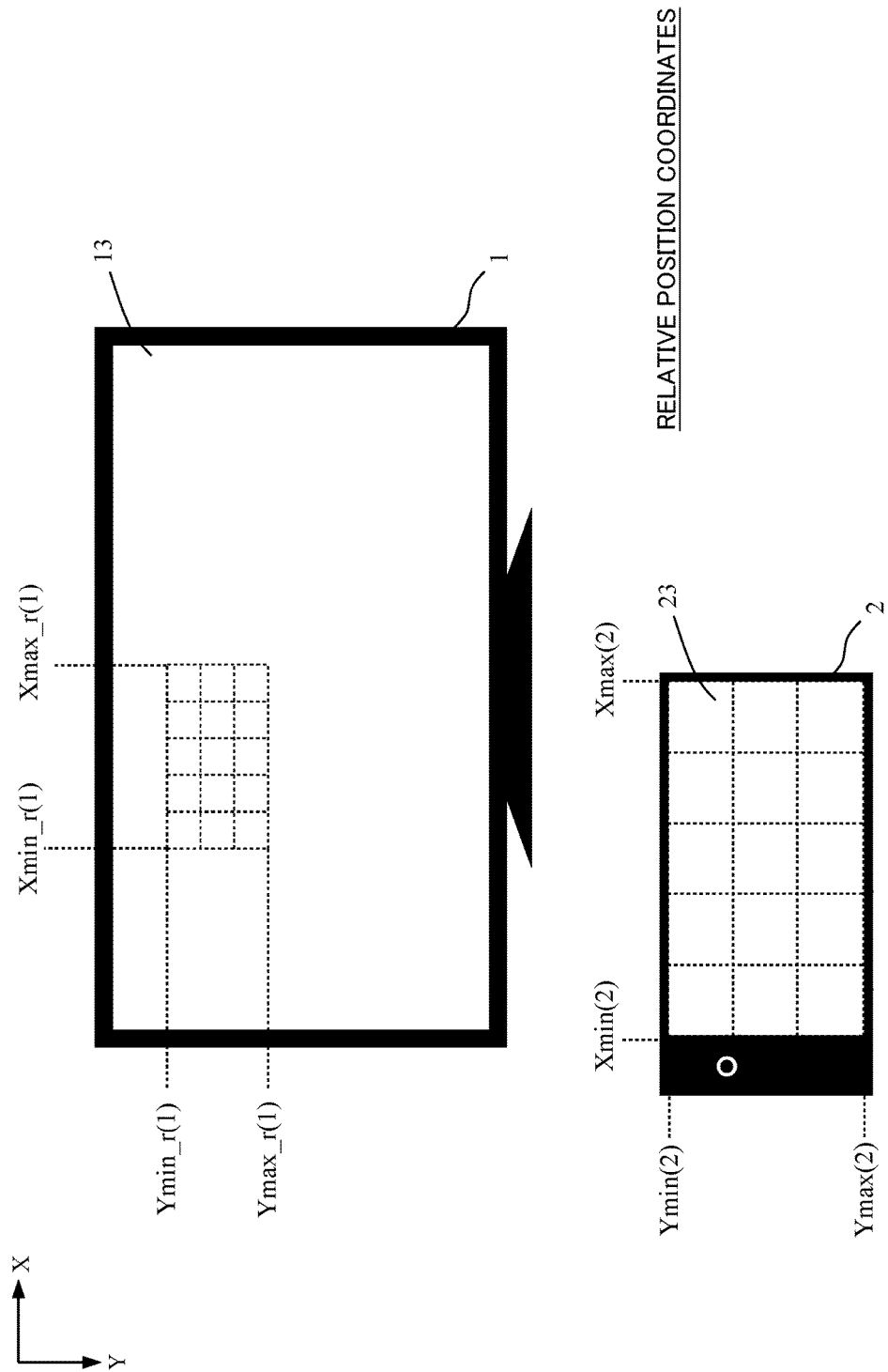
FIG. 7 is an explanatory diagram illustrating the relative position coordinates.

FIG. 7 is an explanatory diagram illustrating the relative position coordinates.

As illustrated in FIG. 7, in a case in which the display position changing process (movement process) using the relative position coordinates is performed, all the coordinates configured on a partial region of the display screen of the first display unit 13 of the control target device 1 correspond to all the coordinates configured on the entire display screen of the second display unit 23 of the remote control device 2.

That is, as illustrated in FIG. 7, the coordinates (Xmin_r(1), Ymin_r(1)) of the top left end point of a partial region on the display screen of the first display unit 13 of the control target device 1 correspond to the coordinates (Xmin(2), Ymin(2)) of the top left end point on the display screen of the second display unit 23 of the remote control device 2. The coordinates (Xmax_r(1), Ymax_r(1)) of the bottom right end point of the partial region on the display screen of the first display unit 13 of the control target device 1 correspond to the coordinates (Xmax(2), Ymax(2)) of the bottom right end point on the display screen of the second display unit 23 of the remote control device 2.

The main device control unit 14 performs the display position changing process (movement process) using the relative position coordinates based on the movement distance of the two points in a case in which it is determined that the two points are touched on the touch panel 25 of the remote control device 2 based on the signal Dp2. That is, in the case of FIG. 5, at the relative position coordinates configured in the foregoing manner, the points P2(2) and P3(2) on the second display unit 23 are displaced in the direction Dir1. Therefore, the main device control unit 14 generates the adjustment signal Adj so that the display of the second display unit 23 is updated from the display of the region AR1 to the display of the region AR3. The movement distance of the points P2(2) and P3(2) in the direction Dir1 on the second display unit 23 is assumed to correspond to a distance between the regions AR1 and AR2.

Then, the main device control unit 14 outputs the generated adjustment signal Adj to the adjustment unit 15.

The adjustment unit 15 generates the video signal D2 forming the region AR3 from the video signal D1 based on the adjustment signal Adj from the main device control unit 14 and outputs the generated video signal D2 to the main device-side interface unit 16. The adjustment unit 15 generates the coordinate information z1 regarding the region AR3 based on the adjustment signal Adj from the main device control unit 14 and outputs the generated coordinate information z1 to the main device-side interface unit 16.

The subsequent processes are the same as the processes in the case in which the region AR1 is displayed.

Through the foregoing processes, as illustrated in FIG. 6, the image of the region AR3 is displayed on the second display unit 23 of the remote control device 2.

In this way, the control system 1000 can perform the display position changing process (movement process) using the relative position coordinates when two points are displaced in a predetermined direction while being touched on the second display screen of the remote control device 2.

<<B: Display Enlargement Ratio Changing Process>>

Next, a display enlargement ratio changing process will be described.

Figure 8:
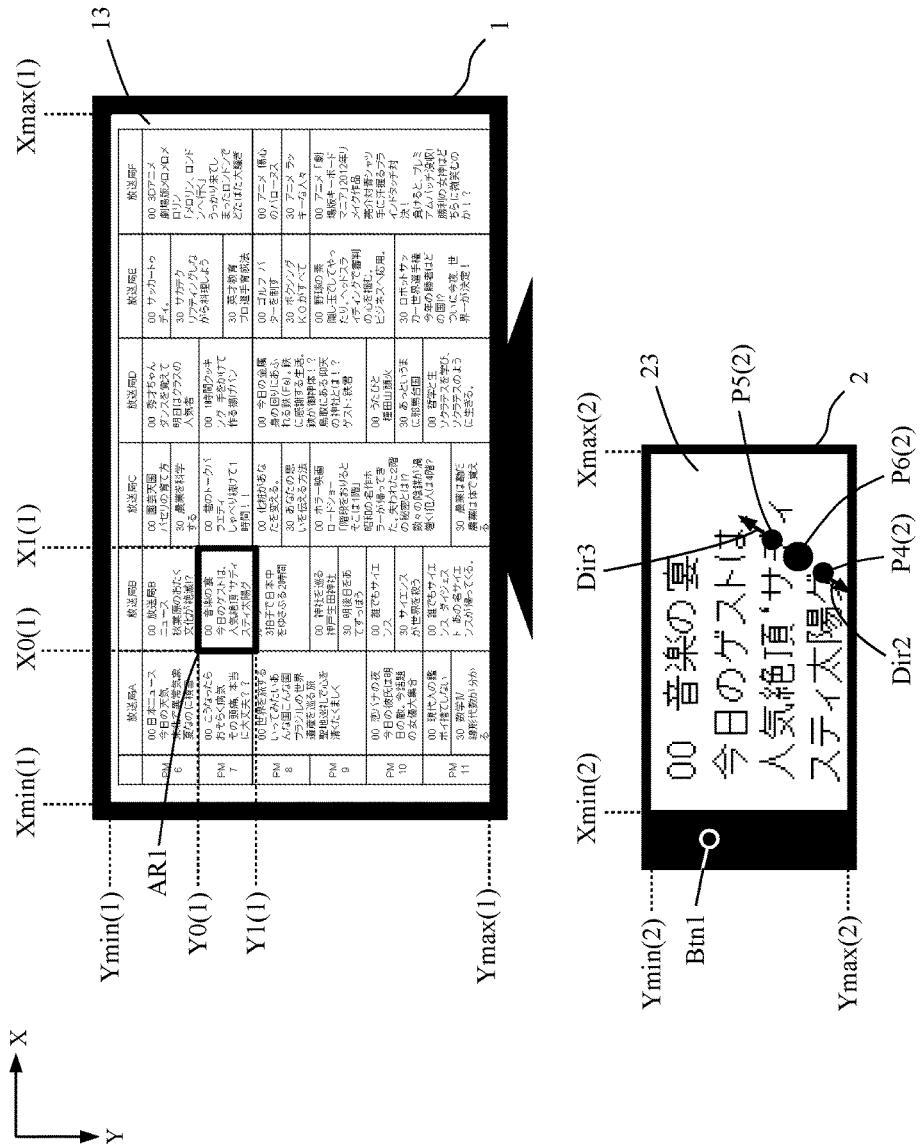
FIG. 8 is an explanatory diagram illustrating a display enlargement ratio changing process.

FIG. 8 is an explanatory diagram illustrating a display enlargement ratio changing process. Specifically, FIG. 8 is a diagram schematically illustrating the control target device 1 and the remote control device 2 and illustrating a state in which a program table is displayed on the first display unit 13 of the control target device 1. FIG. 8 illustrates a state in which a region AR1 of the first display unit 13 is enlarged and displayed on the second display unit 23 of the remote control device 2.

As illustrated in FIG. 8, X and Y axes are configured. As illustrated in FIG. 8, in a region of a display screen of the first display unit 13 of the control target device 1, it is assumed that a minimum value is Xmin(1) and a maximum value is Xmax(1) on the X coordinate and a minimum value is Ymin(1) and a maximum value is Ymax(1) on the Y coordinate.

As illustrated in FIG. 8, in a region of a display screen of the second display unit 23 of the remote control device 2, it is assumed that a minimum value is Xmin(2) and a maximum value is Xmax(2) on the X coordinate and a minimum value is Ymin(2) and a maximum value is Ymax(2) on the Y coordinate.

In the state of FIG. 8, the user configures the "display operation mode" by pressing the button Btn1 of the remote control device 2.

When the user changes a distance between two touched points while touching the two points on the display screen of the second display unit 23 of the remote control device 2 in the state configured in the display operation mode, a display enlargement ratio on the display screen on the first display unit 13 of the control target device 1 can be changed. A central point at the time of a change in the display magnification is a central point between two touched points.

For example, in FIG. 8, when the user displaces a point P4(2) in a direction indicated an arrow Dir2 and simultaneously displaces a point P5(2) in a direction indicated by an arrow Dir3 to increase a distance between the two points while touching the two points, the points P4(2) and P5(2) on the second display unit 23 of the remote control device 2, a display enlargement ratio of an image displayed on the second display unit 23 of the remote control device 2 can be changed. At this time, a central point at the time of the change in the display magnification is a central point P6(2) between the two touched points.

Figure 9:
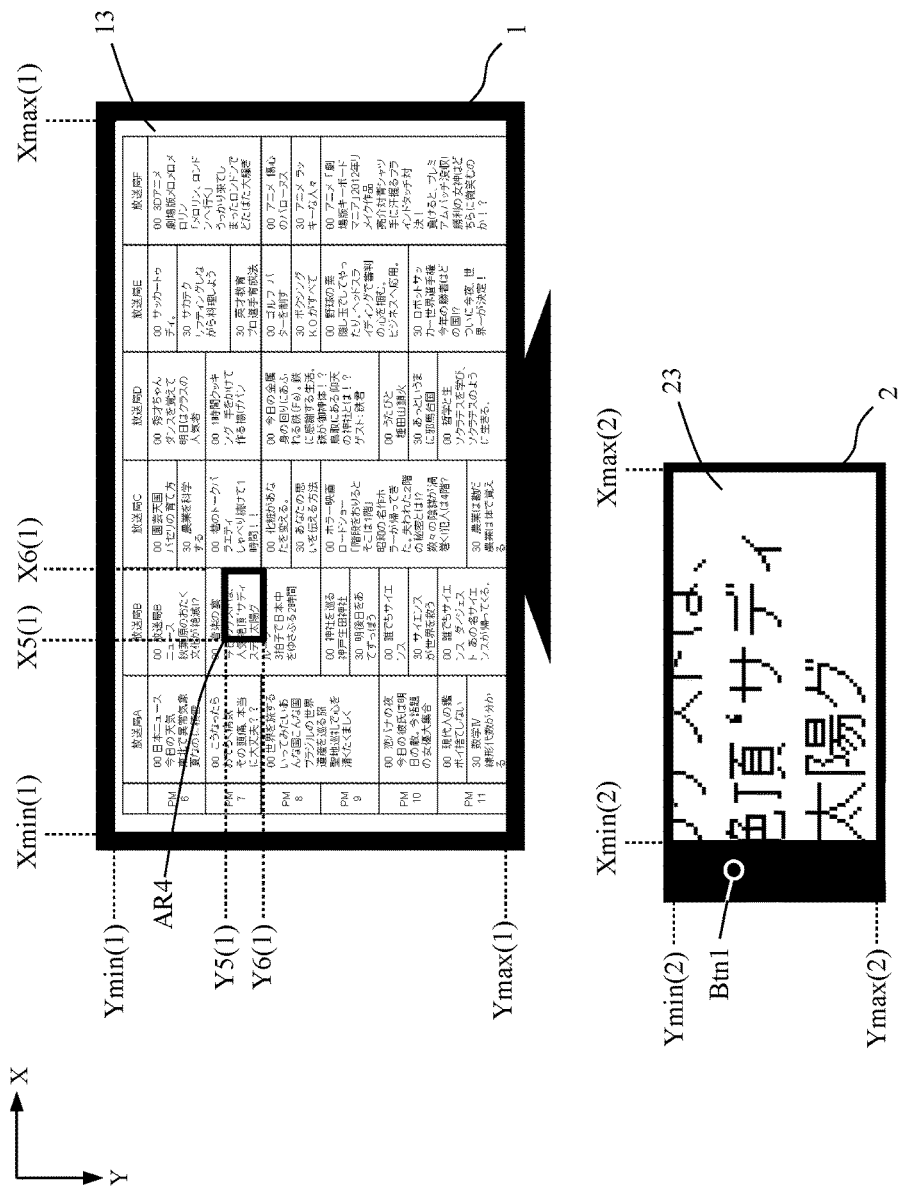
FIG. 9 is a diagram illustrating states of the control target device 1 and the remote control device 2 after the display enlargement ratio changing process is performed.

FIG. 9 is a diagram illustrating states of the control target device 1 and the remote control device 2 after the foregoing operation is performed.

As illustrated in FIG. 9, a region AR4 of the first display unit 13 of the control target device 1 is displayed on the second display unit 23 of the remote control device 2.

An operation of the control system 1000 in a case in which the foregoing operation is performed will be described with reference to FIG. 1.

The description of the same process as the foregoing "A1: Display Position Changing Process Using Absolute Position Coordinates" will be omitted.

In a case in which the user touches two points, points P4(2) and P5(2) illustrated in FIG. 8, on the touch panel 25, the touch panel control unit 24 recognizes that two points are touched based on a signal (a signal indicating a change in the electric field on the touch panel 25) output from the touch panel 25 and detects the coordinate positions of the touched points. In the case of FIG. 8, the coordinate position of the touched point P4(2) and the coordinate position of the touched point P5(2) are acquired as coordinate information.

The touch panel control unit 24 generates the signal Dp1 including detection results, that is, (1) information regarding two touched points and (2) the coordinate positions of the two touched points. Then, the touch panel control unit 24 outputs the generated signal Dp1 to the controller-side modulation unit 212.

The controller-side modulation unit 212 generates the wireless signal Ri by performing the RF modulation process on the signal Dp1. Then, the generated wireless signal Ri is transmitted from the controller-side modulation unit 212 to the main device-side demodulation unit 162.

The main device-side demodulation unit 162 acquires the signal Dp2 corresponding to the signal Dp1 by performing the RF demodulation on the received wireless signal Ri. Then, the acquired signal Dp2 is output to the main device control unit 14.

The main device control unit 14 recognizes (1) the two touched points and (2) the coordinate positions of the two touched points on the touch panel 25 of the remote control device 2 from the signal Dp2.

Further, the main device control unit 14 recognizes that the distance between the two touched points, the points P4(2) and P5(2), is changed in the touched state on the touch panel 25 from the signal Dp2 continuously acquired within a predetermined time through the foregoing processes. Further, a movement speed of the touch points is calculated from a change amount of the movement between the two touched points within the predetermined time.

The main device control unit 14 repeats the foregoing processes to calculate the movement distance of the two touched points until it is confirmed that the two touched points are released from the touch panel 25. Then, a display enlargement ratio is decided based on the calculated movement distance of the two touch points and a region to be newly displayed on the second display unit 23 is decided. In the case of FIG. 8, the region to be newly displayed is assumed to be the region AR4 in FIG. 9.

In this way, when two points are touched and the distance between the two points is changed, the main device control unit 14 performs the display enlargement ratio changing process using the relative position coordinates. That is, in the case of FIGS. 8 and 9, before the display enlargement ratio changing process is performed, the region AR1 (a region of ((X0(1), Y0(1))–(X1(1), Y1(1)))) is configured in a region (a region ((Xmin(2), Ymin(2))–(Xmax(2), Ymax(2)))) on the entire screen of the second display unit 23. After the display enlargement ratio changing process is performed, the region AR4 (a region of ((X5(1), Y5(1))–(X6(1), Y6(1)))) is configured in the region (the region ((Xmin(2), Ymin(2))–(Xmax(2), Ymax(2)))) on the entire screen of the second display unit 23.

The main device control unit 14 performs the display enlargement ratio changing process using the relative position coordinates based on the change amount of the distance between the two points in a case in which it is determined that the two points are touched on the touch panel 25 of the remote control device 2 based on the signal Dp2. That is, in the cases of FIGS. 8 and 9, the main device control unit 14 generates the adjustment signal Adj so that the display of the second display unit 23 is updated from the display of the region AR1 to the display of the region AR4.

Then, the main device control unit 14 outputs the generated adjustment signal Adj to the adjustment unit 15.

The adjustment unit 15 generates the video signal D2 forming the region AR4 from the video signal D1 based on the adjustment signal Adj from the main device control unit 14 and outputs the generated video signal D2 to the main device-side interface unit 16. The adjustment unit 15 generates the coordinate information z1 regarding the region AR4 based on the adjustment signal Adj from the main device control unit 14 and outputs the generated coordinate information z1 to the main device-side interface unit 16.

The subsequent processes are the same as the processes in the case in which the region AR1 is displayed.

Through the foregoing processes, as illustrated in FIG. 9, the image of the region AR4 is displayed on the second display unit 23 of the remote control device 2.

In this way, the control system 1000 can perform the display enlargement ratio changing process when the distance between two touched points is changed while the two points are touched on the second display screen of the remote control device 2.

<<C: Display Angle Changing Process>>

Next, a display angle changing process will be described.

Figure 10:
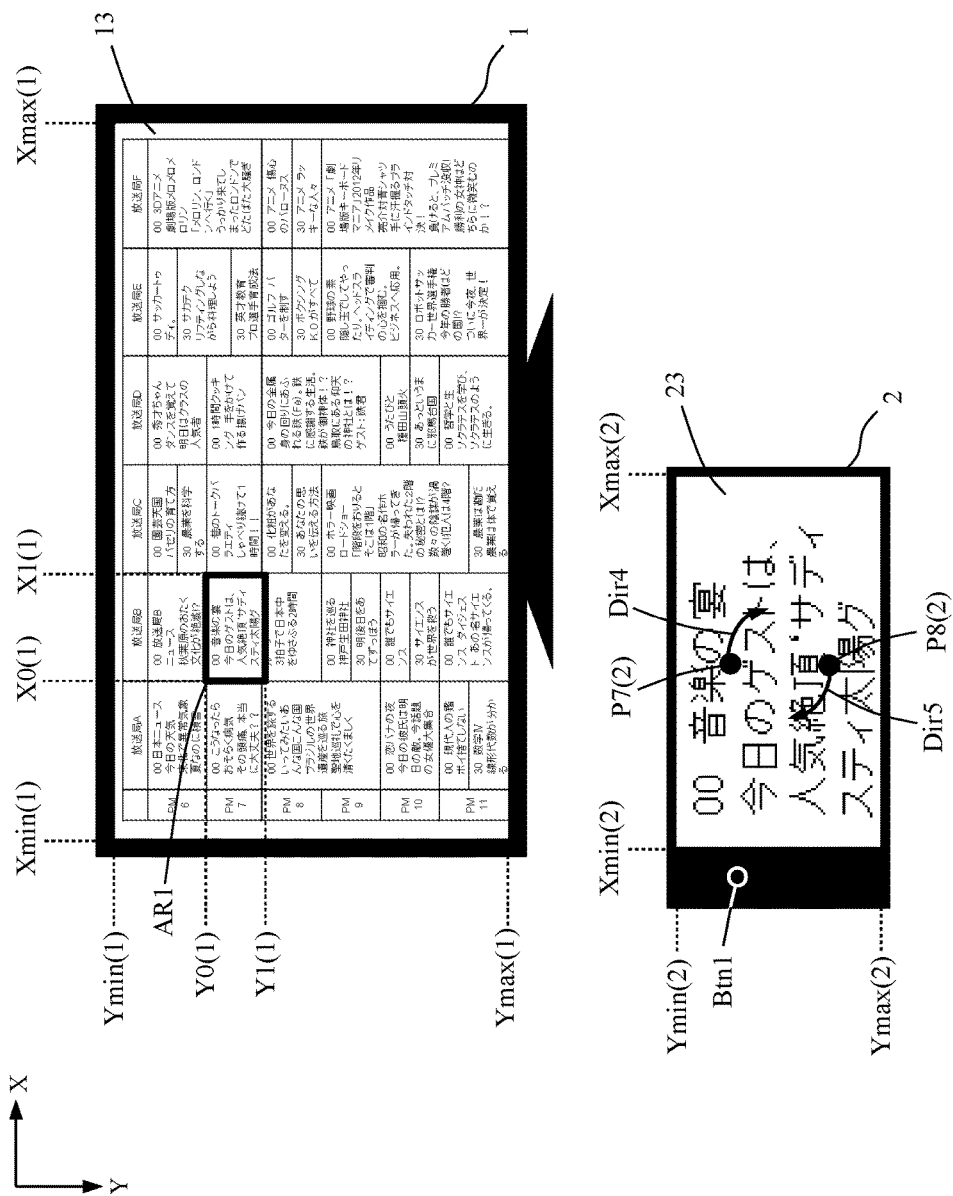
FIG. 10 is an explanatory diagram illustrating a display angle changing process.

FIG. 10 is an explanatory diagram illustrating the display angle changing process. Specifically, FIG. 10 is a diagram schematically illustrating the control target device 1 and the remote control device 2 and illustrating a state in which a program table is displayed on the first display unit 13 of the control target device 1. FIG. 10 illustrates a state in which a region AR1 of the first display unit 13 is enlarged and displayed on the second display unit 23 of the remote control device 2.

As illustrated in FIG. 10, X and Y axes are configured. As illustrated in FIG. 10, in a region of a display screen of the first display unit 13 of the control target device 1, it is assumed that a minimum value is Xmin(1) and a maximum value is Xmax(1) on the X coordinate and a minimum value is Ymin(1) and a maximum value is Ymax(1) on the Y coordinate.

As illustrated in FIG. 10, in a region of a display screen of the second display unit 23 of the remote control device 2, it is assumed that a minimum value is Xmin(2) and a maximum value is Xmax(2) on the X coordinate and a minimum value is Ymin(2) and a maximum value is Ymax(2) on the Y coordinate.

In the state of FIG. 10, the user configures the "display operation mode" by pressing the button Btn1 of the remote control device 2.

When the user displaces two points in a predetermined rotation direction while touching two points on the display screen of the second display unit 23 of the remote control device 2 in the state configured in the display operation mode, a display angle on the display screen of the first display unit 13 of the control target device 1 can be changed. A central point at the time of the change in the display angle may not be changed.

For example, in FIG. 10, when the user displaces two points, points P7(2) and P8(2), on the second display unit 23 of the remote control device 2 in a clockwise direction (a direction of arrows Dir4 and Dir5) while touching the two points, a display angle of an image displayed on the second display unit 23 of the remote control device 2 can be changed. At this time, a central point at the time of the change in the display angle is not changed.

Figure 11:
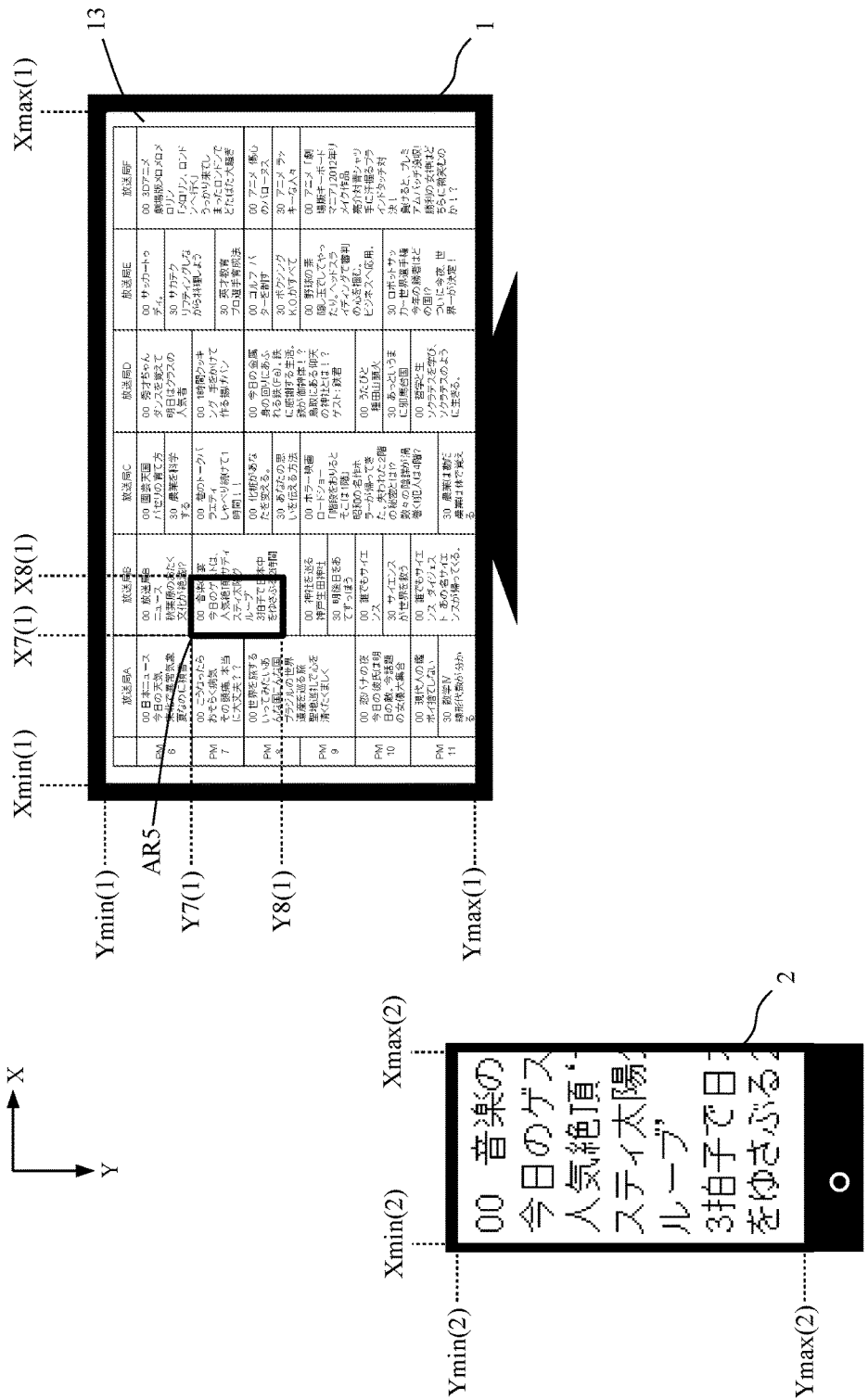
FIG. 11 is a diagram illustrating states of the control target device 1 and the remote control device 2 after the display angle changing process is performed.

FIG. 11 is a diagram illustrating states of the control target device 1 and the remote control device 2 after the foregoing operation is performed.

As illustrated in FIG. 11, the region AR5 of the first display unit 13 of the control target device 1 is displayed on the second display unit 23 of the remote control device 2.

An operation of the control system 1000 in a case in which the foregoing operation is performed will be described with reference to FIG. 1.

The description of the same process as the foregoing "A1: Display Position Changing Process Using Absolute Position Coordinates" will be omitted.

In a case in which the user touches two points, points P7(2) and P8(2) illustrated in FIG. 10, on the touch panel 25, the touch panel control unit 24 recognizes that two points are touched based on a signal (a signal indicating a change in the electric field on the touch panel 25) output from the touch panel 25 and detects the coordinate positions of the two touched points. In the case of FIG. 10, the coordinate position of the touched point P7(2) and the coordinate position of the touched point P8(2) are acquired as coordinate information.

The touch panel control unit 24 generates the signal Dp1 including detection results, that is, (1) information regarding two touched points and (2) the coordinate positions of the two touched points. Then, the touch panel control unit 24 outputs the generated signal Dp1 to the controller-side modulation unit 212.

The controller-side modulation unit 212 generates the wireless signal Ri by performing the RF modulation process on the signal Dp1. Then, the generated wireless signal Ri is transmitted from the controller-side modulation unit 212 to the main device-side demodulation unit 162.

The main device-side demodulation unit 162 acquires the signal Dp2 corresponding to the signal Dp1 by performing the RF demodulation on the received wireless signal Ri. Then, the acquired signal Dp2 is output to the main device control unit 14.

The main device control unit 14 recognizes (1) the two touched points and (2) the coordinate positions of the two touched points on the touch panel 25 of the remote control device 2 from the signal Dp2.

Further, the main device control unit 14 recognizes that the two touched points, the points P7(2) and P8(2), are displaced in the predetermined rotation direction in the touched state on the touch panel 25 from the signal Dp2 continuously acquired within a predetermined time through the foregoing processes.

The main device control unit 14 repeats the foregoing processes to detect the rotation direction of the two touched points until it is confirmed that the two touched points are released from the touch panel 25. Then, a display angle is decided based on the detected rotation direction and a region to be newly displayed on the second display unit 23 is decided. In the case of FIG. 10, the region to be newly displayed is assumed to be the region AR5 in FIG. 11.

In this way, the main device control unit 14 performs the display enlargement ratio changing process using relative position coordinates in a case in which two points are touched and the two touched points are displaced in the predetermined rotation direction. That is, in the case of FIGS. 10 and 11, before the display angle changing process is performed, the region AR1 (a region of ((X0(1), Y0(1))–(X1(1), Y1(1)))) is configured in a region (a region ((Xmin (2), Ymin(2))−(Xmax(2), Ymax(2))) on the entire screen of the second display unit 23. After the display angle changing process is performed, the region AR5 (a region of ((X7(1), Y7(1))−(X8(1), Y8(1))) is configured in the region (the region ((Xmin(2), Ymin(2))−(Xmax(2), Ymax(2))) on the entire screen of the second display unit 23.

The main device control unit 14 performs the display angle changing process using the relative position coordinates based on the rotation direction of the two points in a case in which it is determined that the two points are touched on the touch panel 25 of the remote control device 2 based on the signal Dp2. That is, in the cases of FIGS. 10 and 11, the main device control unit 14 generates the adjustment signal Adj so that the display of the second display unit 23 is updated from the display of the region AR1 to the display of the region AR5 (the region AR5 present at the position at which the region AR1 is rotated in the opposite direction (the counterclockwise direction in the case of FIGS. 10 and 11) to the rotation direction (the clockwise direction in the case of FIGS. 10 and 11) of the two touched points).

Then, the main device control unit 14 outputs the generated adjustment signal Adj to the adjustment unit 15.

The adjustment unit 15 generates the video signal D2 forming the region AR5 from the video signal D1 based on the adjustment signal Adj from the main device control unit 14 and outputs the generated video signal D2 to the main device-side interface unit 16. The adjustment unit 15 generates the coordinate information z1 regarding the region AR5 based on the adjustment signal Adj from the main device control unit 14 and outputs the generated coordinate information z1 to the main device-side interface unit 16.

The subsequent processes are the same as the processes in the case in which the region AR1 is displayed.

Through the foregoing processes, as illustrated in FIG. 11, the image of the region AR5 is displayed on the second display unit 23 of the remote control device 2.

In this way, the control system 1000 can perform the display angle changing process when the two touched points are displaced in the predetermined rotation direction while the two points are touched on the second display screen of the remote control device 2.

In this way, when a predetermined touch operation is performed on the touch panel 25, the processes such as the movement of the display, the change in the display magnification, the change in the display angle can be quickly performed on the second display unit 23 of the remote control device 2 through intuitive operations in the control system 1000.

(1.2.2: Device Operation Mode)

Next, an operation of the control system 1000 in the "device operation mode" will be described.

For example, when the user presses the button Btn1 illustrated in FIG. 2, the control system 1000 is configured to the "device operation mode".

When the control system 1000 is configured to the device operation mode, the processes such as a movement of display, a change in a display magnification, a change in a display angle, and the like on the second display unit 23 of the remote control device 2 are prohibited.

That is, in a case in which the mode information mode is configured to the "device operation mode", the touch panel control unit 24 includes the mode information mode indicating that the mode information mode is configured to the "device operation mode" in the signal Dp1. Then, the touch panel control unit 24 outputs the generated signal Dp1 to the controller-side modulation unit 212.

The controller-side modulation unit 212 generates the wireless signal Ri by performing the RF modulation process on the signal Dp1. Then, the generated wireless signal Ri is transmitted from the controller-side modulation unit 212 to the main device-side demodulation unit 162.

The main device-side demodulation unit 162 acquires the signal Dp2 corresponding to the signal Dp1 by performing the RF demodulation on the received wireless signal Ri. Then, the acquired signal Dp2 is output to the main device control unit 14.

The main device control unit 14 recognizes that the device operation mode is configured from the signal Dp2 and enables a device operation to be performed in each functional unit of the control target device. The main device control unit 14 enables the processes such as a movement of display, a change in a display magnification, a change in a display angle, and the like not to be performed in the second display unit 23 by outputting no adjustment signal Adj to the adjustment unit 15.

The main device control unit 14 ascertains assignment correspondence between display of the second display unit 23 of the remote control device 2 and a predetermined device operation, and performs the device operation assigned to a region in a case in which the region to which the predetermined device operation is assigned is touched on the touch panel 25. For example, in a case in which a region in which information regarding of each program of the program table is displayed is assigned to a device operation of viewing the program in FIG. 2, the user can view the program by touching a region on the touch panel corresponding to the region in which the information regarding each program is displayed.

As illustrated in FIG. 2, when a region of a displayed program (for example, a region of a program "Music Festival" in FIG. 2) is displayed on the second display unit 23 of the remote control device 2, the user can view the program (for example, the program "Music Festival" in FIG. 2) by touching a display region of the program (for example, a display region of the program "Music Festival" in FIG. 2) in the device operation mode.

That is, when the main device control unit 14 ascertains that the position touched on the touch panel 25 is within the display region of the program "Music Festival" through the foregoing process in the device operation mode, the main device control unit 14 controls each functional unit (performs channel switch control or the like to control a video of a desired program such that the video is displayed on the first display unit 13) so that the user can view the program "Music Festival" in the control target device 1.

In this way, the control system 1000 can cause the control target device 1 to perform a predetermined device operation when the user touches a region displayed on the second display unit 23 of the remote control device 2 and assigned to a predetermined device operation in the "device operation mode".

As described above, the control system 1000 causes the remote control device 2 to display a display screen of a television receiver (control target device) including a high-resolution display device so that the processes such as the movement in the display, the change in the display magnification, the change in the display angle, and the like can be quickly performed through intuitive operations in the "display operation mode". Further, the control system 1000 can simply cause the control target device 1 to perform a predetermined device operation in the "device operation mode" when the user touches a region displayed on the second display unit 23 of the remote control device 2 and assigned to the predetermined device operation.

Second Embodiment

Next, a second embodiment will be described.

The same reference numerals are given to the same portions as those of the foregoing embodiment and the detailed description thereof will be omitted.

Figure 12:
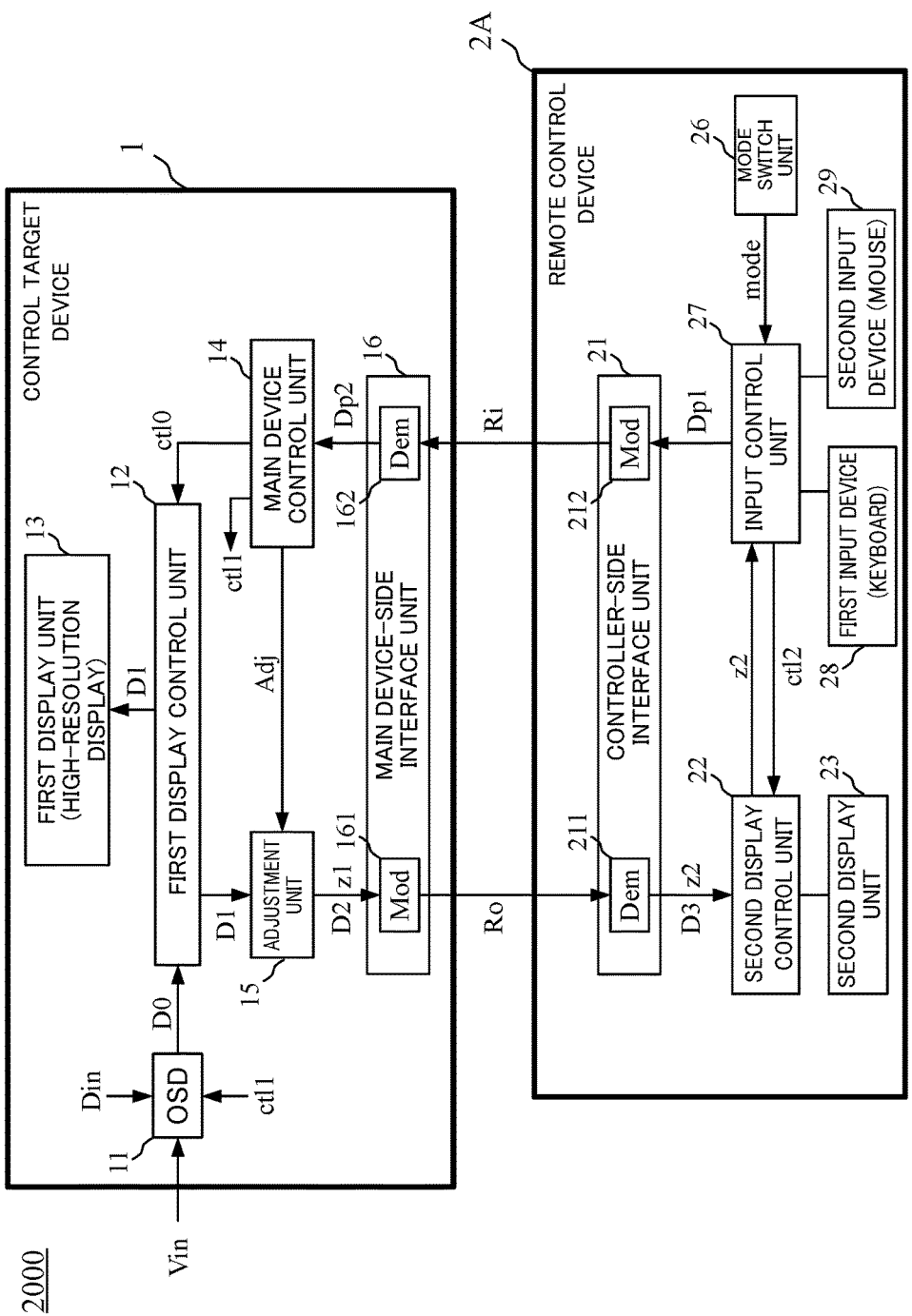
FIG. 12 is a diagram illustrating a schematic constitution of a control system 2000 according to a second embodiment.

FIG. 12 is a diagram illustrating a schematic constitution of a control system 2000 according to the second embodiment.

As illustrated in FIG. 12, a control system 2000 has a constitution in which the remote control device 2 of the control system 1000 according to the first embodiment is substituted with a remote control device 2A.

As illustrated in FIG. 12, the remote control device 2A has a constitution in which the touch panel 25 and the touch panel control unit 24 of the remote control device 2 are substituted with an input control unit 27, a first input device 28, and a second input device. The other remaining constitution of the remote control device 2A is the same as that of the remote control device 2.

In the control system 2000, the remote control device 2A including no touch panel can perform the same processes as those of the first embodiment.

Hereinafter, to facilitate the description, a case in which the first input device 28 is a keyboard and the second input device is a mouse with a wheel will be described.

At the time of switch between the "display operation mode" and the "device operation mode", as in the first embodiment, a process of switching between the "display operation mode" and the "device operation mode" may be performed by installing a predetermined button in the remote control device 2A and pressing the button. The process of switching between the "display operation mode" and the "device operation mode" may be performed with a predetermined key of the keyboard serving as the first input device 28. The process of switching between the "display operation mode" and the "device operation mode" may be performed by realizing a predetermined display on the second display device of the remote control device 2A and selecting the display.

The input control unit 27 inputs a signal indicating a predetermined key state of the keyboard serving the first input device 28 and a signal indicating a state of the mouse serving as the second input device 29. The input control unit 27 outputs a control signal ct12 including a signal indicating information regarding the position of the mouse to the second display control unit 22 so that a mouse point corresponding to the position of the mouse is displayed on the second display unit 23.

The second display control unit 22 displays a mouse cursor indicating the position of the mouse on the second display unit 23 based on the control signal ct12.

In the "display operation mode", the control system 2000 assigns, for example, the following operations to (A1) a display position changing process using absolute position coordinates, (A2) a display position changing process using relative position coordinates, (B) a display enlargement ratio changing process, and (C) a display angle changing process.

(A1) Display Position Changing Process Using Absolute Position Coordinates:

A user specifies one point on a display screen of the second display unit 23 through a left click operation of the mouse. Then, coordinate information regarding the specified one point is acquired by the input control unit 27 and is included in the signal Dp1 to be output to the controller-side interface unit 21. That is, an operation of specifying one point on the display screen of the second display unit 23 through the left click operation of the mouse according to the embodiment corresponds to an operation equivalent to a touch of one point on the touch panel 25 according to the first embodiment.

The subsequent processes are the same as those of the first embodiment.

As in the first embodiment, according to the embodiment, the display position changing process using the absolute position coordinates can also be performed by performing an operation of specifying one point on the display screen of the second display unit 23.

(A2) Display Position Changing Process Using Relative Position Coordinates:

The user performs a process of displacing a display position on the display screen of the second display unit 23 through an operation of dragging the mouse while performing a left click of the mouse. That is, the control system 2000 can perform the display position changing process using the relative position coordinates by performing the foregoing operation, as in the first embodiment.

(B) Display Enlargement Ratio Changing Process:

The user performs a process of changing a display enlargement ratio of the display screen of the second display unit 23 by performing an operation of rotating the wheel of the mouse.

(C) Display Angle Changing Process:

The user performs the display angle changing process on the second display unit 23 by pressing a predetermined key (for example, a shift key or a control key) of the keyboard, and performing a left click of the mouse and dragging the mouse in a predetermined rotation direction.

As described above, the control system 2000 can perform processes such as a movement in the display of the remote control device 2, a change in a display magnification, a change in a display angle, and the like in the "display operation mode" through intuitive operations, as in the first embodiment, by assigning predetermined operations using the remote control device 2A with no touch panel.

The assignment of operations carried out to perform the processes such as a movement in the display of the remote control device 2, a change in a display magnification, a change in a display angle, and the like in the "display operation mode" are not limited to the foregoing assignment, but other operations may be assigned.

The control system 2000 can cause the control target device 1 to simply perform a predetermined device operation by selecting a region displayed on the second display unit 23 of the remote control device 2A and assigned to the predetermined device operation through, for example, a click of the mouse in the "device operation mode".

Third Embodiment

Next, a third embodiment will be described.

The same reference numerals are given to the same portions as those of the foregoing embodiments and the detailed description thereof will be omitted.

Figure 13:
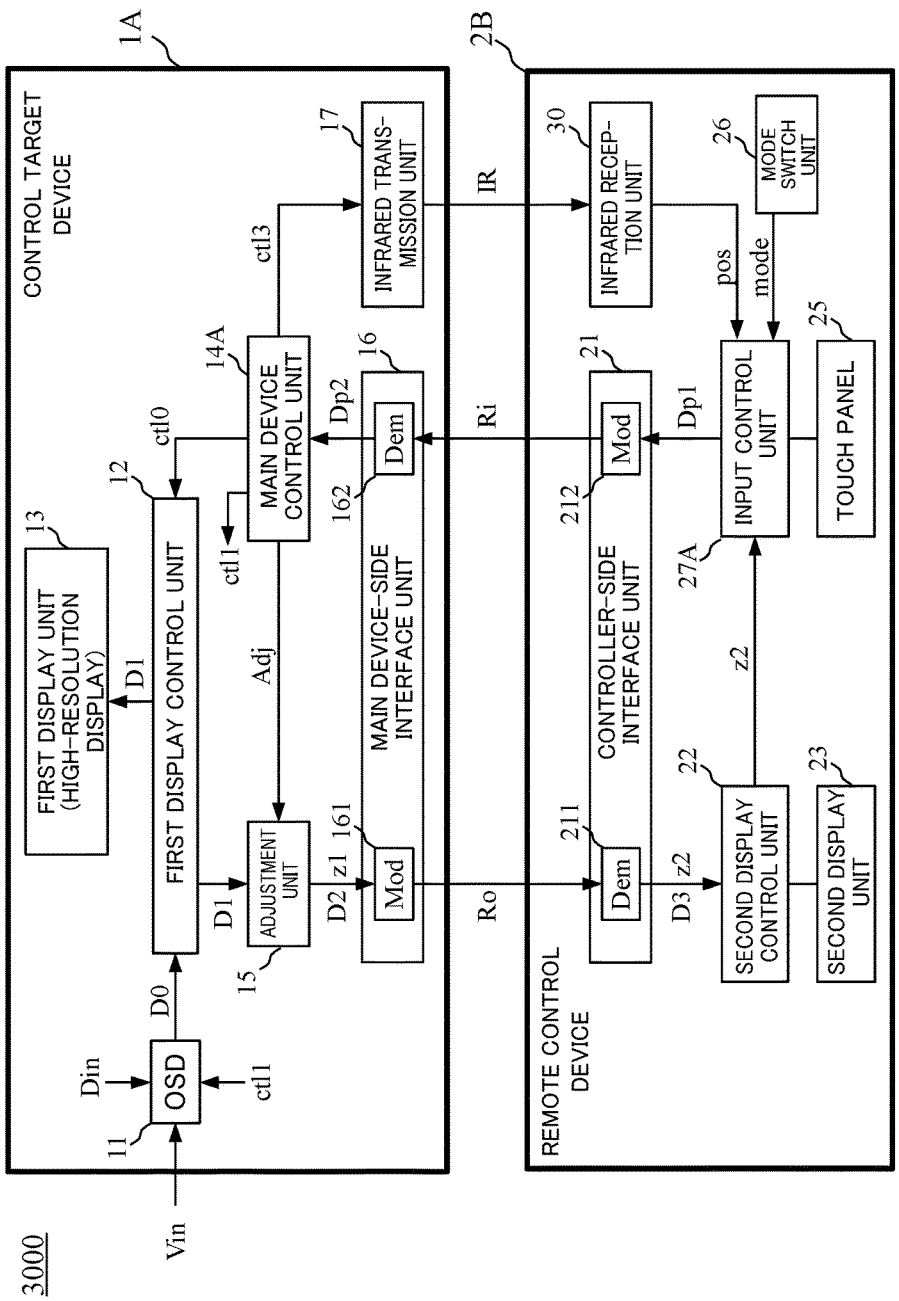
FIG. 13 is a diagram illustrating a schematic constitution of a control system 3000 according to a third embodiment.

FIG. 13 is a diagram illustrating a schematic constitution of a control system 3000 according to the third embodiment.

Figure 14:
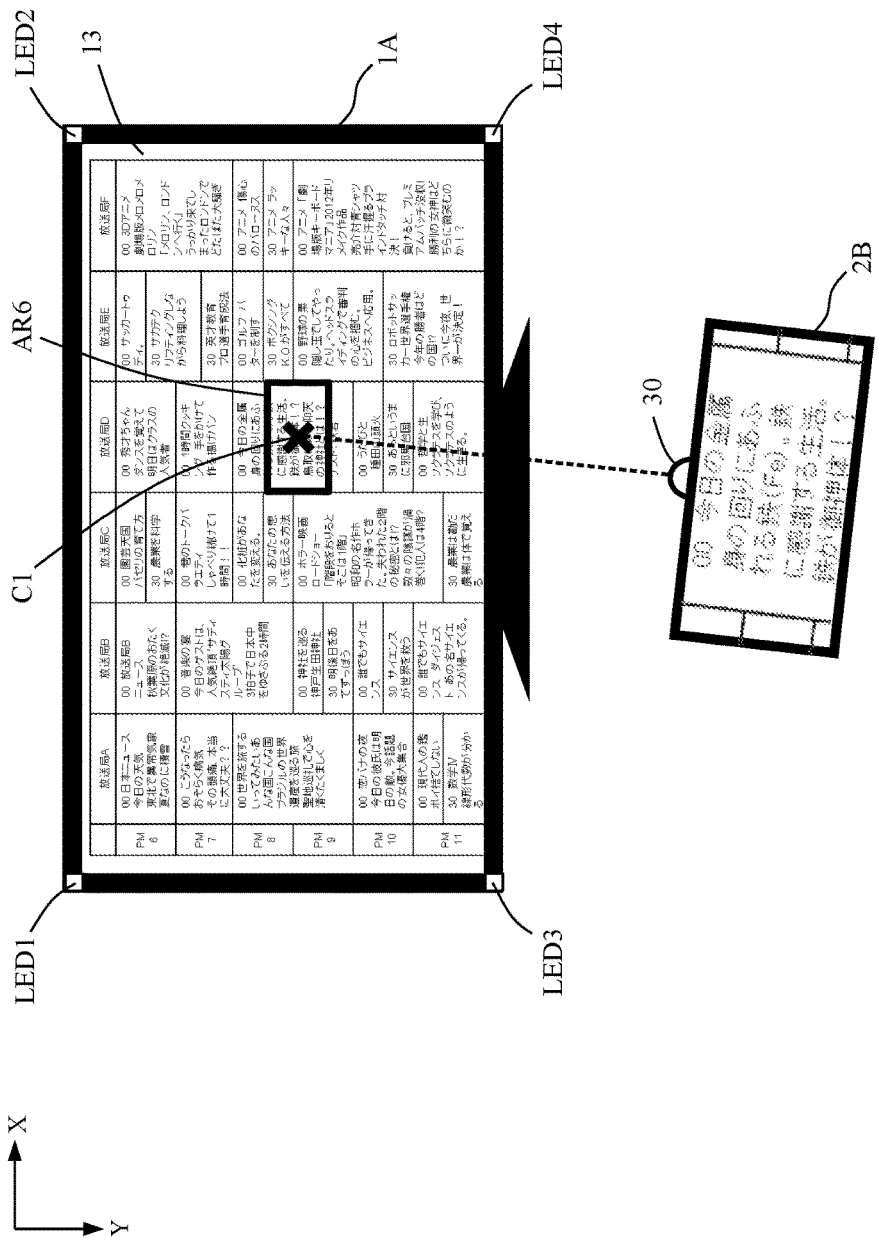
FIG. 14 is a diagram schematically illustrating a control target device 1A and a remote control device 2B of the control system 3000 according to the third embodiment.

FIG. 14 is a diagram schematically illustrating a control target device 1A and a remote control device 2B of the control system 3000 according to the third embodiment.

As illustrated in FIG. 13, a control system 3000 has a constitution in which the control target device 1 of the control system 1000 according to the first embodiment is substituted with the control target device 1A and the remote control device 2 is substituted with the remote control device 2B.

As illustrated in FIG. 13, the control target device 1A has a constitution in which the main device control unit 14 of the control target device 1 is substituted with a main device control unit 14A and an infrared transmission unit 17 is added.

The main device control unit 14A generates a control signal ct13 for controlling the infrared transmission unit 17 in addition to the same function as that of the first embodiment and outputs the control signal ct13 to the infrared transmission unit 17.

The infrared transmission unit 17 radiates infrared light based on the control signal ct13 from the main device control unit 14A. As illustrated in FIG. 14, the infrared transmission unit 17 includes four infrared light-emitting diodes LED1 to LED4 installed at four corners of the outer circumference of the first display unit of the control target device 1A. The infrared transmission unit 17 radiates infrared beams (infrared light) IR from the four infrared light-emitting diodes LED1 to LED4 to the outside.

As illustrated in FIG. 13, the remote control device 2B has a constitution in which the touch panel control unit 24 of the remote control device 2 is substituted with an input control unit 27A and an infrared reception unit 30 is added.

The input control unit 27A has the same function as the touch panel control unit 24. A signal pos output from the infrared reception unit 30 is input to the input control unit 27A. The input control unit 27A is different from the touch panel control unit 24 in this point.

The infrared reception unit 30 receives an infrared beam (infrared light) IR radiated from the infrared transmission unit 17 of the control target device 1A and acquires coordinate information on the first display unit 13 indicated by the infrared reception unit 30 of the remote control device 2B from the received infrared beam IR. The infrared reception unit 30 is, for example, infrared imaging device (infrared camera).

For example, in the case of FIG. 14, the infrared reception unit 30 acquires a captured image so that the LED1 to the LED4 which are infrared LEDs are included. In consideration of imaging parameters (a diaphragm, a view angle, a focal distance, and a zoom magnification) of the infrared reception unit 30 and the direction of an optical axis of an optical system of the infrared reception unit 30, a point C1 (for example, the point C1 illustrated in FIG. 14) which is on an extension line of the optical axis of the infrared reception unit 30 and is on a display screen of the first display unit 13 is detected from a positional relation among the LED1 to the LED4 on the acquired captured image.

The infrared reception unit 30 acquires coordinate information regarding the point C1 acquired in this way (coordinate information on absolute position coordinates set on the display screen of the first display unit 13). Then, the infrared reception unit 30 outputs the signal pos indicating the acquired coordinate information regarding the point C1 to the input control unit 27A.

Depending on an inclination of the remote control device 2B, that is, an angle of the optical axis of the optical system of the infrared reception unit 30, the infrared light IR from the four infrared light-emitting diodes LED1 to LED4 of the infrared transmission unit 17 may not be sufficiently received in some cases. In this case, for example, the infrared light is radiated from only the infrared light-emitting diodes LED1 and LED2 for a certain period T1, and the infrared light is radiated from only the infrared light-emitting diodes LED3 and LED4 for a period T2 (the period T2 with the same length as the period T1) subsequent to the period T1. That is, the radiation from the infrared light-emitting diodes LED1 and LED2 and the radiation from the infrared light-emitting diodes LED3 and LED4 are alternately performed (the upper and lower LEDs are alternately turned on and off in a time division manner). Thus, even in a case in which the remote control device 2B is inclined, that is, the optical axis of the optical system of the infrared reception unit 30 is inclined, it is possible to detect a front to which the optical axis of the optical system of the infrared reception unit 30 is oriented with high precision. That is, even in a case in which the remote control device 2B is inclined, an intersection C1 between the optical axis of the optical system of the infrared reception unit 30 and a display surface of the first display unit 13 can be detected with high precision.

In a case in which there is an infrared light radiated from the control target device 1A, it may be determined that the infrared light-emitting diodes LED1 to LED4 are present in regions with greater luminance than a predetermined value in an image captured by the infrared reception unit 30.

As described above, the signal pos indicating the coordinate information regarding the intersection C1 between the optical axis of the optical system of the infrared reception unit 30 and the display surface of the first display unit 13, which is acquired by the infrared reception unit 30, is input to the input control unit 27.

In the input control unit 27A, the coordinate information regarding the intersection C1 between the optical axis of the optical system of the infrared reception unit 30 and the display surface of the first display unit 13 is included in the signal Dp1 based on the input signal pos. That is, in the first embodiment, coordinate information regarding a touched point acquired in a case of touching one point on the touch panel 25 is included in the signal Dp1 and the display position changing process using the absolute position coordinates is performed. In the embodiment, by including coordinate information regarding the intersection C1 between the optical axis of the optical system of the infrared reception unit 30 and the display surface of the first display unit 13, which is acquired through the foregoing process, in the signal Dp1, it is possible to perform the display position changing process using the absolute position coordinates.

The input control unit 27A may include the coordinate information regarding the intersection C1 in the signal Dp1 in a case in which it is detected that the intersection C1 between the optical axis of the optical system of the infrared reception unit 30 and the display surface of the first display unit 13 is moved by a constant distance D_th1 or more. Thus, only when the intersection C1 is moved by the constant distance or more, the display position changing process is performed. That is, when the coordinate information regarding the intersection C1 between the optical axis of the optical system of the infrared reception unit 30 and the display surface of the first display unit 13 is normally included in the signal Dp1, sensitivity is considerably good. Then, the display position changing process is frequently performed, and thus operability may rather deteriorate for the user. Accordingly, as described above, in the case in which it is detected that the intersection C1 between the optical axis of the optical system of the infrared reception unit 30 and the display surface of the first display unit 13 is moved by the constant distance D_th1 or more, the display position changing process is appropriately performed by including the coordinate information regarding the intersection C1 in the signal Dp1. Therefore, it is possible to improve the operability.

The distance D_th1 may be set arbitrarily by the user.

The input control unit 27A may include coordinate information regarding a point C2 (where the coordinates of the point C2 are referred to as (x_C2, y_C2)) shifted by a predetermined distance d0 in a predetermined direction from the intersection C1 (the coordinates of the intersection C1 are referred to as (x_C1, y_C1)) between the optical axis of the optical system of the infrared reception unit 30 and the display surface of the first display unit 13 in the signal Dp1. That is, the input control unit 27A may include the coordinate information regarding the point C2 acquired through a process corresponding to a function of acquiring a square root of sqrt(x): x in the signal Dp1:

(x_C2,y_C2)=(x_C1,y_C1)+(a,b); and d0=sqrt(a^2+b^2).

In this way, by including the coordinate information regarding the point C2 shifted by the predetermined distance in the predetermined direction from the intersection C1 between the optical axis of the optical system of the infrared reception unit 30 and the display surface of the first display unit 13 in the signal Dp1, it is possible to perform the display position changing process using the absolute position coordinates.

When the intersection C1 between the optical axis of the optical system of the infrared reception unit 30 and the display surface of the first display unit 13 is used as a standard point (for example, a central point of the display screen of the second display unit 23) of the display position changing process without change, the operability may deteriorate depending on a fitted-position of the infrared reception unit 30 (camera), an angle of the optical axis of the optical system of the infrared reception unit 30 with respect to the display screen of the second display unit 23.

For example, in a case in which the infrared reception unit 30 (camera) is mounted upward with respect to the display screen of the second display unit 23, that is, a case in which the optical axis of the optical system of the infrared reception unit 30 (camera) is inclined upward with respect to the display screen of the second display unit 23, the intersection C1 between the optical axis of the optical system of the infrared reception unit 30 and the display surface of the first display unit 13 is located above a line intersection between a plane including the display screen of the second display unit 23 and the display surface of the first display unit 13 on the display surface of the first display unit 13. That is, in this case, the user easily feels that the operability deteriorates since the intersection C1 is located above a region (a region near the line intersection between the plane including the display screen of the second display unit 23 and the display surface of the first display unit 13) easily observed by the user on the display surface of the first display unit 13.

Accordingly, in the foregoing case, by using the point C2 shifted downward the display surface of the first display unit 13 from the intersection C1 between the optical axis of the optical system of the infrared reception unit 30 and the display surface of the first display unit 13 as a standard point (for example, a central point of the display screen of the second display unit 23) of the display position changing process, it is possible to improve the operability of the user.

That is, in the control system 3000, by performing the foregoing process using the point C2 shifted by the predetermined distance in the predetermined direction in correspondence to a situation such as the fitted position at any fitted-position of the infrared reception unit 30 (camera), any angle of the optical axis of the optical system of the infrared reception unit 30 with respect to the display screen of the second display unit 23, or the like, it is possible to ensure good operability. A shift amount for acquiring the point C2 may be an amount which can be configured (input) by the user.

The process on the signal Dp1 output by the input control unit 27A is the same as that of the first embodiment.

In this way, in the control system 3000 according to the embodiment, by changing the direction of the remote control device 2B, it is possible to perform the display position changing process using the absolute position coordinates. Therefore, it is possible to further improve the operability.

In the control system 3000 according to the embodiment, the display enlargement ratio changing process, the display angle changing process, and the process in the device operation mode can also be performed in the same manners as those of the first embodiment.

In the control system 3000 according to the embodiment, for example, a button for deciding whether to change a display position may be added to the remote control device 2B. That is, as in the first embodiment, a button for switching between the "display operation mode" and the "device operation mode" (which is referred to as a "button 1") and a button for deciding whether to change a display position (which is referred to as a "button 2") may be installed in the remote control device 2B according to the embodiment.

That is, in the embodiment, the following four modes may be configured by turning on and off the buttons 1 and 2:

(1) device operation mode 1 which is a mode in which an operation on the control target device 1A and the display position changing process are possible;

(2) device operation mode 2 which is a mode in which only an operation on the control target device 1A is possible;

(3) display operation mode 1 which is a mode in which the display position changing process, the display enlargement ratio changing process, and the display angle changing process are possible; and (4) display operation mode 2 which is a mode in which the display enlargement ratio changing process and the display angle changing process are possible.

Information regarding the four modes may be included in the mode information mode output from the mode switch unit 26.

As described above, by performing control in the four modes, it is possible to prevent the display position changing process unintended by the user from being performed when a direction of the remote control device 2B is changed.

Fourth Embodiment

Next, a fourth embodiment will be described.

The same reference numerals are given to the same portions as those of the foregoing embodiment and the detailed description thereof will be omitted.

Figure 15:
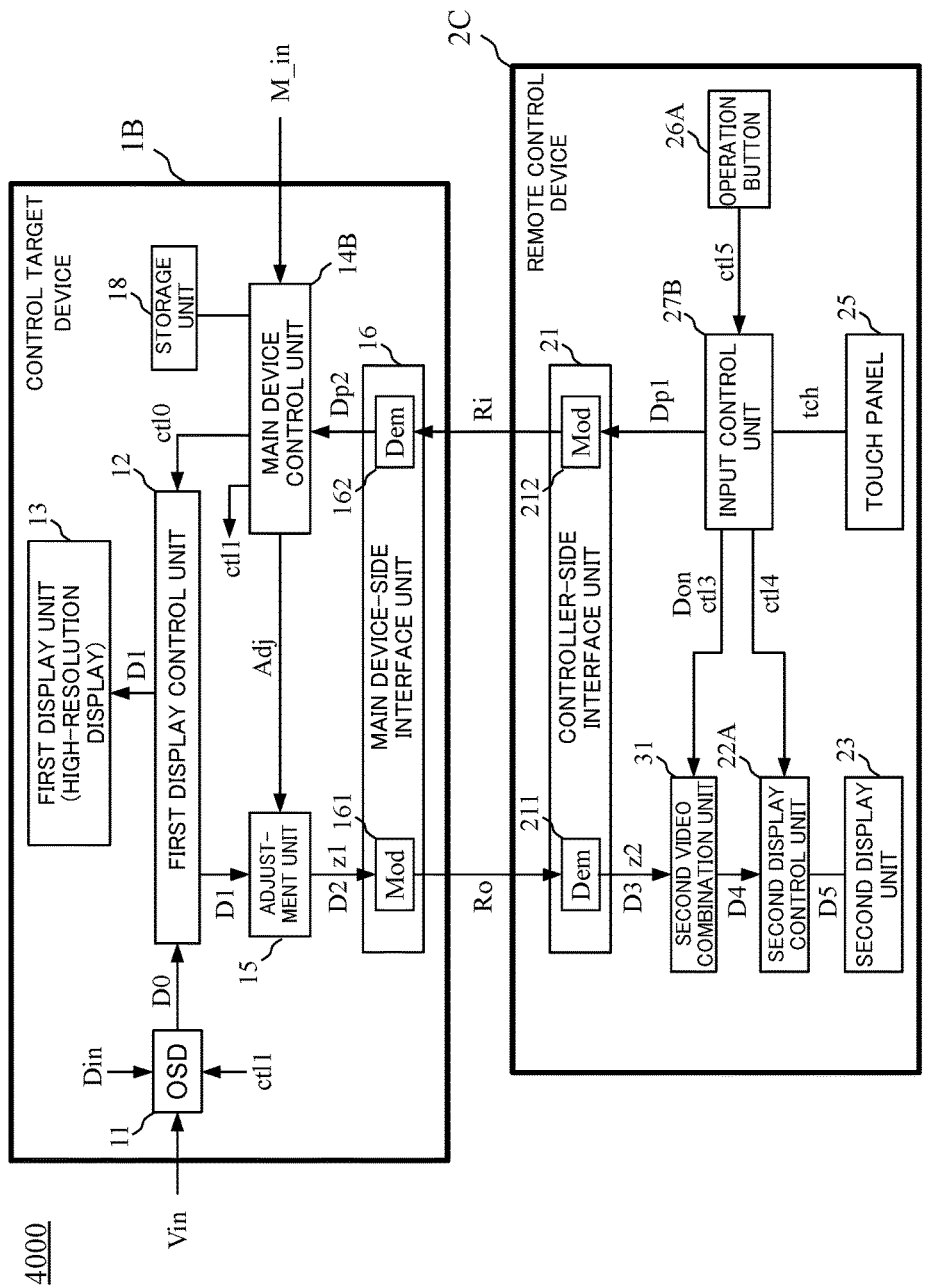
FIG. 15 is a diagram illustrating a schematic constitution of a control system 4000 according to a fourth embodiment.

FIG. 15 is a diagram illustrating a schematic constitution of a control system 4000 according to the fourth embodiment.

<4.1: Constitution of Control System>

As illustrated in FIG. 15, the control system 4000 has a constitution in which the control target device 1 of the control system 1000 according to the first embodiment is substituted with the control target device 1B and the remote control device 2 is substituted with the remote control device 2C.

In the control system 4000 according to the fourth embodiment, a marker clarifying where an image displayed on the second display unit 23 of the remote control device 2C is shown on an image displayed on the first display unit 13 of the control target device 1B is displayed on the mage displayed on the first display unit 13. Thus, the user can easily understand where the image displayed on the remote control device 2C is shown on the image displayed on the control target device 1B, and thus it is possible to improve operability.

The control target device 1B has a constitution in which the main device control unit 14 of the control target device 1A according to the first embodiment is substituted with a main device control unit 14B and a storage unit 18 is added.

The main device control unit 14B receives a signal Dp2 from the remote control device 2C via the main device-side interface unit 16 and acquires information (display operation information, device operation information, information indicating an operation state and a display state of the remote control device 2C, information indicating display/non-display of the marker, and the like) included in the signal Dp2.

The main device control unit 14B generates a control signal ct10 for controlling the first display control unit 12, a control signal ct11 for controlling the video combination unit 11, and an adjustment signal Adj for adjusting a video to be transmitted to the remote control device 2C based on information acquired from the remote control device 2C.

The main device control unit 14B outputs the generated control signal ct10 to the first display control unit 12.

The main device control unit 14B outputs the generated control signal ct11 to the video combination unit 11. The main device control unit 14B includes information regarding display/non-display of the marker, information regarding the kind, display position, size, and angle of the marker, or the like in the control signal ct11 based on the information indicating display/non-display of the marker and the display information in the remote control device 2C.

The main device control unit 14B outputs the adjustment signal Adj to the adjustment unit 15.

The main device control unit 14B inputs first marker information M_in which is information regarding the marker transmitted in conjunction with the video data Vin. The first marker information is information regarding a marker configured in advance by a transmission side and is, for example, information regarding a default size, shape, or the like of the marker displayed in the control system 4000. Since the marker can be configured based on the first marker information M_in received by the control system 4000, a labor such as configuring of the information regarding the marker is omitted in the control system 4000.

The main device control unit 14B stores the input first marker information M_in in the storage unit 18.

The main device control unit 14B is connected to the storage unit 18, as illustrated in FIG. 15. In a case in which information indicating that a marker storing operation is performed is acquired from the remote control device 2C based on the signal Dp2, the main device control unit 14B stores the information regarding the kind of marker, a position of the marker, a size of the marker displayed on the first display unit 13 at the time of the acquisition as second marker information in the storage unit 18.

In a case in which information indicating that a marker calling operation is performed is acquired from the remote control device 2C based on the signal Dp2, the main device control unit 14B reads some or all of the second marker information regarding the marker from the storage unit 18 based on the information and includes the read second marker information in the control signal ct11 to output the control signal to the video combination unit 11. The main device control unit 14B outputs the adjustment signal Adj corresponding to the marker information. The adjustment unit 15 acquires the adjustment signal Adj and acquires an adjusted video signal D2 forming a video region (image region) to be displayed by the remote control device 2 from the video signal D1 based on the acquired adjustment signal Adj. The adjustment unit 15 outputs the acquired adjusted video signal D2 and coordinate information z1 for specifying the image region formed by the adjusted video signal D2 to the main device-side modulation unit 161 of the main device-side interface unit 16.

In this way, the main device control unit 14B calls (acquires) the marker information stored in the storage unit 18, and thus the image region at the time of storing the marker information is displayed on the second display unit. Therefore, it is possible to omit a labor in which the user readjusts the display position of the second display unit 23.

The storage unit 18 is connected to the main device control unit 14B and performs a data reading process and a data writing process in response to instructions from the main device control unit 14B.

As illustrated in FIG. 15, the remote control device 2C includes a controller-side interface unit 21, a second video combination unit 31, a second display control unit 22A, a second display unit 23, a touch panel 25, an operation button 26A, and an input control unit 27B.

The controller-side interface unit 21, the second display unit 23, and the touch panel 25 are the same as those of the first embodiment.

The second video combination unit 31 inputs the video signal D3 output from the controller-side interface unit 21, a superimposition video signal Don (the video signal Don generated based on information regarding an operation button, state display information, or the like) output from the input control unit 27B, and the control signal ct13 including video combination adjustment information output from the input control unit 27B. The second video combination unit 31 generates a video signal D4 by combining the video signal D3 and the video signal Don based on the information. Then, the second video combination unit 31 outputs the generated video signal as the combined video signal D4 to the second display control unit 22A. The video signal Don is a display video of a user operation button or a device state.

The second display control unit 22A input the combined video signal D4 output from the second video combination unit 31 and a control signal ct14 output from the input control unit 27. The second display control unit 22A outputs the combined video signal D4 as a video signal D5 to the second display unit 23 according to the control signal ct14.

For example, the operation button 26A is installed in the casing of the remote control device 2C. When the user presses the operation button 26A, a function assigned to the operation button 26A is realized. As illustrated in FIG. 15, a signal ct15 indicating operation information of the operation button 26A is output to the input control unit 27B. Any number of operation buttons 26A may be used. For example, four buttons (for example, buttons Btn1 to Btn4 illustrated in FIG. 16 and the like) may be installed as the operation buttons 26A in the casing of the remote control device 2C.

The touch panel 25 outputs a signal tch including coordinate information regarding a touched position obtained from a touch operation to the input control unit 27B.

The signal ct15 indicating the operation information of the operation button 26A output from the operation button 26A and the signal tch including the coordinate information regarding the touched position output from the touch panel 25 are input to the input control unit 27B. The input control unit 27B generates the video signal Don for combining with the video signal D3 based on the operation information of the operation button included in the signal ct15 and touch panel operation information included in the signal tch, and then outputs the generated video signal Don to the second video combination unit 31. A video by the video signal Don is, for example, a video clarifying an operation button state or a video clarifying state display information of a control unit system. The input control unit 27B generates the control signal ct13 including the video combination adjustment information (information regarding a combination position and size of a combined video) necessary in a case in which of the video signal D3 and the video signal Don are combined and outputs the generated control signal ct13 to the second video combination unit 31.

The input control unit 27B generates the control signal ct14 including the display control information and outputs the generated control signal ct14 to the second display control unit 22A.

The input control unit 27B generates the signal Dp1 including the display state information of the remote control device 2C and control information of the control target device 1B and outputs the signal Dp1 to the controller-side modulation unit 212 of the controller-side interface unit 21. The control information included in the signal Dp1 includes the information indicating display/non-display of the marker.

As in the first to third embodiments, the mode switch unit 26 is installed in the remote control device 2C, and the mode switch unit 26 may output the information (mode information) mode indicating a mode to the input control unit 27B.

In the remote control device 2C according to the embodiment, (1) the device operation mode and (2) the display operation mode are switched through operations on the operation button 26A and/or the touch panel 25. In the remote control device 2C according to the embodiment, for example, the mode may be switched through the following operations:

(1) the operation button is used to switch between (1) the device operation mode and (2) the display operation mode;

(2) the button is displayed in the second display unit and the mode is switched (configured) to a predetermined mode in a case in which a coordinate position of the button is touched on the touch panel 25; and (3) the mode is switched to the predetermined mode on the touch panel 25 through a predetermined touch gesture (for example, a three-point touch or a double touch (the same operation as a double click on the touch panel 25)).

The input control unit 27B configures the mode based on the signal tch and the signal ct15 corresponding to operations of the operation button 26A and/or the touch panel 25, includes the information (mode information) mode indicating the configured mode in the signal Dp1, and outputs the signal Dp1 to the controller-side interface unit 21.

<4.2: Operation of Control System>

An operation of the control system 4000 having the foregoing constitution will be described below.

The detailed description of the same portions as those of the foregoing embodiments will be omitted.

(4.2.1: Marker Display)

Figure 16:
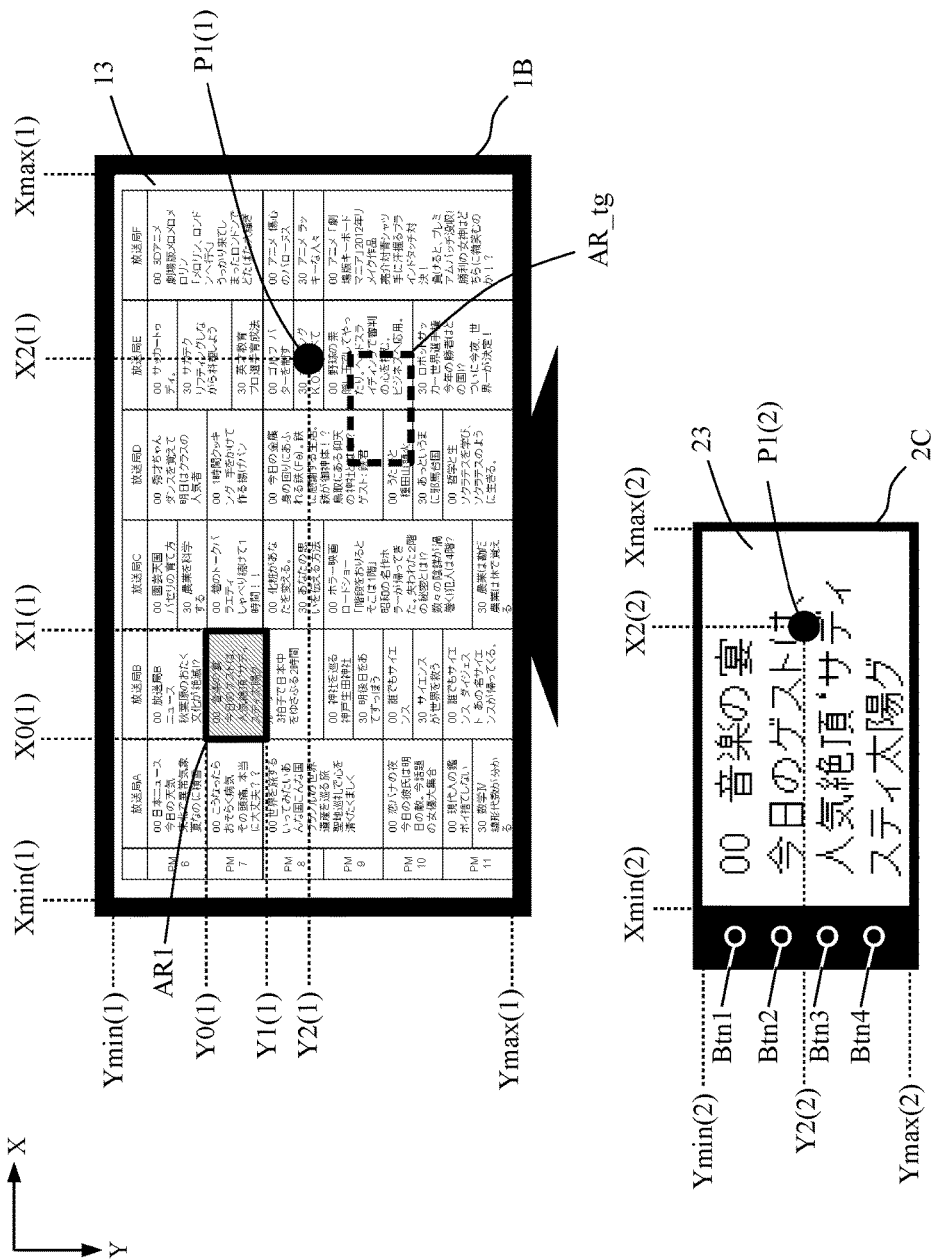
FIG. 16 is an explanatory diagram illustrating a display position changing process using absolute position coordinates.

FIG. 16 is an explanatory diagram illustrating a display position changing process using the absolute position coordinates. Specifically, FIG. 16 is a diagram schematically illustrating the control target device 1B and the remote control device 2C and illustrating a state in which a program table is displayed on the first display unit 13 of the control target device 1. FIG. 16 illustrates a state in which a region AR1 of the first display unit 13 is enlarged and displayed on the second display unit 23 of the remote control device 2C.

As illustrated in FIG. 16, X and Y axes are configured. As illustrated in FIG. 16, in a region of a display screen of the first display unit 13 of the control target device 1, it is assumed that a minimum value is Xmin(1) and a maximum value is Xmax(1) on the X coordinate and a minimum value is Ymin(1) and a maximum value is Ymax(1) on the Y coordinate.

As illustrated in FIG. 16, in a region of a display screen of the second display unit 23 of the remote control device 2C, it is assumed that a minimum value is Xmin(2) and a maximum value is Xmax(2) on the X coordinate and a minimum value is Ymin(2) and a maximum value is Ymax(2) on the Y coordinate.

In the state of FIG. 16, for example, the user configures the "display operation mode" by pressing the button Btn1 of the remote control device 2. For example, the "display operation mode" and the "device operation mode" are switched by pressing the button Btn1 through a toggle operation. The configured mode may be displayed on the second display unit 23 and/or the first display unit 13 through a toggle operation.

In the state of FIG. 16, the input control unit 27B includes information indicating that a rectangular region (Xmin(2), Ymin(2))–(Xmax(2), Ymax(2)) displayed on the second display unit 23 is a rectangular region (X0(1), Y0(1))–(X1(1), Y1(1)) displayed on the first display unit 13 in the signal Dp1 and transmits the signal Dp1 to the control target device 1B via the controller-side interface unit 21.

The main device control unit 14B of the control target device 1B receives the signal Dp2 corresponding to the signal Dp1 via the main device-side interface unit 16 and acquires the information indicating that a rectangular region (Xmin(2), Ymin(2))–(Xmax(2), Ymax(2)) displayed on the second display unit 23 is a rectangular region (X0(1), Y0(1))–(X1(1), Y1(1)) displayed on the first display unit 13.

The main device control unit 14B performs control such that the marker is superimposed on the rectangular region (X0(1), Y0(1))–(X1(1), Y1(1)) on the first display unit 13. That is, the main device control unit 14B acquires the marker information from the storage unit 18 and generates the control signal ct11 so that the marker is superimposed on the rectangular region (X0(1), Y0(1))–(X1(1), Y1(1)) on the first display unit 13, as illustrated in FIG. 16. Then, the main device control unit 14B outputs the generated control signal ct11 to the video combination unit 11.

The video combination unit 11 generates the video signal D0 in which the marker is superimposed on the rectangular region (X0(1), Y0(1))–(X1(1), Y1(1)) on the first display unit 13 based on the control signal ct11 from the main device control unit 14B, and then outputs the generated video signal D0 to the first display control unit 12.

The first display control unit 12 performs display control on the first display unit 13 such that the video signal D0 from the video combination unit 11 is displayed on the first display unit 13.

Through the foregoing process, in the control system 4000, the marker is displayed in the rectangular region (X0(1), Y0(1))–(X1(1), Y1(1)) (the region AR1) on the first display unit 13 of the control target device 1B which corresponds to the rectangular region (Xmin(2), Ymin(2))–(Xmax(2), Ymax(2)) displayed on the second display unit 23 of the remote control device 2C. Thus, the user can easily recognize where the image (video) displayed on the second display unit 23 of the remote control device 2C is shown in the image (video) displayed on the first display unit 13 of the control target device 1B.

(4.2.2: Display Position Changing Process (Marker Display))

Next, an operation (display position changing process) in a case in which the image region displayed on the second display unit 23 of the remote control device 2C is changed will be described.

Figure 17:
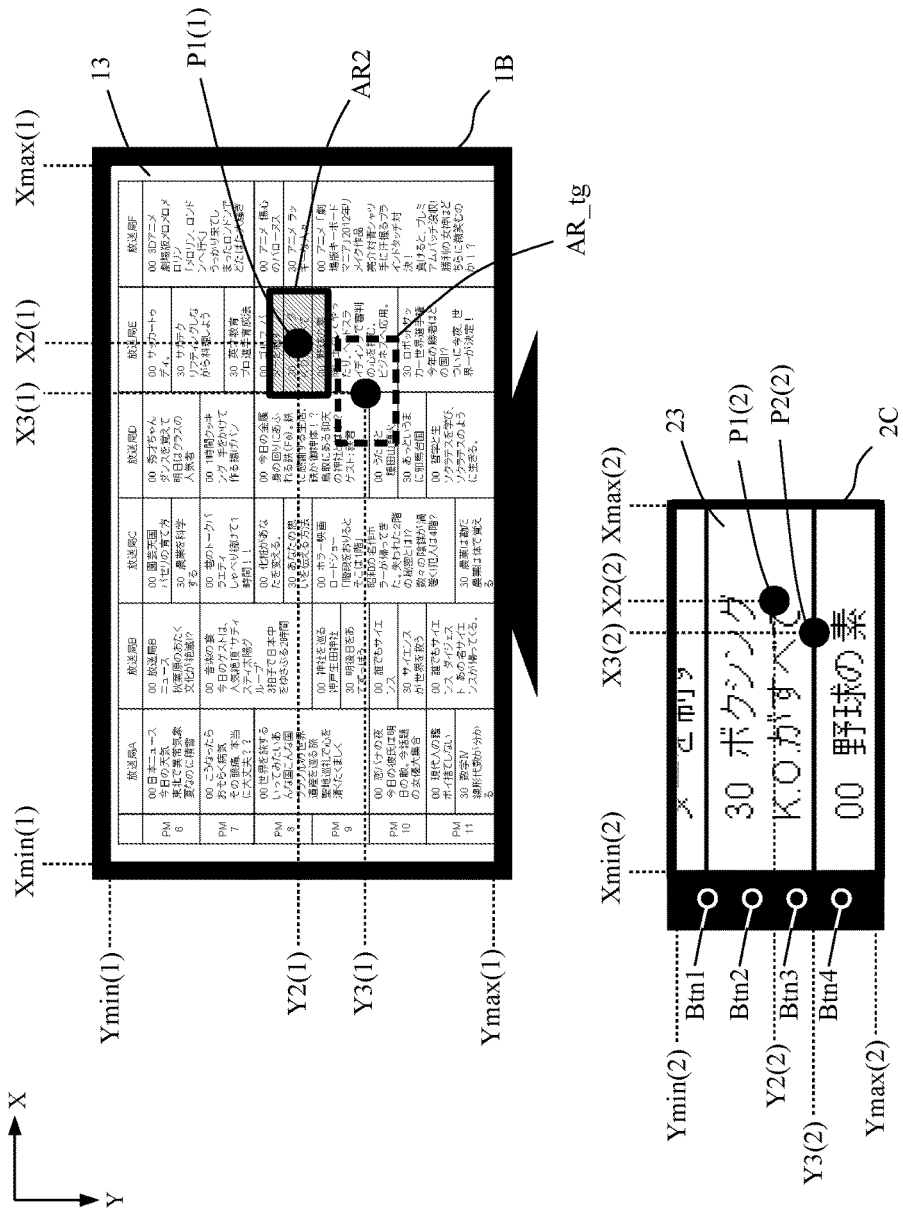
FIG. 17 is an explanatory diagram illustrating an operation in a case in which an image region in which a second display unit 23 of a remote control device 2C is displayed is changed.

FIG. 17 is an explanatory diagram illustrating an operation in a case in which an image region in which the second display unit 23 of the remote control device 2C is displayed is changed.

A rectangular region AR_tg in FIG. 16 is assumed to be a rectangular region of a target movement destination in the following description.

For example, in FIG. 16, when the user touches one point, display in which a point P1(2) of the second display unit 23 of the remote control device 2C is displayed on the second display unit 23 of the remote control device 2C can be updated to display of a region centering on the point P1(1) of the first display unit 13 from the region AR1 of the first display unit 13.

That is, in a case in which a coordinate plane configured on the entire display screen of the second display unit 23 of the remote control device 2C corresponds to a coordinate plane configured on the entire display screen of the first display unit 13 of the control target device 1, the display can be updated to the display of the region centering on the point P1(1) on the display screen (coordinate plane) of the first display unit 13 and corresponding to the point P1(2) on the display screen (coordinate plane) of the second display unit 23. When the coordinates of the point P1(1) on the coordinate plane configured on the entire display screen of the first display unit 13 are assumed to be (X2(1), Y2(1)) and the coordinates of the point P1(2) on the coordinate plane configured on the entire display screen of the second display unit 23 are assumed to be (X2(2), Y2(2)), the following relations are satisfied:

$$(X2(1) - X\min(1))/(X\max(1) - X\min(1)) =$$
$$(X2(2) - X\min(2))/(X\max(2) - X\min(2)); \text{ and}$$
$$(Y2(1) - Y\min(1))/(Y\max(1) - Y\min(1)) =$$
$$(Y2(2) - Y\min(2))/(Y\max(2) - Y\min(2)).$$

FIG. 17 is a diagram illustrating states of the control target device 1B and the remote control device 2C after the foregoing operation is performed. As illustrated in FIG. 17, the region AR2 of the first display unit 13 of the control target device 1 is displayed on the second display unit 23 of the remote control device 2C.

An operation of the control system 4000 in a case in which the foregoing operation is performed will be described with reference to FIG. 17. The control system 4000 is assumed to be configured in the "display operation mode" in the description.

In a case in which the user touches the position of the point P1(2) illustrated in FIG. 17 as one point on the touch panel 25, the input control unit 27B recognizes a touched point as one point based on a signal (a signal indicating a change in the electric field on the touch panel 25) output from the touch panel 25 and detects a coordinate position of the touched point. In the case of FIG. 17, the coordinate position (X2(2), Y2(2)) of the touched point is acquired as coordinate information regarding the touched point.

The input control unit 27B generates the signal Dp1 including detection results, that is, (1) information regarding one touched point and (2) the coordinate position (X2(2), Y2(2)) of the touched point. Then, the input control unit 27B outputs the generated signal Dp1 to the controller-side modulation unit 212.

The controller-side modulation unit 212 generates the wireless signal Ri by performing the RF modulation process on the signal Dp1. Then, the generated wireless signal Ri is transmitted from the controller-side modulation unit 212 to the main device-side demodulation unit 162.

The main device-side demodulation unit 162 acquires the signal Dp2 corresponding to the signal Dp1 by performing the RF demodulation on the received wireless signal Ri. Then, the acquired signal Dp2 is output to the main device control unit 14.

The main device control unit 14B recognizes (1) the one touched point and (2) the coordinate position (X2(2), Y2(2)) of the touched point on the touch panel 25 of the remote control device 2 from the signal Dp2.

Then, the main device control unit 14B performs the display position changing process (a movement process) using absolute position coordinates in a case in which the touched point is one point.

The main device control unit 14B specifies the point P1(1) on the display image of the first display unit 13 of the control target device 1B which corresponds to the point P1(2) on the display image of the second display unit 23 of the remote control device 2C and performs control such that the marker is displayed in the state in which the marker is superimposed on the rectangular region AR2 centering on the point P1(1) on the first display unit 13. That is, the main device control unit 14B acquires the marker information from the storage unit 18 and generates the control signal ct11 based on the acquired marker information so that the rectangular region AR2 of the first display unit 13 is displayed in the state in which the marker is superimposed, as illustrated in FIG. 17. Then, the main device control unit 14B outputs the generated control signal ct11 to the video combination unit 11.

The video combination unit 11 generates the video signal D0 in which the marker is superimposed on the rectangular region AR2 on the first display unit 13 based on the control signal ct11 from the main device control unit 14B, and then outputs the generated video signal D0 to the first display control unit 12.

The first display control unit 12 performs display control on the first display unit 13 such that the video signal D0 from the video combination unit 11 is displayed on the first display unit 13.

Through the same process as that of the first embodiment, the image (video) corresponding to the rectangular region AR2 is displayed on the second display unit 23 of the remote control device 2C.

As illustrated in FIG. 17, in this stage, the fact that the image (video) displayed on the second display unit 23 of the remote control device 2C is slightly deviated from the rectangular region AR_tg of the target movement destination is obvious by the marker of the first display unit 13 of the control target device 1B.

The user can easily understand that the user touches the point P2(2) which is slightly lower left from the point P1(2) as one point in order to display the rectangular region AR_tg of the target movement destination from the position of the marker displayed on the first display unit 13. Accordingly, when the user touches the point P2(2), the same process as the foregoing process can be performed in the control system 4000 and the image corresponding to the rectangular region AR_tg of the target movement destination can be displayed on the second display unit 23 of the remote control device 2C.

In this way, by repeating the display position changing process (the process of moving the display) and the position confirmation by the visual sense of the user in the control system 4000, it is possible to easily display the image corresponding to the rectangular region AR_tg of the target movement destination on the second display unit 23 of the remote control device 2C.

(4.2.3: Display Enlargement Ratio Changing Process (Marker Display))

Next, a display enlargement ratio changing process (marker display) will be described.

Figure 18:
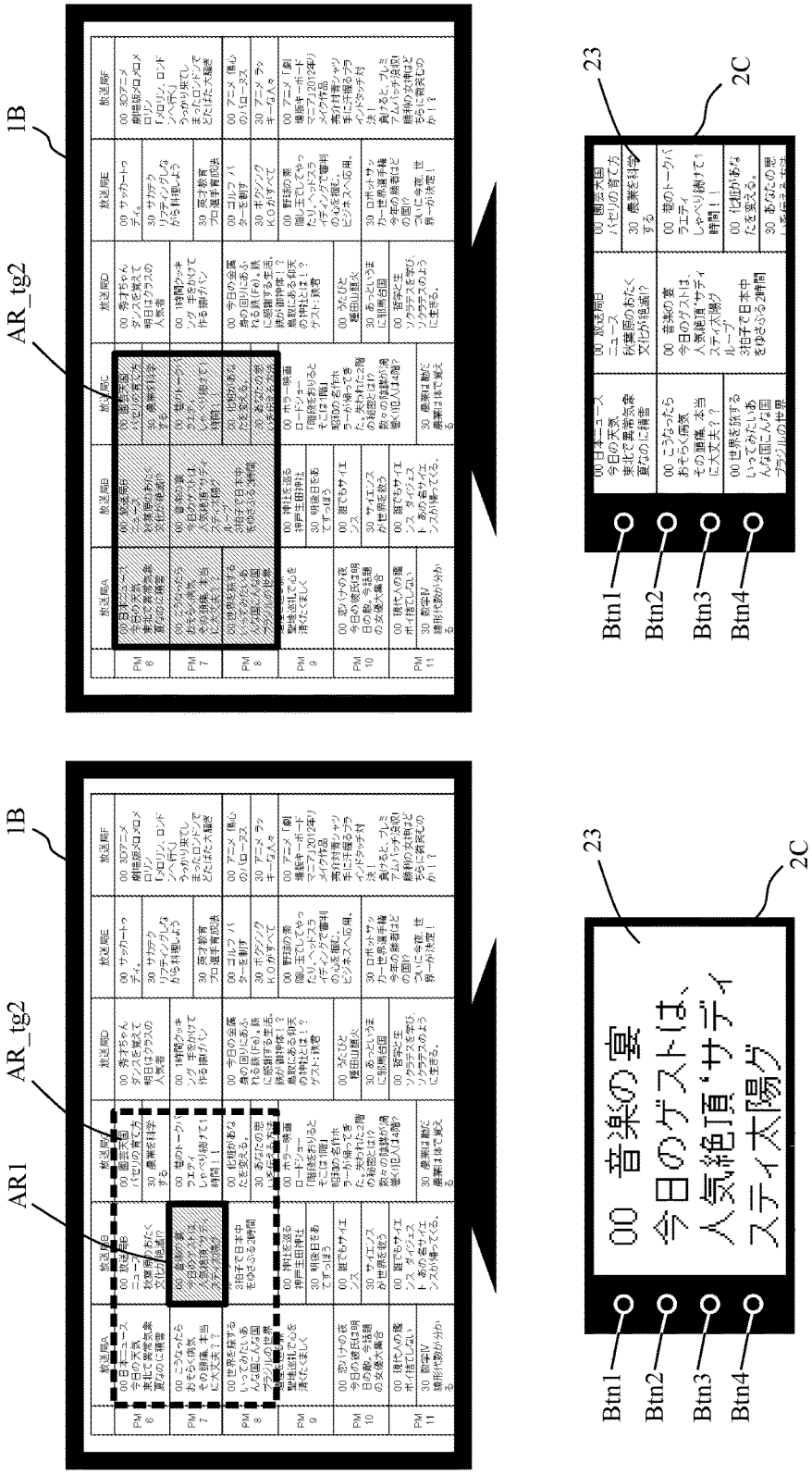
FIG. 18 is an explanatory diagram illustrating a display enlargement ratio changing process.

FIG. 18 is an explanatory diagram illustrating the display enlargement ratio changing process. Specifically, FIG. 18 is a diagram schematically illustrating the control target device 1B and the remote control device 2C and illustrating a state in which a program table is displayed on the first display unit 13 of the control target device 1B. The upper left diagram of FIG. 18 illustrates the control target device 1B before the display enlargement ratio changing process and the lower left diagram of FIG. 18 illustrates the remote control device 2C before display enlargement ratio changing process. The upper right diagram of FIG. 18 illustrates the control target device 1B after the display enlargement ratio changing process and the lower right diagram of FIG. 18 illustrates the remote control device 2C after display enlargement ratio changing process.

A rectangular region AR_tg2 in FIG. 18 is assumed to be a rectangular region after the target display enlargement ratio changing process in the following description. The control system 4000 is assumed to be configured in the "display operation mode".

As in the foregoing embodiment, when the user changes a distance between two touched points while touching the two points on the display screen of the second display unit 23 of the remote control device 2C in the state configured in the display operation mode, a display enlargement ratio on the display screen on the first display unit 13 of the control target device 1B can be changed. A central point at the time of a change in the display magnification is a central point between two touched points.

For example, in a central portion of the second display unit 23 of the remote control device 2 in the lower left diagram of FIG. 18, when the user displaces two points to decrease the distance between the two points while touching the two points, the same process as that of the above-described embodiment is performed so that the display magnification of the first display unit 13 of the control target device 1B can be changed (the display is reduced).

In a case in which the foregoing operation is performed by the user, the main device control unit 14B decides the rectangular region on the first display unit 13 corresponding to the image displayed on the second display unit 23 of the remote control device 2C after the display enlargement changing process based on the received signal Dp2 and performs control such that the decided rectangular region is displayed as a marker. For example, in a case in which the rectangular region on the first display unit 13 corresponding to the image displayed on the second display unit 23 of the remote control device 2C after the display enlargement ratio changing process is the rectangular region AR_tg2 in FIG. 18, the main device control unit 14B performs control such that the rectangular region AR_tg2 of the first display unit 13 is displayed in the state in which the marker is superimposed. That is, the main device control unit 14B acquires the marker information from the storage unit 18 and generates the control signal ct11 based on the acquired marker information so that the rectangular region AR_tg2 of the first display unit 13 is displayed in the state in which the marker is superimposed, as illustrated in the right diagram of FIG. 18. Then, the main device control unit 14B outputs the generated control signal ct11 to the video combination unit 11.

The video combination unit 11 generates the video signal D0 in which the marker is superimposed on the rectangular region AR_tg2 on the first display unit 13 based on the control signal ct11 from the main device control unit 14B, and then outputs the generated video signal D0 to the first display control unit 12.

The first display control unit 12 performs display control on the first display unit 13 such that the video signal D0 from the video combination unit 11 is displayed on the first display unit 13.

Through the foregoing process, in the control system 4000, the marker is displayed in the rectangular region on the first display unit 13 of the control target device 1B which corresponds to the rectangular region (Xmin(2), Ymin(2))–(Xmax(2), Ymax(2)) displayed on the second display unit 23 of the remote control device 2C even in the display enlargement ratio changing process. Thus, the user can easily recognize where the image (video) displayed on the second display unit 23 of the remote control device 2C is shown in the image (video) displayed on the first display unit 13 of the control target device 1B. Therefore, in the control system 4000, it is possible to further improve the operability of the display enlargement ratio changing process.

Even in the display angle changing process, by performing the display angle changing process while displaying the marker in the control system 4000, it is possible to improve the operability.

(4.2.4: Marker Storing Process and Calling process)

Next, a marker storing process and calling process will be described.

First, the marker storing process will be described.

When the user performs the marker storing operation, the control system 4000 stores display state information (a display position, a display range, and a display angle) regarding the remote control device 2C as a marker at the time point at which this operation is performed.

The "marker storing operation" is, for example, (1) an operation of pressing a predetermined button of the operation buttons 26A of the remote control device 2C, (2) an operation in which the user touches a predetermined image region (a display region such as a button or an icon) displayed on the second display unit of the remote control device 2C, or (3) an operation of performing a predetermined touch action by the user on the touch panel 25 of the remote control device 2C.

In a case in which the user performs the marker storing operation, the input control unit 27B of the remote control device 2C includes display state information (a display position, a display range, and a display angle) regarding the second display unit 23 in the signal Dp1 and transmits the signal Dp1 to the control target device 1B via the controller-side interface unit 21.

Then, the main device control unit 14B of the control target device 1B acquires the display state information (the display position, the display range, and the display angle) transmitted from the remote control device 2C by receiving the signal Dp2 via the main device-side interface unit 16.

The main device control unit 14B stores the acquired display state information (the display position, the display range, and the display angle) in the storage unit 18.

The number of pieces of display state information stored in the storage unit 18 may be decided in advance. In this case, in a case in which the main device control unit 14B attempts to store the display state information greater than the number of pieces of information storable in the storage unit 18, the main device control unit 14B may delete the oldest display state information from the storage unit 18 and store new display state information in the storage unit 18.

Next, the marker calling process will be described.

Figure 19:
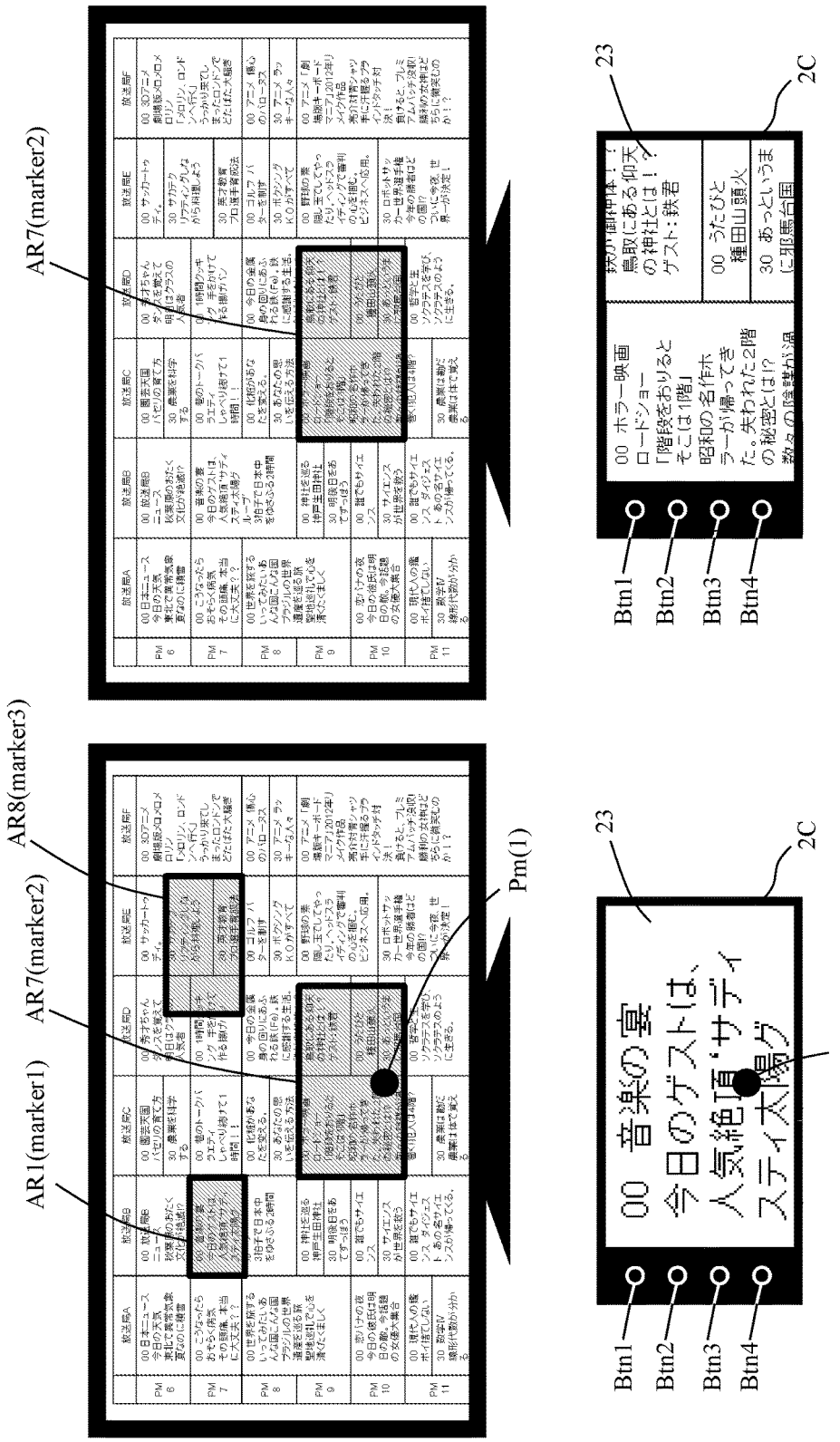
FIG. 19 is an explanatory diagram illustrating a marker calling process.

FIG. 19 is an explanatory diagram illustrating the marker calling process.

When the user performs the marker calling operation, the control system 4000 displays the stored marker on a screen of the first display unit 13 of the control target device 1B (marker selection state).

The "marker calling operation" is, for example, (1) an operation of pressing a predetermined button of the operation buttons 26A of the remote control device 2C, (2) an operation in which the user touches a predetermined image region (a display region such as a button or an icon) displayed on the second display unit of the remote control device 2C, or (3) an operation of performing a predetermined touch action by the user on the touch panel 25 of the remote control device 2C.

In a case in which the user performs the marker calling operation, the input control unit 27B of the remote control device 2C includes information indicating the marker calling operation is performed in the signal Dp1 and transmits the signal Dp1 to the control target device 1B via the controller-side interface unit 21.

Then, the main device control unit 14B of the control target device 1B acquires the information indicating the marker calling operation is performed in the remote control device 2C by receiving the signal Dp2 via the main device-side interface unit 16.

The main device control unit 14B acquires the information (the display position, the display range, and the display angle of the marker) regarding the marker stored in the storage unit 18, generates the control signal ct11 for displaying the marker stored in the storage unit 18 on the first display unit 13 of the control target device 1B, and outputs the control signal ct11 to the video combination unit 11.

The video combination unit 11 generates the video signal D0 based on the control signal ct11 from the main device control unit 14B so that the marker stored in the storage unit 18 is displayed and outputs the generated video signal D0 to the first display control unit 12.

The first display control unit 12 performs display control on the first display unit 13 so that the video signal D0 from the video combination unit 11 is displayed on the first display unit 13.

The upper left diagram of FIG. 19 illustrates a state (the marker selection state) in which the marker calling operation is performed and the marker stored in the storage unit 18 is displayed on the first display unit 13. The upper left diagram of FIG. 19 illustrates a state in which three markers are stored in the storage unit 18 and the three markers are called. To facilitate the description, as illustrated in FIG. 19, (1) the first marker is a marker which is displayed in the rectangular region AR1, (2) the second marker is a marker which is displayed in a rectangular region AR7, and (3) the third marker is a marker which is displayed in a rectangular region AR8.

In the control system 4000, the user can select the marker in the state of the left diagram of FIG. 19. For example, (1) the first button Btn1 of the operation buttons 26A is assigned to the first marker (the marker in the rectangular region AR1), (2) the second button Btn2 of the operation buttons 26A is assigned to the second marker (the marker in the rectangular region AR7), and (3) the third button Btn3 of the operation buttons 26A is assigned to the third marker (the marker in the rectangular region AR8).

For example, in a case in which the user selects the second marker (the marker in the rectangular region AR7), the rectangular region AR7 corresponding to the second marker is displayed on the second display unit 23 of the remote control device 2C when the user presses the second button Btn2.

As another method, the user may touch one point on the screen of the second display unit 23 of the remote control device 2C and select the marker closest to the coordinate point of the control target device 1B corresponding to the touched point, so that an image corresponding to the selected marker is displayed on the second display unit 23 of the remote control device 2C. For example, in a case in which the second marker (the marker in the rectangular region AR7) is selected, a point Pm(2) in FIG. 19 is touched. Since the point corresponding to the point Pm(2) on the screen of the first display unit 13 is a point Pm(1) in FIG. 19 and the marker closest to the point Pm(1) is the second marker, the second marker (the marker in the rectangular region AR7) is selected.

In a case in which the foregoing operation is performed, the input control unit 27B of the remote control device 2C includes coordinate information regarding the touch point Pm(2) in the signal Dp1 and transmits the signal Dp1 to the control target device 1B. Then, the main device control unit 14B of the control target device 1B acquires coordinate information regarding the touch point Pm(2) by the signal Dp2 and calculates the coordinate information regarding the point Pm(1) on the display screen of the first display unit 13 corresponding to the touch point Pm(2). The main device control unit 14B specifies the marker displayed at the position closest to the point Pm(1) on the display screen of the first display unit 13 based on the calculated coordinate information regarding the point Pm(1) and outputs information regarding the rectangular region in which the specified marker is displayed to the adjustment unit 15.

The main device control unit 14B outputs the adjustment signal Adj corresponding to the marker information. The adjustment unit 15 acquires the adjustment signal Adj and acquires the adjusted video signal D2 forming the video region (image region) to be displayed in the remote control device 2 from the video signal D1 based on the acquired adjustment signal Adj. Then, the adjustment unit 15 outputs the acquired adjusted video signal D2 and the coordinate information z1 for specifying the image region formed by the adjusted video signal D2 to the main device-side modulation unit 161 of the main device-side interface unit 16.

The second video combination unit 31 of the remote control device 2C receives the coordinate information z2 corresponding to the coordinate information z1 and the adjusted video signal D3 corresponding to the adjusted video signal D2 via the controller-side interface unit 21. Then, the second video combination unit 31 outputs a video signal D4 in which the adjusted video signal D3 and the video signal Don are combined to the second display control unit 22A based on the coordinate information z2. The second display control unit 22A outputs the video signal D4 as a video signal D5 to the second display unit 23, and the second display unit 23 displays the video signal D5.

Thus, in the remote control device 2C, the image (video) corresponding to the image region corresponding to the marker is displayed on the second display unit 23 based on rectangular information in which the specified marker is displayed. The right diagram of FIG. 19 illustrates the state after the second marker is selected. As understood from the right diagram of FIG. 19, the image (video) of a portion in which the marker of the first display unit 13 is superimposed is displayed on the second display unit 23 of the remote control device 2C.

In the control system 4000, the marker calling process is performed in the above-described manner.

In the marker selection state, a process of blinking the frame of the selected marker or performing emphasis display (display for changing a color of the marker) may be performed to clarify the selected marker (a rectangular region corresponding to the selected marker). Thus, in a case in which a plurality of markers are displayed, the user can understand a marker to be selected by the user, and thus the operability is improved.

In a case in which the marker is selected through a touch operation on the touch panel 25, the marker may be blinked when a state in which one point is touched is maintained. When the marker is temporarily selected and a finger is detached, the selection of the marker may be confirmed.

In a case in which a predetermined marker is selected for a constant period or more, the selection of the marker may be confirmed and the rectangular region corresponding to the marker may be displayed on the screen of the second display unit 23 of the remote control device 2C.

Fifth Embodiment

Next, a fifth embodiment will be described.

In a control system 5000 according to the embodiment, as in the control system 4000 according to the fourth embodiment, a marker is not superimposed to be displayed on the display screen of the first display unit 13, but a display screen of the first display unit 13 in which a marker is superimposed is reduced to be displayed on a display screen of the second display unit 23 of the remote control device 2D.

The same reference numerals are given to the same portions as those of the foregoing embodiment and the detailed description thereof will be omitted.

<5.1: Constitution of Control System>

Figure 20:
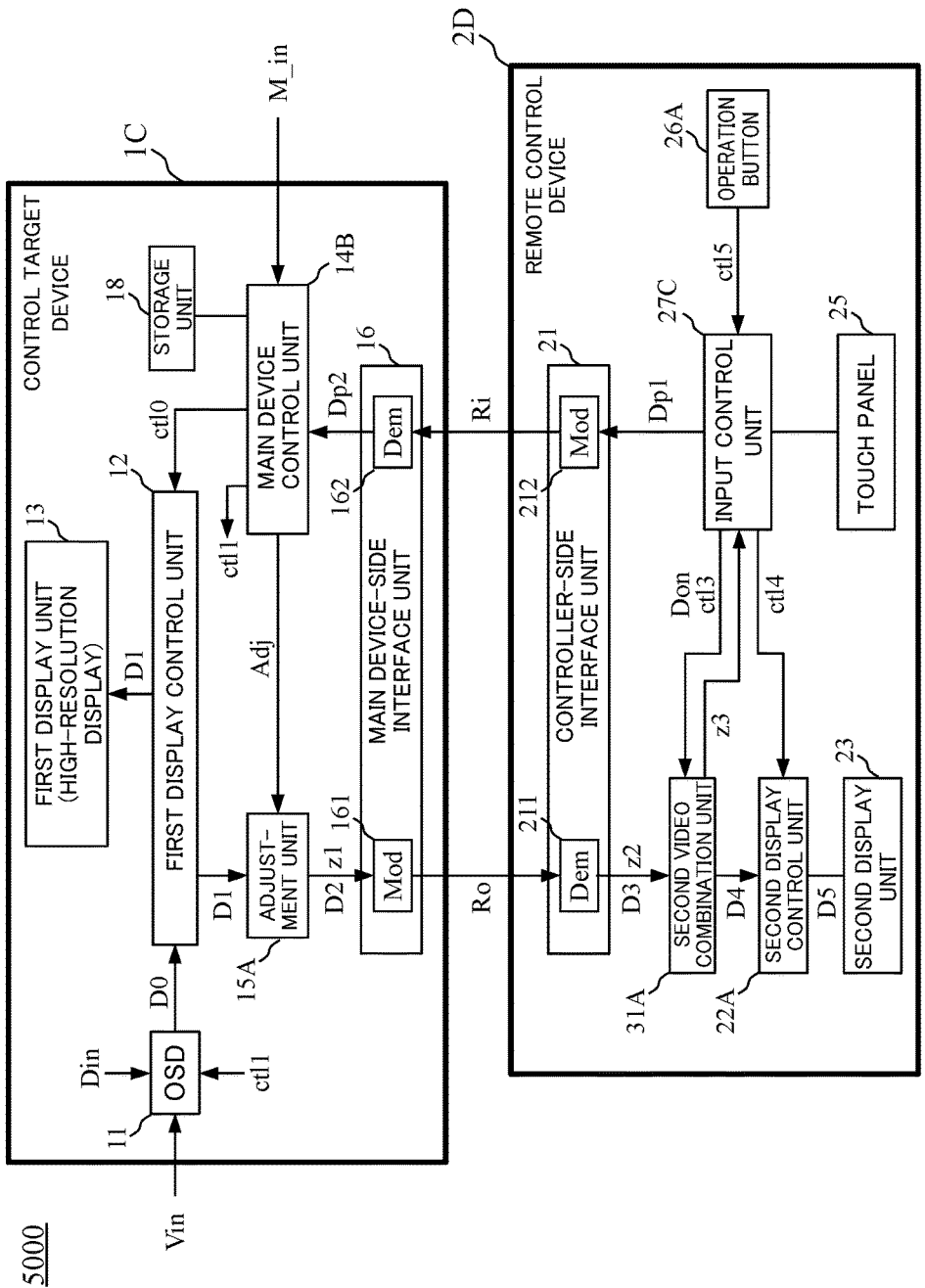
FIG. 20 is a diagram illustrating a schematic constitution of a control system 5000 according to a fifth embodiment.

FIG. 20 is a diagram illustrating a schematic constitution of the control system 5000 according to the fifth embodiment.

As illustrated in FIG. 20, the control system 5000 has a constitution in which the control target device 1B of the control system 4000 according to the fourth embodiment is substituted with the control target device 1C and the remote control device 2C is substituted with the remote control device 2D.

The control target device 1C has a constitution in which the adjustment unit 15 of the control target device 1B according to the fourth embodiment is substituted with an adjustment unit 15A. Unlike the fourth embodiment, the main device control unit 14B does not output information regarding the marker to the video combination unit 11 and transmits information regarding the marker to the adjustment unit 15A.

The adjustment unit 15A outputs the information regarding the marker as the marker information z1 to the main device-side modulation unit 161 of the main device-side interface unit 16. The other remaining constitution of the adjustment unit 15A is the same as that of the adjustment unit 15 according to the above-described embodiment.

The remote control device 2D has a constitution in which the second video combination unit 31 of the remote control device 2C according to the fourth embodiment is substituted with a second video combination unit 31A and the input control unit 27B is substituted with an input control unit 27C.

The second video combination unit 31A inputs the video signal D3 and the marker information z2 (the marker information acquired by modulating the marker information z1 by the main device-side modulation unit 161 and demodulating the modulated information by the controller-side demodulation unit 211) output from the controller-side interface unit 21, the superimposition video signal Don (the video signal Don generated based on information regarding an operation button, state display information, or the like) output from the input control unit 27B, and the control signal ct13 including the video combination adjustment information output from the input control unit 27B. The second video combination unit 31A combines the video signal D3 and the video signal Don based on the information to generate the video signal D4. Then, the second video combination unit 31A outputs the generated video signal as the combined video signal D4 to the second display control unit 22A. The video signal Don is a display video of a user operation button, a device state, or the like.

The combined video signal D4 is a video in which reduced display in which the marker is superimposed on the display screen of the first display unit 13 is superimposed on the video signal D3. The second video combination unit 31A decides whether to superimpose the reduced display in which the marker is superimposed on the display screen of the first display unit 13 based on the control signal ct13.

The second video combination unit 31A outputs the marker information signal z3 including information regarding the marker to the input control unit 27C.

The marker information signal z3 output form the second video combination unit 31A, the signal ct15 indicating operation information regarding the operation button 26A output from the operation button 26A, and the signal tch including the touch position coordinate information output from the touch panel 25 are input to the input control unit 27C. The input control unit 27C generates the video signal Don to be combined with the video signal D3 based on the operation information regarding an operation button included in the signal ct15 and the touch panel operation information included in the signal tch, and then outputs the generated video signal Don to the second video combination unit 31. A video by the video signal Don is, for example, a video clarifying an operation button state or a video clarifying state display information of a control unit system. The input control unit 27C generates the control signal ct13 including the video combination adjustment information (information regarding a combination position and size of a combined video) necessary in a case in which of the video signal D3 and the video signal Don are combined and outputs the generated control signal ct13 to the second video combination unit 31. The input control unit 27C includes information indicating display/non-display of the marker in the control signal ct13.

The input control unit 27C generates the control signal ct14 including the display control information and outputs the generated control signal ct14 to the second display control unit 22A.

The input control unit 27C generates the signal Dp1 including the display state information of the remote control device 2C and control information of the control target device 1B and outputs the signal Dp1 to the controller-side modulation unit 212 of the controller-side interface unit 21. The control information included in the signal Dp1 includes the information indicating display/non-display of the marker.

<5.2: Operation of Control System>

An operation of the control system 5000 having the foregoing constitution will be described below.

In the control system 5000, for example, a reduced screen in which the marker is superimposed on the display screen of the first display unit 13 (which is referred to as a "marker display portion MD") is displayed on the second display unit 23 of the remote control device 2D through a predetermined operation (for example, an operation of pressing a predetermined button of the operation buttons 26A).

In a case in which an operation of displaying the marker display portion MD is performed, the input control unit 27C includes information indicating that the operation is performed in the signal Dp1 and transmits the signal Dp1 to the control target device 1C.

The control target device 1C ascertains that the operation of displaying the marker display portion MD is performed based on the signal Dp2 received from the remote control device 2D, acquires the marker information from the storage unit 18, includes the acquired marker information in the adjustment signal Adj, and outputs the adjustment signal Adj to the adjustment unit 15A.

The adjustment unit 15A transmits the marker information from the main device control unit 14B to the remote control device 2D via the main device-side interface unit 16.

The second video combination unit 31A of the remote control device 2D generates the combined video signal D4 in which the marker display portion MD is superimposed based on the marker information acquired from the control target device 1C via the controller-side interface unit 21, and then outputs the combined video signal D4 to the second display control unit 22A.

The second display control unit 22A displays the combined video signal D4 from the second video combination unit 31A on the second display unit 23 based on the control signal ctl4 from the input control unit 27C.

Figure 21:
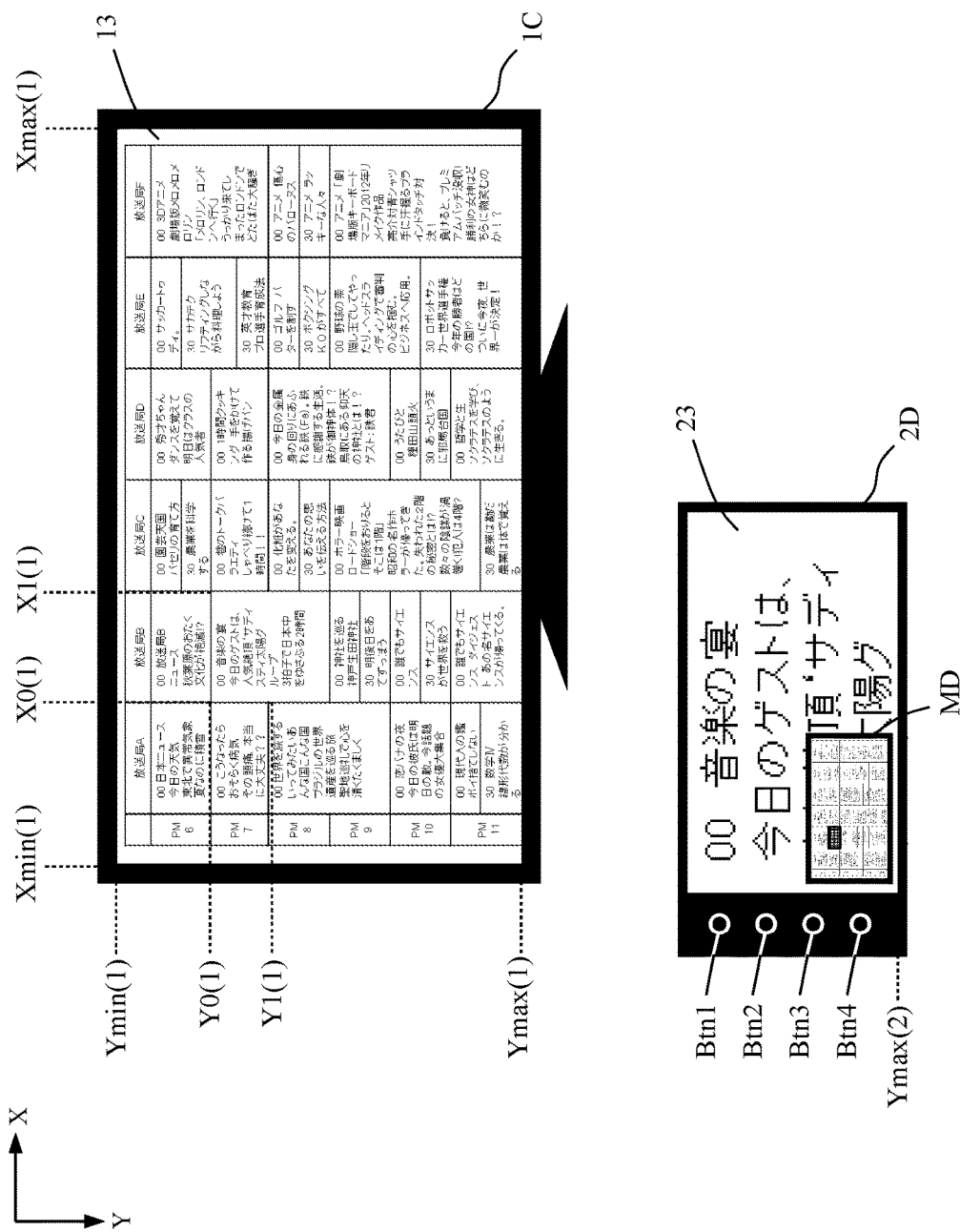
FIG. 21 is an explanatory diagram illustrating a display angle changing process.

By performing the process in this way, for example, as illustrated in FIG. 21, the marker display portion MD is displayed on the second display unit 23.

In the control system 5000, the marker display portion MD may be adjusted.

For example, in the control system 5000, a marker display adjustment mode is provided, a process of transitioning the marker display adjustment mode is assigned to a predetermined button of the operation button 26A, and the mode transitions to the marker display adjustment mode when the user presses the button.

In the case of transition to the marker display adjustment mode, the display of the marker display portion MD may be enlarged or reduced, for example, when the user touches two points in the marker display portion MD to operate a pitch.

In the case of transition to the marker display adjustment mode, the display of the marker display portion MD may be rotated in a predetermined direction when the user touches two points in the marker display portion MD and performs an operation of rotating the marker display portion MD in the predetermined direction while touching the tow points.

Alternatively, in the control system 5000, in a case in which a function is assigned to a predetermined button of the operation button 26A and the predetermined button is pressed in order to perform the foregoing process, the function assigned to the button may be realized.

In the control system 5000, in a case in which the display angle changing process is performed, rotation of the marker display portion MD may be interlocked with rotation of display by the display angle changing process.

Figure 22:
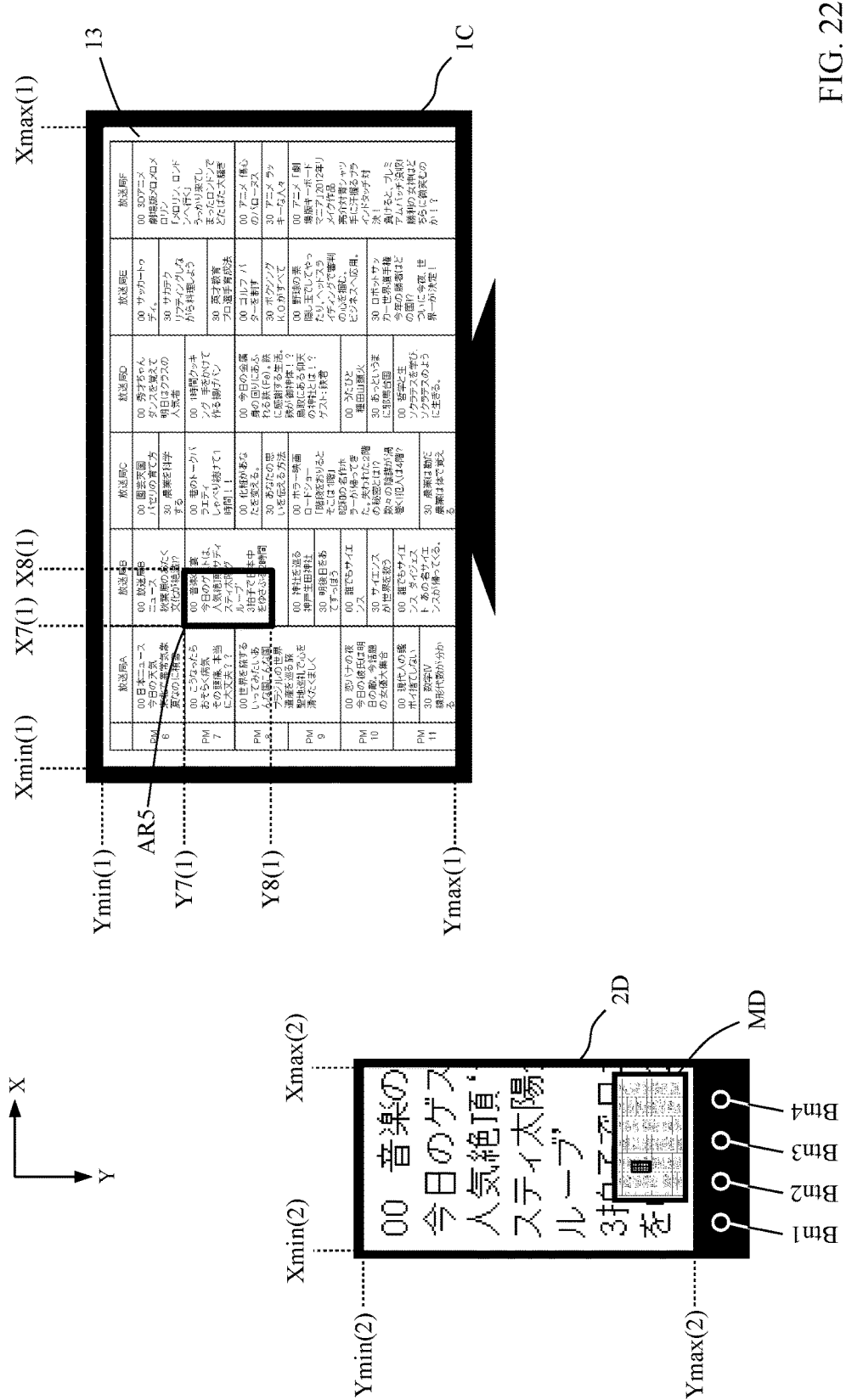
FIG. 22 is an explanatory diagram illustrating the display angle changing process.

For example, in the control system 5000, in a case in which the display angle changing process is performed and the state illustrated in FIG. 21 is changed to the state illustrated in FIG. 22, the display of the marker display portion MD of the second display unit of the remote control device 2D may also be interlocked with rotation of the display by the display angle changing process.

Thus, as illustrated in FIG. 22, since display directions of the second display unit of the remote control device 2D and the marker display portion MD are identical even after the display angle changing process, the user can easily recognize the position of the marker, thereby improving the operability.

Other Embodiments

Some or all of the foregoing embodiments (including the modification examples) may be combined to realize the control system, the control target device, and/or the remote control device.

Some or all of the image processing system and the image processing device according to the foregoing embodiments may be realized as integrated circuits (for example, LSIs or system LSIs).

Some or all of the processes of the functional blocks according to the foregoing embodiments may be realized by programs. Some or all of the processes of the functional blocks according to the foregoing embodiments may be realized by a central processing unit (CPU) of a computer. Programs performing the processes may be stored in a storage device such as a hard disk or a ROM and a central processing unit (CPU) may read the programs from the ROM or a RAM to execute the programs.

Each process according to the foregoing embodiments may be realized by hardware or may be realized by software (including a case in which each process is realized along with an operating system (OS), middleware, or a predetermined library). Further, each process may be realized a process in which software and hardware coexist.

An execution procedure of the processing method according to the foregoing embodiments is not limited to the procedure described in the foregoing embodiments, but the execution procedure may be replaced within the scope of the present invention without departing from the gist of the present invention.

A computer program causing a computer to execute the above-described method and a computer-readable recording medium recording the program are included in the scope of the present invention. Here, examples of the computer-readable recording medium include a flexible disc, a hard disk, a CD-ROM, an MO, a DVD, a large-capacity DVD, a next-generation DVD, and a semiconductor memory.

The computer program is not limited to a program recorded in the recording medium, but may be a program transmitted via an electric communication line, a wireless or wired communication line, a network typified by the Internet.

The specific constitutions of the present invention are not limited to those of the above-described embodiments, but can be modified and corrected in various forms within the scope of the present invention without departing from the gist of the present invention.

[Supplements]

The present invention can be realized as follows.

A first invention is a control system that includes a control target device and a remote control device.

The control target device includes a first display unit that displays a video, a first display control unit, an adjustment unit, a main device control unit, and a main device-side interface unit.

The remote control device includes a second display unit that displays a video, a second display control unit, an input control unit, a mode switch unit, and a controller-side interface unit.

The first display control unit performs driving control on the first display unit to cause to the first display unit to display the video.

The adjustment unit acquires an adjusted video signal by extracting a part or all of the video from the video displayed on the first display unit.

The main device control unit controls the first display control unit and the adjustment unit.

The main device-side interface unit is an interface that transmits the adjusted video signal acquired by the adjustment unit to the remote control device.

The second display control unit performs driving control on the second display unit to cause the second display unit to display the video.

The input control unit inputs information for controlling display of the video displayed on the second display unit.

The mode switch unit switches between a display operation mode for changing display of the video displayed on the second display unit and a device operation mode for performing a device operation of the control target device.

The controller-side interface unit is an interface that communicates with the main device-side interface unit of the control target device.

In a case in which the display operation mode is configured and position specifying information which is information for specifying a position on a display screen of the second display unit is input to the input control unit, the input control unit outputs the position specifying information to the main device control unit via the controller-side interface unit and the main device-side interface unit, the main device control unit configures absolute position coordinates by causing a coordinate plane configured on an entire display screen of the first display unit to correspond to a coordinate plane configured on the entire display screen of the second display unit, the adjustment unit acquires the adjusted video signal forming an image region AR1 which includes a point P1 corresponding to a point P2 indicated by the position specifying information on the absolute position coordinates of the display screen of the first display unit and is displayed on the first display unit, and the second display control unit causes the second display unit to display the image region AR1 based on the adjusted video signal.

In the control system, by specifying the position (which may be a region) of the display screen of the second display unit of the remote control device, that is, acquiring the position specifying information, it is possible to perform the display position changing process (movement process) using the absolute position coordinate.

Accordingly, for example, when the control target device is a television receiver (control target device) including a high-resolution display device, the display screen of the control target device can be displayed on the second display unit of the remote control device and the display can be quickly moved through an intuitive operation.

In a second invention, in the control system according to the first invention, the position specifying information is information for specifying one point on the display screen of the second display unit.

Thus, in the control system, by specifying one point on the display screen of the second display unit, it is possible to acquire the position specifying information.

In a third invention, in the control system according to the first or second invention, in a case in which the display operation mode is configured and display update information which is information for updating display by shifting an image displayed on the display screen of the second display unit in a first direction is input to the input control unit, the input control unit, the main device control unit, the adjustment unit, and the second display control unit perform the following processes.

The input control unit outputs the display update information to the main device control unit via the controller-side interface unit and the main device-side interface unit.

The main device control unit configures relative position coordinates by causing a coordinate plane configured on in a part of the display screen of the first display unit to correspond to a coordinate plane configured on the entire display screen of the second display unit.

The adjustment unit acquires the adjusted video signal forming a shifted image region which is an image region present at a position at which a region of the display screen of the first display unit configured at the relative position coordinates is displaced in an opposite direction to the first direction on the display screen of the first display unit.

The second display control unit causes the second display unit to display the shifted image region based on the adjusted video signal.

In the control system, by acquiring the display update information, it is possible to perform the display movement process using the relative position coordinates.

Accordingly, for example, when the control target device is a television receiver (control target device) including a high-resolution display device, the display screen of the control target device can be displayed on the second display unit of the remote control device and the display movement process can be quickly performed through an intuitive operation.

In a fourth invention, in the control system according to the first or second invention, in a case in which the display operation mode is configured and two-point specifying information which is information for specifying two points on the display screen of the second display unit is input to the input control unit, the input control unit outputs the two-point specifying information to the main device control unit via the controller-side interface unit and the main device-side interface unit, and the main device control unit configures relative position coordinates by causing a coordinate plane configured in a part of the display screen of the first display unit to correspond to a coordinate plane configured on the entire display screen of the second display unit.

The adjustment unit and the second display control unit perform the following processes.

In a case in which the two points specified by the two-point specifying information is displaced in the predetermined direction Dir1, the adjustment unit acquires the adjusted video signal forming an image region AR2 present at a position at which a region of the display screen of the first display unit configured at the relative position coordinates is displaced in an opposite direction to the direction Dir1 on the display screen of the first display unit, and the second display control unit causes the second display unit to display the image region AR2 based on the adjusted video signal.

In the control system, by further specifying two points on the display screen of the second display unit of the remote control device, that is, acquiring two-point specifying information, it is possible to perform the display movement process using the relative position coordinates.

Accordingly, for example, when the control target device is a television receiver (control target device) including a high-resolution display device, the display screen of the control target device can be displayed on the second display unit of the remote control device and the display movement process can be quickly performed through an intuitive operation.

In a fifth invention, in the control system according to the first or second invention, in a case in which the display operation mode is configured and enlarged-display information which is information for updating display by enlarging an image displayed on the display screen of the second display unit is input to the input control unit, the input control unit, the main device control unit, the adjustment unit, and the second display control unit perform the following processes.

The input control unit outputs the enlarged-display information to the main device control unit via the controller-side interface unit and the main device-side interface unit.

The main device control unit configures relative position coordinates by causing a coordinate plane configured on in a part of the display screen of the first display unit to correspond to a coordinate plane configured on the entire display screen of the second display unit.

The adjustment unit acquires the adjusted video signal forming a reduced image region which is an image region with a size obtained by reducing a region of the display screen of the first display unit configured at the relative position coordinates on the display screen of the first display unit based on the enlarged-display information.

The second display control unit causes the second display unit to display the reduced image region based on the adjusted video signal.

In the control system, by acquiring the enlarged-display information, it is possible to perform the display enlargement ratio changing process using the relative position coordinates.

Accordingly, for example, when the control target device is a television receiver (control target device) including a high-resolution display device, the display screen of the control target device can be displayed on the second display unit of the remote control device and the display enlargement ratio changing process can be quickly performed through an intuitive operation.

In a sixth invention, in the control system according to the first or second invention, in a case in which the display operation mode is configured and two-point specifying information which is information for specifying two points on the display screen of the second display unit is input to the input control unit, the input control unit outputs the two-point specifying information to the main device control unit via the controller-side interface unit and the main device-side interface unit, and the main device control unit configures relative position coordinates by causing a coordinate plane configured in a part of the display screen of the first display unit to correspond to a coordinate plane configured on the entire display screen of the second display unit.

The adjustment unit and the second display control unit perform the following processes.

In a case in which a distance between the two points specified by the two-point specifying information is changed to be increased, the adjustment unit acquires the adjusted video signal forming an image region AR3 with a size obtained by reducing a region of the display screen of the first display unit configured at the relative position coordinates on the display screen of the first display unit, and the second display control unit causes the second display unit to display the image region AR3 based on the adjusted video signal.

In the control system, by specifying two points on the display screen of the second display unit of the remote control device, that is, acquiring the two-point specifying information, it is possible to perform the display enlargement ratio changing process using the relative position coordinates.

Accordingly, for example, when the control target device is a television receiver (control target device) including a high-resolution display device, the display screen of the control target device can be displayed on the second display unit of the remote control device and the display enlargement ratio changing process can be quickly performed through an intuitive operation.

In a seventh invention, in the control system according to the first or second invention, in a case in which the display operation mode is configured and reduced-display information which is information for updating display by reducing an image displayed on the display screen of the second display unit is input to the input control unit, the input control unit, the main device control unit, the adjustment unit, and the second display control unit perform the following processes.

The input control unit outputs the reduced-display information to the main device control unit via the controller-side interface unit and the main device-side interface unit.

The main device control unit configures relative position coordinates by causing a coordinate plane configured on in a part of the display screen of the first display unit to correspond to a coordinate plane configured on the entire display screen of the second display unit.

The adjustment unit acquires the adjusted video signal forming an enlarged image region which is an image region with a size obtained by enlarging a region of the display screen of the first display unit configured at the relative position coordinates on the display screen of the first display unit based on the reduced-display information.

The second display control unit causes the second display unit to display the enlarged image region based on the adjusted video signal.

In the control system, by acquiring the reduced-display information, it is possible to perform the display enlargement ratio changing process using the relative position coordinates.

Accordingly, for example, when the control target device is a television receiver (control target device) including a high-resolution display device, the display screen of the control target device can be displayed on the second display unit of the remote control device and the display enlargement ratio changing process can be quickly performed through an intuitive operation.

In an eighth invention, in the control system according to the first or second invention, in a case in which the display operation mode is configured and two-point specifying information which is information for specifying two points on the display screen of the second display unit is input to the input control unit, the input control unit outputs the two-point specifying information to the main device control unit via the controller-side interface unit and the main device-side interface unit, and the main device control unit configures relative position coordinates by causing a coordinate plane configured in a part of the display screen of the first display unit to correspond to a coordinate plane configured on the entire display screen of the second display unit.

The adjustment unit and the second display control unit perform the following processes.

In a case in which a distance between the two points specified by the two-point specifying information is changed to be decreased, the adjustment unit acquires the adjusted video signal forming an image region AR4 with a size obtained by enlarging a region of the display screen of the first display unit configured at the relative position coordinates on the display screen of the first display unit, and the second display control unit causes the second display unit to display the image region AR3 based on the adjusted video signal.

In the control system, by specifying two points on the display screen of the second display unit of the remote control device, that is, acquiring the two-point specifying information, it is possible to perform the display enlargement ratio changing process using the relative position coordinates.

Accordingly, for example, when the control target device is a television receiver (control target device) including a high-resolution display device, the display screen of the control target device can be displayed on the second display unit of the remote control device and the display enlargement ratio changing process can be quickly performed through an intuitive operation.

In a ninth invention, in the control system according to the first or second invention, in a case in which the display operation mode is configured and rotation-display information which is information for updating display by rotating an image displayed on the display screen of the second display unit in a first rotation direction is input to the input control unit, the input control unit, the main device control unit, the adjustment unit, and the second display control unit perform the following processes.

The input control unit outputs the rotation-display information to the main device control unit via the controller-side interface unit and the main device-side interface unit.

The main device control unit configures relative position coordinates by causing a coordinate plane configured on in a part of the display screen of the first display unit to correspond to a coordinate plane configured on the entire display screen of the second display unit.

The adjustment unit acquires the adjusted video signal forming a rotated image region which is an image region present at a position at which a region of the display screen of the first display unit configured at the relative position coordinates is rotated in an opposite direction to the first rotation direction on the display screen of the first display unit based on the rotation-display information.

The second display control unit causes the second display unit to display the rotated image region based on the adjusted video signal.

In the control system, by acquiring the rotation-display information, it is possible to perform the display angle changing process using the relative position coordinates.

Accordingly, for example, when the control target device is a television receiver (control target device) including a high-resolution display device, the display screen of the control target device can be displayed on the second display unit of the remote control device and the display angle changing process can be quickly performed through an intuitive operation.

In a tenth invention, in the control system according to the first or second invention, in a case in which the display operation mode is configured and two-point specifying information which is information for specifying two points on the display screen of the second display unit is input to the input control unit, the input control unit outputs the two-point specifying information to the main device control unit via the controller-side interface unit and the main device-side interface unit, and the main device control unit configures relative position coordinates by causing a coordinate plane configured in a part of the display screen of the first display unit to correspond to a coordinate plane configured on the entire display screen of the second display unit.

The adjustment unit and the second display control unit perform the following processes.

In a case in which the two points specified by the two-point specifying information is moved in a first rotation direction which is a predetermined rotation direction, the adjustment unit acquires the adjusted video signal forming an image region AR5 present at a position at which a region of the display screen of the first display unit configured at the relative position coordinates is rotated in an opposite direction to the first rotation direction on the display screen of the first display unit, and the second display control unit causes the second display unit to display the image region AR5 based on the adjusted video signal.

In the control system, by specifying two points on the display screen of the second display unit of the remote control device, that is, acquiring the two-point specifying information, it is possible to perform the display angle changing process using the relative position coordinates.

Accordingly, for example, when the control target device is a television receiver (control target device) including a high-resolution display device, the display screen of the control target device can be displayed on the second display unit of the remote control device and the display angle changing process can be quickly performed through an intuitive operation.

In an eleventh invention, in the control system according to any one of the first to tenth inventions, the mode switch unit is able to input information indicating whether to change a display position. The second display unit performs the following processes.

(1) In a case in which the information indicating whether to change the display position and input to the mode switch unit is information indicating permission of the change in the display position, the second display unit changes display of the second display unit based on the adjusted video signal.

(2) In a case in which the information indicating whether to change the display position and input to the mode switch unit is information indicating non-permission of the change in the display position, the second display unit does not change the display of the second display unit based on the adjusted video signal.

In the control system, only in a case in which the information indicating whether to change the display position is information indicating permission of the change in the display position, the display of the second display unit can be changed (updated). Therefore, it is possible to appropriately prevent the display of the second display unit from being changed (updated) without intention by the user. As a result, in the control system, it is possible to further improve the operability.

In a twelfth invention, in the control system according to any one of the first to eleventh inventions, the control target device further includes a storage unit that stores information regarding a marker. The remote control device further includes a second video combination unit that acquires a combined video signal by combining a sub-video signal including predetermined information with the adjusted video signal based on an instruction from the input control unit.

The second display control unit controls the second display unit such that the combined video signal is displayed on the second display unit.

The main device control unit controls the first display control unit such that the marker is superimposed to be displayed on an image region which corresponds to an image region displayed on the second display unit and is on a display screen displayed on the first display unit.

In the control system 4000, the marker is displayed in the image region (video region) on the display screen of the first display unit of the control target device corresponding to the image region (video region) displayed on the second display unit of the remote control device. Thus, the user can easily recognize where the image (video) displayed on the second display unit of the remote control device is shown in an image (video) displayed on the first display unit of the control target device.

In a thirteenth invention, in the control system according to the twelfth invention, in a case in which a predetermined operation is performed by a user, the main device control unit stores information regarding the image region which corresponds to the image region displayed on the second display unit and is on the display screen displayed on the first display unit as marker information in the storage unit.

Thus, in the control system, the marker information indicating the display state in the control system can be stored in the storage unit at a timing desired by the user.

In a fourteenth invention, in the control system according to the thirteenth invention, in a case in which a predetermined operation is performed by the user, the main device control unit reads the marker information stored in the storage unit and controls the first display control unit such that the marker is displayed to be superimposed on an image region specified by the read marker information on the display screen of the first display unit.

Thus, in the control system, the previously stored marker information can be called and the marker can be displayed on the display screen of the first display unit. Further, in the control system, the same state as the state in which the selected marker is stored can be reproduced by selecting the called marker.

In a fifteenth invention, in the control system according to any one of the first to eleventh inventions, the control target device further includes a storage unit that stores information regarding a marker. The remote control device further includes a second video combination unit that acquires a combined video signal by combining a sub-video signal including predetermined information with the adjusted video signal based on an instruction from the input control unit.

The second display control unit controls the second display unit such that the combined video signal is displayed on the second display unit.

The input control unit controls the second video combination unit such that the combined video signal is generated by reducing a video in which the marker is superimposed on an image region which corresponds to an image region displayed on the second display unit and is on a display screen displayed on the first display unit and combining the reduced video on the adjusted video signal.

Thus, in the control system, the video (image) on which the marker is superimposed on the image region which corresponds to the image region displayed on the second display unit and is on the display screen displayed on the first display unit can be reduced and displayed on the second display unit of the remote control device.

The present invention can be expressed as follows.

Hereinafter, "invention N" (where N is an integer of 1 to 9) corresponds to the foregoing "N-th invention".

[Invention 11] In the control system described in any one of Inventions 2 to 10, the remote control device further includes a touch panel. The input control unit acquires at least one of the one-point specifying information, the two-point specifying information, the display update information, the enlarged-display information, the reduced-display information, and the rotation-display information by a touched point on the touch panel.

[Invention 12] In the control system described in any one of Inventions 1 to 10, the control target device further includes an infrared transmission unit that radiates infrared light to the outside. The remote control device further includes an infrared reception unit that receives the infrared light radiated from the infrared transmission unit. The infrared reception unit acquires the one-point specifying information based on the infrared light received from the infrared transmission unit and inputs the one-point specifying information to the input control unit.

[Invention 13] In the control system described in Invention 12, the infrared transmission unit further includes four infrared light-emitting diodes disposed in the circumference of the first display unit. The infrared reception unit is an infrared imaging device that includes an optical system condensing the infrared light emitted from the infrared transmission unit. The infrared reception unit acquires an infrared captured image by imaging a scene containing the four infrared light-emitting diodes disposed in the circumference of the first display unit, acquires coordinate information regarding an intersection between an optical axis of the optical system and a display screen of the first display unit based on positions of the four infrared light-emitting diodes on the infrared captured image and a positional relation between the optical axis of the optical system of the infrared reception unit and the display screen of the first display unit, and acquires the one-point specifying information based on the acquired coordinate information.

In the eleventh invention, the control system described in any one of Inventions 2 to 10 further includes a touch panel. The input control unit acquires at least one of the one-point specifying information, the two-point specifying information, the display update information, the enlarged-display information, the reduced-display information, and the rotation-display information by a touched point on the touch panel.

Thus, in the control system, at least one of the one-point specifying information, the two-point specifying information, the display update information, the enlarged-display information, the reduced-display information, and the rotation-display information can be acquired using the touch panel.

In the twelfth invention according to one of the first to tenth inventions, the control target device further includes an infrared transmission unit that radiates infrared light to the outside. The remote control device further includes an infrared reception unit that receives the infrared light radiated from the infrared transmission unit.

The infrared reception unit acquires the one-point specifying information based on the infrared light received from the infrared transmission unit and inputs the one-point specifying information to the input control unit.

Thus, in the control system, the one-point specifying information can be acquired based on the infrared light received from the infrared transmission unit.

In the thirteenth invention according to one of the twelfth invention, the infrared transmission unit further includes four infrared light-emitting diodes disposed in the circumference of the first display unit.

The infrared reception unit is an infrared imaging device that includes an optical system condensing the infrared light radiated from the infrared transmission unit.

The infrared reception unit acquires an infrared captured image by imaging a scene containing the four infrared light-emitting diodes disposed in the circumference of the first display unit, acquires coordinate information regarding an intersection between an optical axis of the optical system and a display screen of the first display unit based on positions of the four infrared light-emitting diodes on the infrared captured image and a positional relation between the optical axis of the optical system of the infrared reception unit and the display screen of the first display unit, and acquires the one-point specifying information based on the acquired coordinate information.

Thus, in the control system, by changing the direction of the remote control device (the optical axis of the optical system of the infrared reception unit), it is possible to perform the display position changing process using the absolute position coordinates. Therefore, it is possible to further improve the operability.

INDUSTRIAL APPLICABILITY

The present invention can realize a control system capable of displaying a display screen of a television receiver (control target device) including a high-resolution display device and quickly performing processes such as a movement of the display, a change in a display magnification, a change in a display angle, and the like through intuitive operations. Accordingly, the present invention is useful in video-related industrial fields and can be realized in the fields.

REFERENCE SIGNS LIST

1000, 2000, 3000, 4000, 5000 CONTROL SYSTEM
1, 1A, 1B, 1C CONTROL TARGET DEVICE
12 FIRST DISPLAY CONTROL UNIT
13 FIRST DISPLAY UNIT
14, 14B MAIN DEVICE CONTROL UNIT
15 ADJUSTMENT UNIT
16 MAIN DEVICE-SIDE INTERFACE UNIT
2, 2A, 2B, 2C, 2D REMOTE CONTROL DEVICE
21 CONTROLLER-SIDE INTERFACE UNIT
22, 22A SECOND DISPLAY CONTROL UNIT
23 SECOND DISPLAY UNIT
24 TOUCH PANEL CONTROL UNIT
25 TOUCH PANEL
26 MODE SWITCH UNIT
27, 27A, 27B, 27C INPUT CONTROL UNIT
31 SECOND VIDEO COMBINATION UNIT

The invention claimed is:

1. A control system comprising:
a control target device; and
a remote controller,
wherein the control target device includes
   a first display that displays a video,
   a first display controller that performs driving control on the first display to cause to the first display to display the video,
   an adjuster that acquires an adjusted video signal by extracting a part or all of the video from the video displayed on the first display,
   a main device controller that controls the first display controller and the adjuster, and
   a main device-side interface that transmits the adjusted video signal acquired by the adjuster to the remote controller,
wherein the remote controller includes
   a second display that displays a video,
   a second display controller that performs driving control on the second display to cause the second display to display the video,
   an input controller that inputs information for controlling display of the video displayed on the second display,
   a mode switch that switches between a display operation mode for changing display of the video displayed on the second display and a device operation mode for performing a device operation of the control target device, and
   a controller-side interface that communicates with the main device-side interface of the control target device, and
wherein in a case in which the display operation mode is configured and position specifying information which is information for specifying a position on a display screen of the second display is input to the input controller,
   the input controller outputs the position specifying information to the main device controller via the controller-side interface and the main device-side interface,
   the main device controller configures absolute position coordinates by causing a coordinate plane configured on an entire display screen of the first display to correspond to a coordinate plane configured on the entire display screen of the second display,
   the adjuster acquires the adjusted video signal forming an image region which includes a point corresponding to a point indicated by the position specifying information on the absolute position coordinates of the display screen of the first display and is displayed on the first display, and
   the second display controller causes the second display to display the image region based on the adjusted video signal.

2. The control system according to claim 1, wherein the position specifying information is information for specifying one point on the display screen of the second display.

3. The control system according to claim 1, wherein in a case in which the display operation mode is configured and display update information which is information for updating display by shifting an image displayed on the display screen of the second display unit in a first direction is input to the input controller, the input controller outputs the display update information to the main device controller via the controller-side interface and the main device-side interface, the main device controller configures relative position coordinates by causing a coordinate plane configured on in a part of the display screen of the first display to correspond to a coordinate plane configured on the entire display screen of the second display, the adjuster acquires the adjusted video signal forming a shifted image region which is an image region present at a position at which a region of the display screen of the first display configured at the relative position coordinates is displaced in an opposite direction to the first direction on the display screen of the first display unit, and the second display controller causes the second display to display the shifted image region based on the adjusted video signal.

4. The control system according to claim 1, wherein in a case in which the display operation mode is configured and two-point specifying information which is information for specifying two points on the display screen of the second display is input to the input controller, the input controller outputs the two-point specifying information to the main device controller via the controller-side interface and the main device-side interface, and the main device controller configures relative position coordinates by causing a coordinate plane configured in a part of the display screen of the first display to correspond to a coordinate plane configured on the entire display screen of the second display, and wherein in a case in which the two points specified by the two-point specifying information is displaced in a first direction, the adjuster acquires the adjusted video signal forming a shifted image region which is an image region present at a position at which a region of the display screen of the first display configured at the relative position coordinates is displaced in an opposite direction to the first direction on the display screen of the first display, and the second display controller causes the second display to display the shifted image region based on the adjusted video signal.

5. The control system according to claim 1, wherein in a case in which the display operation mode is configured and enlarged-display information which is information for updating display by enlarging an image displayed on the display screen of the second display is input to the input controller, the input controller outputs the enlarged-display information to the main device controller via the controller-side interface and the main device-side interface, the main device controller configures relative position coordinates by causing a coordinate plane configured on in a part of the display screen of the first display to correspond to a coordinate plane configured on the entire display screen of the second display, the adjuster acquires the adjusted video signal forming a reduced image region which is an image region with a size obtained by reducing a region of the display screen of the first display configured at the relative position coordinates on the display screen of the first display based on the enlarged-display information, and the second display controller causes the second display to display the reduced image region based on the adjusted video signal.

6. The control system according to claim 1, wherein in a case in which the display operation mode is configured and two-point specifying information which is information for specifying two points on the display screen of the second display is input to the input controller, the input controller outputs the two-point specifying information to the main device controller via the controller-side interface and the main device-side interface, and the main device controller configures relative position coordinates by causing a coordinate plane configured in a part of the display screen of the first display to correspond to a coordinate plane configured on the entire display screen of the second display, and wherein in a case in which a distance between the two points specified by the two-point specifying information is changed to be increased, the adjuster acquires the adjusted video signal forming a reduced image region which is an image region with a size obtained by reducing a region of the display screen of the first display configured at the relative position coordinates on the display screen of the first display, and the second display controller causes the second display to display the reduced image region based on the adjusted video signal.

7. The control system according to claim 1, wherein in a case in which the display operation mode is configured and reduced-display information which is information for updating display by reducing an image displayed on the display screen of the second display is input to the input controller, the input controller outputs the reduced-display information to the main device controller via the controller-side interface and the main device-side interface, the main device controller configures relative position coordinates by causing a coordinate plane configured on in a part of the display screen of the first display to correspond to a coordinate plane configured on the entire display screen of the second display, the adjuster acquires the adjusted video signal forming an enlarged image region which is an image region with a size obtained by enlarging a region of the display screen of the first display configured at the relative position coordinates on the display screen of the first display based on the reduced-display information, and the second display controller causes the second display to display the enlarged image region based on the adjusted video signal.

8. The control system according to claim 1, wherein in a case in which the display operation mode is configured and two-point specifying information which is information for specifying two points on the display screen of the second display is input to the input controller, the input controller outputs the two-point specifying information to the main device controller via the controller-side interface and the main device-side interface, and the main device controller configures relative position coordinates by causing a coordinate plane configured in a part of the display screen of the first display to correspond to a coordinate plane configured on the entire display screen of the second display, and wherein in a case in which a distance between the two points specified by the two-point specifying information is changed to be decreased, the adjuster acquires the adjusted video signal forming an enlarged image region which is an image region with a size obtained by enlarging a region of the display screen of the first display configured at the relative position coordinates on the display screen of the first display, and the second display controller causes the second display to display the enlarged image region based on the adjusted video signal.

9. The control system according to claim 1, wherein in a case in which the display operation mode is configured and rotation-display information which is information for updating display by rotating an image displayed on the display screen of the second display in a first rotation direction is input to the input controller, the input controller outputs the rotation-display information to the main device controller via the controller-side interface and the main device-side interface, the main device controller configures relative position coordinates by causing a coordinate plane configured on in a part of the display screen of the first display to correspond to a coordinate plane configured on the entire display screen of the second display, the adjuster acquires the adjusted video signal forming a rotated image region which is an image region present at a position at which a region of the display screen of the first display configured at the relative position coordinates is rotated in an opposite direction to the first rotation direction on the display screen of the first display based on the rotation-display information, and the second display controller causes the second display to display the rotated image region based on the adjusted video signal.

10. The control system according to claim 1, wherein in a case in which the display operation mode is configured and two-point specifying information which is information for specifying two points on the display screen of the second display is input to the input controller, the input controller outputs the two-point specifying information to the main device controller via the controller-side interface and the main device-side interface, and the main device controller configures relative position coordinates by causing a coordinate plane configured in a part of the display screen of the first display to correspond to a coordinate plane configured on the entire display screen of the second display, and wherein in a case in which the two points specified by the two-point specifying information is moved in a first rotation direction which is a predetermined rotation direction, the adjuster acquires the adjusted video signal forming a rotated image region which is an image region present at a position at which a region of the display screen of the first display configured at the relative position coordinates is rotated in an opposite direction to the first rotation direction on the display screen of the first display, and the second display controller causes the second display to display the rotated image region based on the adjusted video signal.

11. The control system according to claim 1, wherein the mode switch is able to input information indicating whether to change a display position, wherein (1) in a case in which the information indicating whether to change the display position and input to the mode switch is information indicating permission of the change in the display position, the second display changes display of the second display unit based on the adjusted video signal, and wherein (2) in a case in which the information indicating whether to change the display position and input to the mode switch is information indicating non-permission of the change in the display position, the second display does not change the display of the second display based on the adjusted video signal.

12. The control system according to claim 1, wherein the control target device further includes a storage that stores information regarding a marker, wherein the remote controller further includes a second video combination circuit that acquires a combined video signal by combining a sub-video signal including predetermined information with the adjusted video signal based on an instruction from the input controller, wherein the second display controller controls the second display such that the combined video signal is displayed on the second display, and wherein the main device controller controls the first display controller such that the marker is superimposed on an image region which corresponds to an image region displayed on the second display and is on a display screen displayed on the first display.

13. The control system according to claim 12, wherein in a case in which a predetermined operation is performed by a user, the main device controller stores information regarding the image region which corresponds to the image region displayed on the second display and is on the display screen displayed on the first display as marker information in the storage.

14. The control system according to claim 13, wherein in a case in which a predetermined operation is performed by the user, the main device controller reads the marker information stored in the storage and controls the first display controller such that the marker is displayed to be superimposed on an image region specified by the read marker information on the display screen of the first display.

15. The control system according to claim 1, wherein the control target device further includes a storage that stores information regarding a marker, wherein the remote controller further includes a second video combination circuit that acquires a combined video signal by combining a sub-video signal including predetermined information with the adjusted video signal based on an instruction from the input controller, wherein the second display controller controls the second display such that the combined video signal is displayed on the second display, and wherein the input controller controls the second video combination circuit such that the combined video signal is generated by reducing a video in which the marker is superimposed on an image region which corresponds to an image region displayed on the second display and is on a display screen displayed on the first display and combining the reduced video on the adjusted video signal.

* * * * *